United States Patent
Bourezg et al.

(10) Patent No.: US 12,507,721 B2
(45) Date of Patent: Dec. 30, 2025

(54) READY-TO-USE PARENTERAL NUTRITION FORMULATION

(71) Applicants: BAXTER INTERNATIONAL INC., Deerfield, IL (US); BAXTER HEALTHCARE SA, Glattpark (CH)

(72) Inventors: Zouaoui Bourezg, Braine l'Alleud (BE); Freddy Desbrosses, Thuin (BE); Caroline Roselyn Dupont, Ixelles (BE); Aurélie Couthouis, Tubize (BE); Gabriel Brossard, Forest Belgium (BE); Pierpaolo Padula, Venosa (IT); Jean-Luc Trouilly, Braine l'Alleud (BE)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 206 days.

(21) Appl. No.: 17/330,076

(22) Filed: May 25, 2021

(65) Prior Publication Data
US 2022/0378077 A1 Dec. 1, 2022

(51) Int. Cl.
*A23L 33/00* (2016.01)
*A23B 2/30* (2025.01)
(Continued)

(52) U.S. Cl.
CPC .............. *A23L 33/40* (2016.08); *A23B 2/30* (2025.01); *A23L 33/115* (2016.08);
(Continued)

(58) Field of Classification Search
CPC .......... A23L 33/40; A23L 3/10; A23L 33/125; A23L 33/155; A23L 33/16; A23L 33/175; A61J 1/10; A61J 1/2093
See application file for complete search history.

(56) References Cited

U.S. PATENT DOCUMENTS

| 2009/0203626 A1 | 8/2009 | Ortrud et al. |
| 2010/0092446 A1* | 4/2010 | Sumiyoshi ............... A61K 9/08 514/474 |

(Continued)

FOREIGN PATENT DOCUMENTS

| CN | 102743394 | 10/2012 |
| EP | 0704199 | 4/1996 |

(Continued)

OTHER PUBLICATIONS

KR 20190105737A to Woo (machine language translation from Clarivate) (Year: 2019).*

(Continued)

*Primary Examiner* — Nikki H. Dees
*Assistant Examiner* — Andrew E Merriam
(74) *Attorney, Agent, or Firm* — K&L Gates LLP

(57) ABSTRACT

The present disclosure relates to a terminally heat-sterilized ready-to-use parenteral nutrition formulation comprising all macronutrients and micronutrients required to meet the clinical guidelines for parenteral nutrition, wherein all said micronutrients and macronutrients are provided in one multi-chamber bag (MCB). The disclosure is also directed to a parenteral nutrition formulation comprising all such macronutrients and micronutrients. More specifically, the present disclosure is directed to a MCB comprising at least five chambers containing a carbohydrate formulation in a first chamber, an amino acid formulation in a second chamber, a lipid formulation in a third chamber, a fourth chamber comprising a vitamin formulation and a fifth chamber comprising a trace element formulation, wherein the carbohydrate formulation, amino acid formulation and/or the lipid formulation may also contain certain vitamins and certain trace elements that can be stably accommodated therein.

29 Claims, 12 Drawing Sheets

(51) Int. Cl.

| | |
|---|---|
| *A23L 33/115* | (2016.01) |
| *A23L 33/125* | (2016.01) |
| *A23L 33/15* | (2016.01) |
| *A23L 33/155* | (2016.01) |
| *A23L 33/16* | (2016.01) |
| *A23L 33/175* | (2016.01) |
| *A61J 1/10* | (2006.01) |
| *A61J 1/20* | (2006.01) |

(52) U.S. Cl.
CPC ............ *A23L 33/125* (2016.08); *A23L 33/15* (2016.08); *A23L 33/155* (2016.08); *A23L 33/16* (2016.08); *A23L 33/175* (2016.08); *A61J 1/10* (2013.01); *A61J 1/2093* (2013.01)

(56) References Cited

U.S. PATENT DOCUMENTS

| | | | |
|---|---|---|---|
| 2013/0078228 A1* | 3/2013 | Abiko | A61K 9/08 514/474 |
| 2021/0069138 A1* | 3/2021 | Pinoie | A61J 1/2093 |
| 2023/0263858 A1* | 8/2023 | Yamaoka | A61K 31/718 |

FOREIGN PATENT DOCUMENTS

| | | |
|---|---|---|
| EP | 2080501 | 7/2009 |
| EP | 3053582 | 8/2016 |
| EP | 1973552 | 4/2017 |
| JP | 2003212767 | 7/2003 |
| JP | 2006137745 A * | 6/2006 |
| JP | 2006187636 A * | 7/2006 |
| KR | 1020190105737 | 9/2019 |
| WO | 2010067251 | 6/2010 |
| WO | 2016188876 | 12/2016 |
| WO | 2019/232054 | 12/2019 |
| WO | 2021/122925 | 6/2021 |

OTHER PUBLICATIONS

JP-2006137745-A (Clarivate machine translation) (Year: 2006).*
JP-2006187636-A (Clarivate machine translation) (Year: 2006).*
International Search Report and Written Opinion for App. No. PCT/US2022/030517 dated Sep. 16, 2022 (33 pages).
Singer et al. ESPEN Guidelines on Parenteral Nutrition: Intensive Care, Clinical Nutrition 2009, 28:387-400.
Ferguson et al. A Review of Stability Issues Associated with Vitamins in Parenteral Nutrition; Clinical Nutrition ESPEN 2014, vol. 9 issue 2.
Ribeiro et al, Nutritional Journal 2011, 10:47.
Mirtallo et al., JPEN J Parenter Enteral Nutr. 2004, 28(6):S39-S70.
Vanek et al., A.S.P.E.N. Nutrition in Clinical Practice 2012, 27:440-491.
Osland et al., Australasian Society for Parenteral and Enteral Nutrition (AuSPEN) adult vitamin guidelines for parenteral nutrition. Asia Pac J of Clin Nutr 2016, 25(3):636-650.
Allwood et al. Compatibility and Stability of Additives in Parenteral Nutrition Admixtures. Nutrition 1998, vol. 14, No. 9, pp. 697-706.
Blaauw et al. Parenteral Provision of Micronutrients to Adult Patients: An Expert Consensus Paper. JPEN J Parenter Enteral Nutr. Mar. 2019;43 Suppl 1:S5-S23.
Written Opinion of the International Preliminary Examning Authority for App. No. PCT/US2022/030517 dated Apr. 24, 2023 (10 pages).
International Preliminary Report on Patentability for App. No. PCT/US2022/030517 dated Jul. 17, 2023 (11 pages).

* cited by examiner

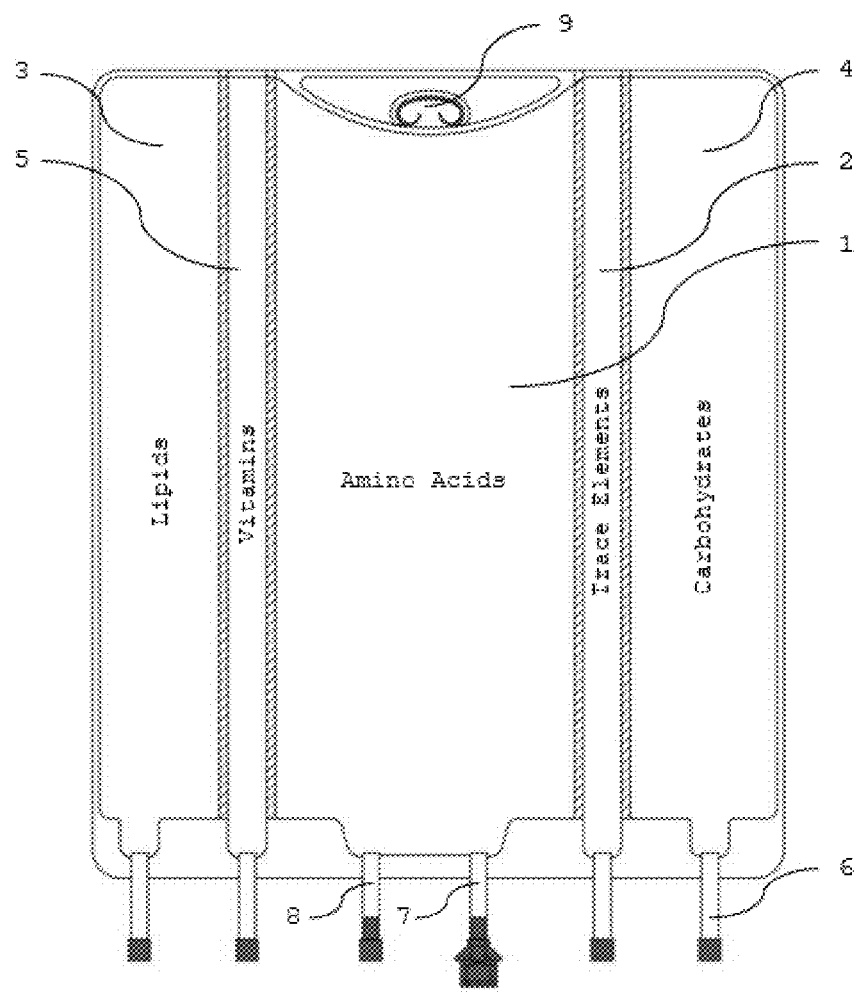
Figure 1 (Figure 1A)

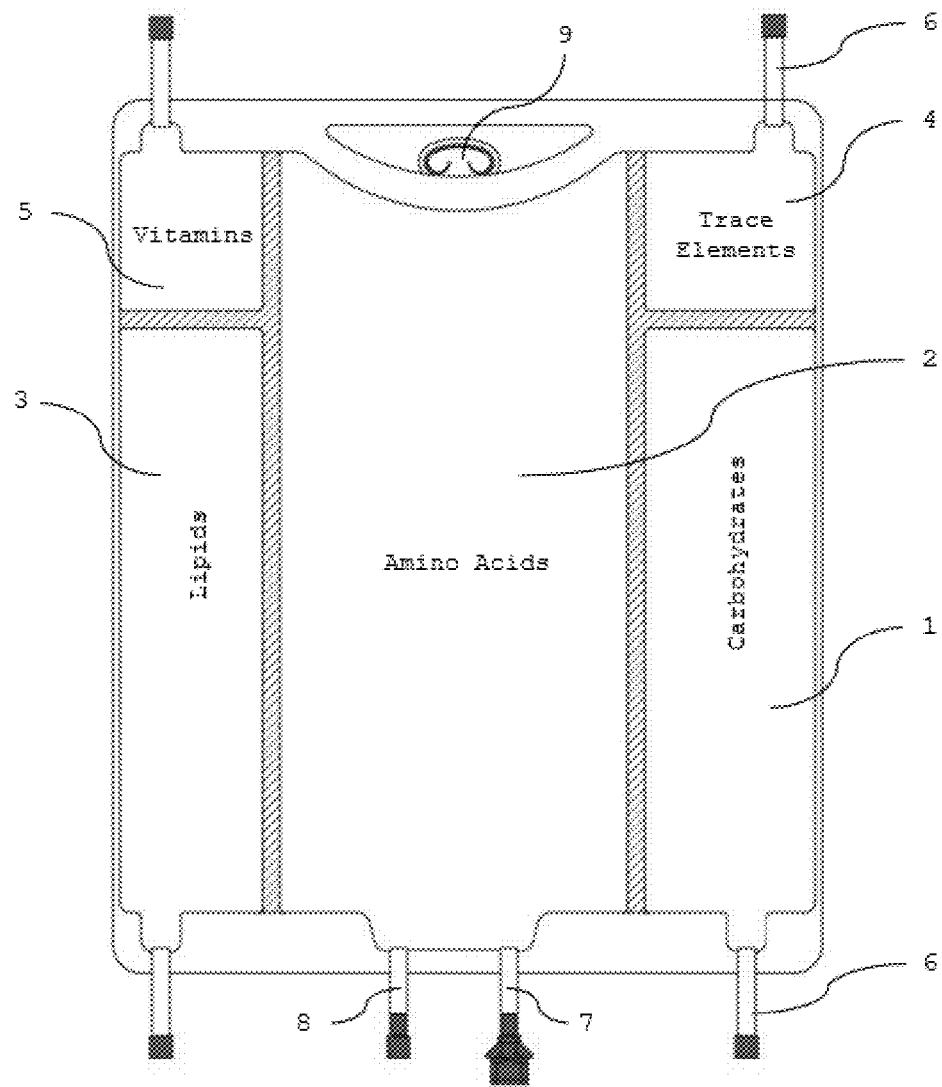
Figure 1(Figure 1B)

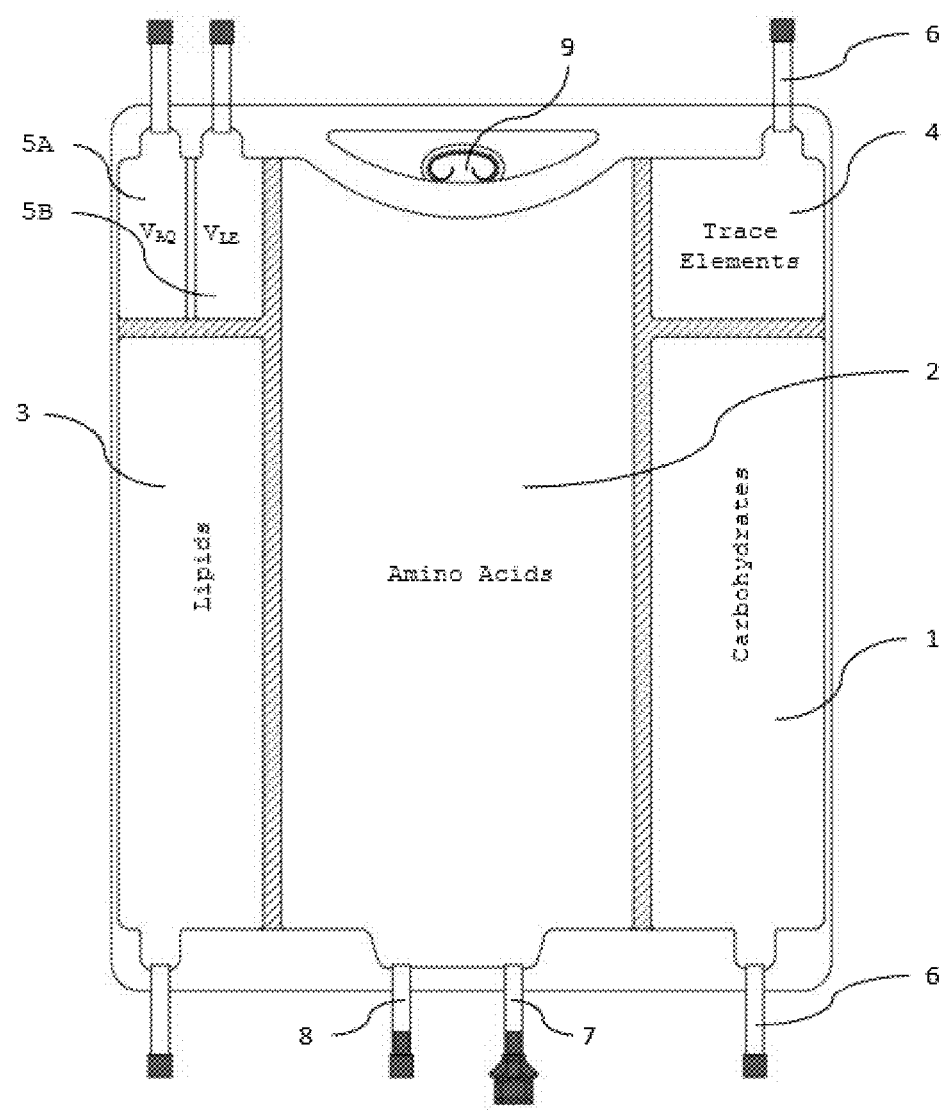
Figure 1 (Figure 1C)

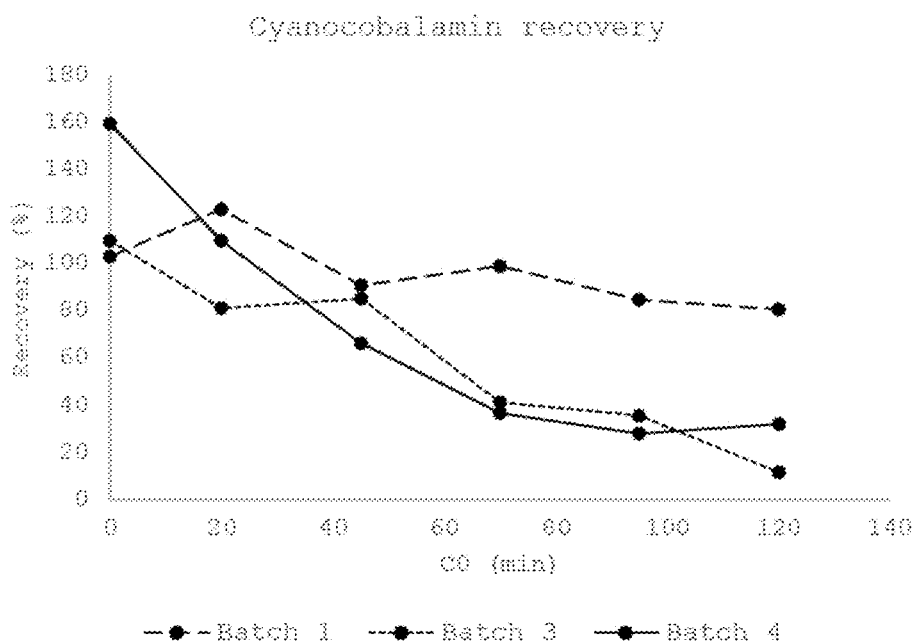
Figure 3(Figure 3A)
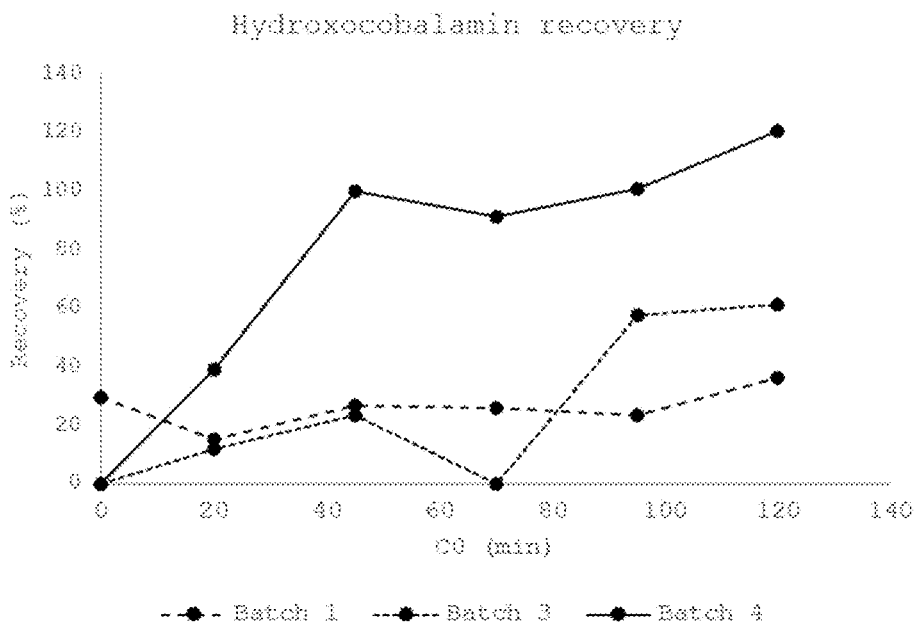
Figure 3(Figure 3B)

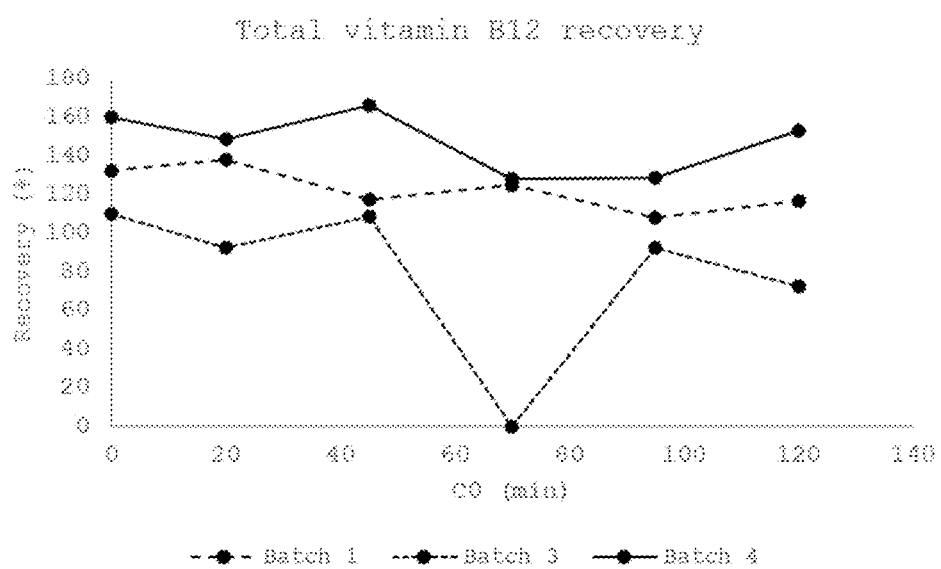
Figure 3 (Figure 3C)

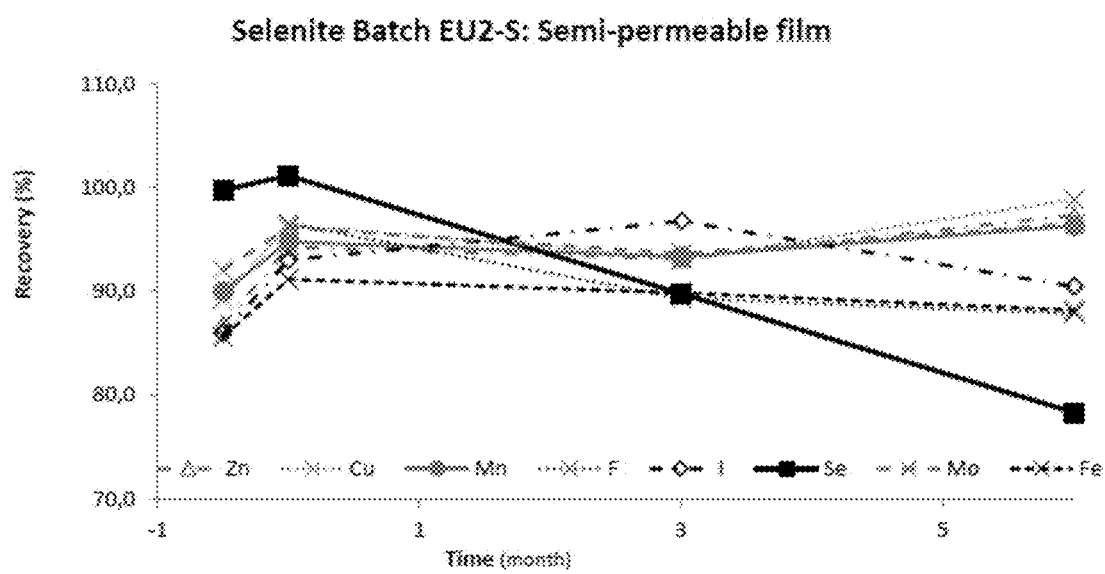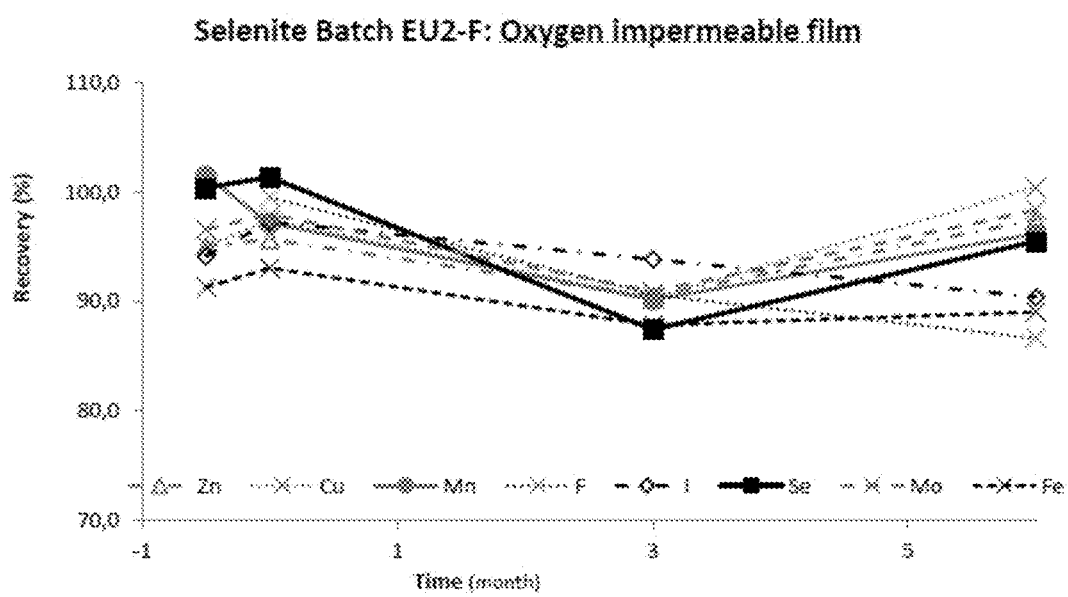
Figure 7 (Figure 7A and Figure 7B)

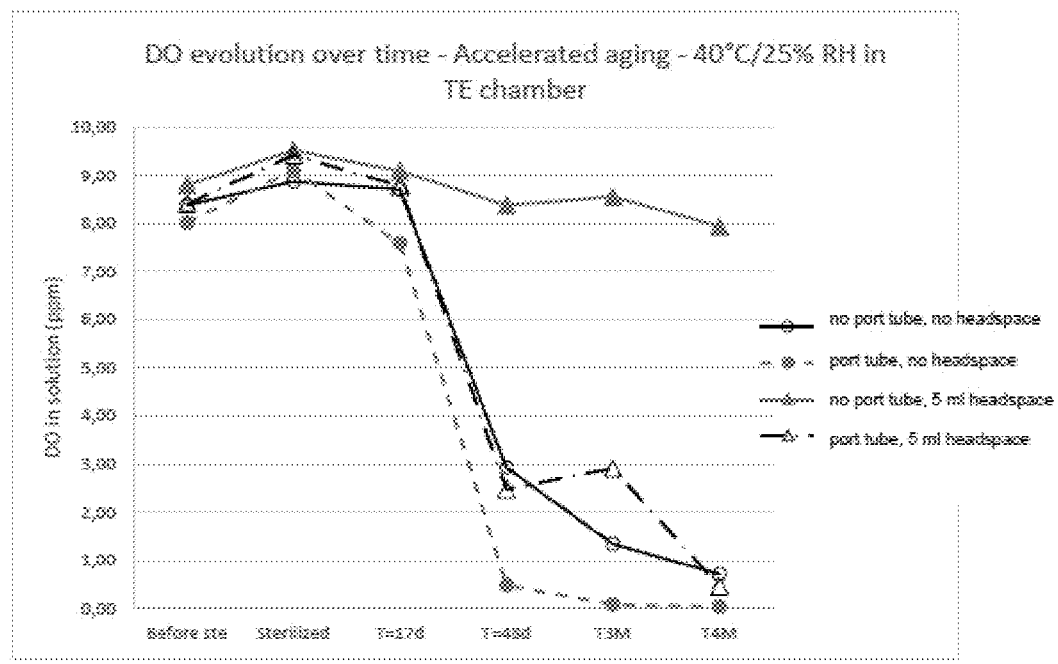
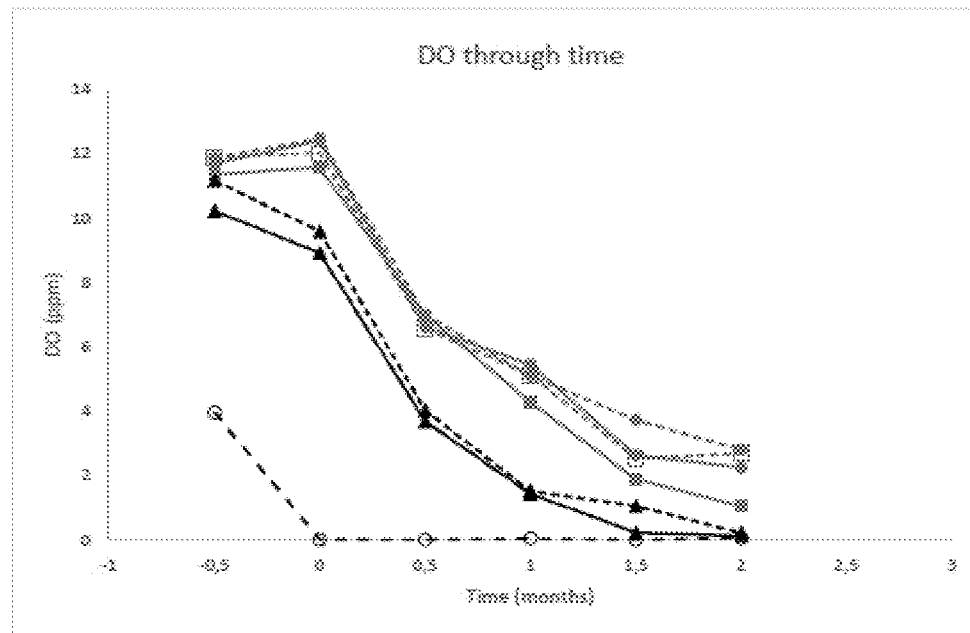
Figure 8 (Figure 8A and Figure 8B)

READY-TO-USE PARENTERAL NUTRITION FORMULATION

TECHNICAL FIELD

The disclosure is directed to a terminally heat-sterilized ready-to-use parenteral nutrition formulation comprising all macronutrients and micronutrients required to meet the clinical guidelines for parenteral nutrition, wherein all said micronutrients and macronutrients are provided in one multi-chamber bag (MCB). The disclosure is also directed to the parenteral nutrition formulation reconstituted from such multi-chamber bag. More specifically, the present disclosure is directed to a MCB comprising at least five chambers containing a carbohydrate formulation in a first chamber, an amino acid formulation in a second chamber, a lipid formulation in a third chamber, a fourth chamber comprising a vitamin formulation and a fifth chamber comprising a trace element formulation, wherein the carbohydrate formulation, amino acid formulation and/or the lipid formulation may also contain certain vitamins and certain trace elements that can be stably accommodated therein. The disclosure also relates to the use of the parenteral nutrition formulation for providing total parenteral nutrition to a patient without having to add further components such as vitamins or trace elements to the parenteral formulation before administration to meet the clinical guidelines for parenteral nutrition.

BACKGROUND AND DESCRIPTION OF THE RELATED ART

Parenteral Nutrition (PN) aims to supply nutrients to patients by venous access. Nutrients are composed of macronutrients (e.g., lipids, amino acid or protein and dextrose or carbohydrates), micronutrients (e.g., vitamins and trace elements) and electrolytes.

Parenteral nutrition (PN), such as in the form of one or more solutions, can be provided in the form of flexible bags, either in the form of single flexible bags containing glucose, amino acids with or without electrolytes, and lipids, which can be mixed together prior administration, or multi-chamber flexible bags providing said macronutrients and electrolytes in separate chambers, in a ready to use format for reconstitution before administration. The bags are typically made of a synthetic or plastic material, for example materials such as polypropylene (PP), polyethylene (PE), ethylene vinyl alcohol (EVOH), ethylene-vinyl acetate (EVA) and all possible copolymers, essentially any synthetic material suitable for containing the components to be administered.

Parenteral nutrition solutions can also be prepared by compounding such solution according to an individual prescription for a patient under sterile conditions. PN compounding in large institutions is now largely automated using volumetric pump systems, so-called automated compounding devices (ACDs) to compound the PN formulations. These devices can be used to customize a PN prescription for each patient. It is possible to use ACDs to compound two-in-one PN bags that contain amino acids, dextrose and other additives in one bag, or three-in-one PN bags that contain amino acids, dextrose, additives, and lipids all in one bag. Some pharmacies will compound both types and will infuse IVLE (intra-venous lipid emulsions) as a separate infusion with two-in-one PNs. This strategy is often used for pediatric patients. Generally, micronutrients in such scenario can be compounded into such solution that is administered immediately after preparation. However, in cases where no pharmacy is available and/or no individual prescription is strictly required, including home parenteral nutrition (HPN) scenarios, a ready-to-use formulation will be preferable. However, the compounding of certain electrolytes together is difficult, and many services do not compound trace elements and vitamins in the same bag since trace elements could promote oxidation of vitamins.

In the state of the art, micronutrients are typically added to nutrition bags directly before administration. For this purpose, vitamins can be provided in glass vials in the form of a lyophilizate or solution to be reconstituted and/or mixed into the nutrition/infusion bags. Trace elements are also provided in glass vials or polypropylene ampules meant to be mixed into infusion bags prior to administration. Prior to usage, referring to the start of administering the formulation to the patient, the micronutrients are sometimes added to the mixture or macronutrients via an injection port (septum) of the container or bag (septum) or are added via a Y-connector to the infusion line. These processes take time and several handling steps increasing the risk of medication errors and/or contamination. For example, German guidelines advocate the use of "all-in-one (AIO) nutrient mixtures" and advise that multi-bottle systems should not be used because of increased risks and more difficult handling especially also for HPN. A retrospective study of in-hospital PN found that adding supplements to multi-chamber PN bags on the hospital ward increased blood stream infection risk (Turpin et al., "The impact of parenteral nutrition preparation on blood-stream infection risk and costs". European Journal of Clinical Nutrition (2014), 68, 953-958). Also, it is mentioned, e.g. in Singer et al. ESPEN Guidelines on Parenteral Nutrition: Intensive Care, Clinical Nutrition 2009, 28:387-400, that separate containers approaches require numerous IV line manipulations associated with an increased risk of administration errors, as well as of septic and metabolic complications. In addition, significant amounts of waste are generated, such as ampoules, gloves, lines and syringes that are only needed for the mixing or addition of micronutrients and are then discarded.

To avoid these potential problems, it would seem a straightforward solution to these problems to provide ready-to-use "all-in-one" products that accommodate all relevant macro- and micronutrients products as well as electrolytes. However, it is persistently difficult to stably accommodate vitamins and trace elements that are deemed relevant for meeting the patients' needs in one terminally heat-sterilized product. For example, incompatibilities may occur when mixing vitamins and trace elements in the same preparation.

Vitamins are highly reactive and their addition to PN admixtures can cause several pharmaceutical issues. Reactions involving vitamins are dependent on relative concentrations of reactants, including dissolved oxygen, pH, temperature, time, light exposure, container material and the presence of any other catalytically active components, including trace elements and other vitamins. So far, little is known about the stability of vitamins such as nicotinamide, cyanocobalamin, biotin and pantothenic acid in PN. (Ferguson et al., e-SPEN Journal 2014, 9:e49-e53). For example, pediatric formulations containing calcium in the presence of organic phosphate, amino acids, glucose, sodium chloride and magnesium sulphate, vitamins B1, B2, B6 and C and trace elements had a shelf life of only 72 h when maintained under refrigeration between 2° C. and 8° C. When stored at 25° C. vitamin C presented instability after 48 hours (Ribeiro et al, Nutritional Journal 2011, 10:47).

Vitamin C (ascorbic acid), for example, is an essential water-soluble vitamin because, unlike many animals, humans are unable to synthetize it. A regular and adequate intake of vitamin C is required owing to the low storage capacity of the human body. In the literature, studies have reported vitamin C insufficiency in patients on prolonged total parenteral nutrition, and the same applied, as expected, to patients with Short Bowel Syndrome (SBS) on intermittent parenteral nutrition It was also found that almost 30% of adult patients with HPN or intravenous fluid infusion had vitamin C insufficiency (Nutrients 2020, 12: 1667). At the same time, vitamin C is a considerably unstable vitamin and is oxidized in the presence of oxygen in a reaction catalyzed by copper ions. This reaction leads to two acidic products: threonic acid and oxalic acid; the latter is considerably stronger and could acidify the preparation, thereby jeopardizing the stability of the complete formulation; in addition there is a risk of precipitation of calcium oxalate when calcium ions are present.

Another example for a delicate but essential vitamin is vitamin B12. Vitamin B12 is generally considered to be stable under most food processing operations, but like all water-soluble vitamins, it is subject to large losses upon heating of up to 100° C. (Leskova et al. Journal of Food Composition and Analysis; 19 (2006), 252-276). The most important associated compound with vitamin B12 activity is cyanocobalamin, which is decomposed by both oxidizing and reducing agents. In neutral and weak acid solutions, it is relatively stable to both atmospheric oxygen and heat. It is only slightly stable in alkaline solutions and strong acids. The stability of vitamin B12 is significantly influenced by the presence of other vitamins. Vitamin B12 is normally stable during pasteurization, but is instable during sterilization, which is usually associated with strong losses of Vitamin B12. This is especially true where vitamin B12 is a component of a higher volume product, such as a ready-to-use, AIO product for PN, as higher volumes automatically mean higher heat exposure to get them terminally heat-sterilized. In addition, vitamin B12 is sensitive to the presence of other regular components of parenteral nutrition products, including macronutrients, such as amino acids or carbohydrates, certain other vitamins and/or certain trace elements. In combination with issues around determining optimal pH and redox conditions for all components of such MCB products, vitamin B12 has proved to withstand many attempts to stably include it in terminally heat-sterilized PN products.

Vitamin A is another major example for a vitamin having significant stability issues when provided in terminally heat-sterilized, liquid read-to-use products (Ferguson et al. A Review of Stability Issues Associated with Vitamins in Parenteral Nutrition; Clinical Nutrition ESPEN 2014, vol. 9 issue 2). Vitamin A is generally difficult to stabilize. For one, vitamin A, or retinol, is the most light-sensitive micronutrient found in PN admixtures besides vitamin B2. Also vitamin C and vitamin B12 show a sensitivity towards light. For example, when subjected to light in unprotected bags or administration sets, it undergoes extensive photodegradation. Known approaches of stabilizing vitamin A compounds in a liquid preparation for PN have placed vitamin A together with the other lipid-soluble vitamins in a lipid phase or, alternatively, include stabilizing vitamin A in a lipid-containing lyophilized mixture with other vitamins for later addition to the PN product. Since it is known that vitamin A is light sensitive, light protection has also been used in the state of the art (e.g. in the form of an appropriate container such as brown glass or aluminum cover around a flexible bag). For example, the product Vitalipid® (Fresenius Kabi) comprises vitamin A together with vitamins D2, K1 and E in a lipid emulsion which is provided in a 10 mL ampoule which contains, per 1 mL, 100 mg soy oil, 12 mg egg lecithin and 22 mg glycerol. The lipid emulsion is added to parenteral nutrition formulations for injection before administration to the patient. However, another source of degradation of vitamins are peroxides generated by lipid emulsions. Lipid emulsions containing polyunsaturated fatty acids (PUFAs) are at an increased risk of peroxidation. Vitamin E acts as a major scavenger for free radicals and prevents lipid peroxyl radicals from reacting with fatty acid side chains. Nevertheless, peroxidation still occurs to some degree and further investigation is required to understand the relationship between the composition of lipid emulsions and the degradation of vitamins. There have been descriptions of products including lipid-soluble vitamins such as vitamin A into the chamber containing the lipid formulation in order to prevent dissociation, oxidation and isomerization. However, while such an approach may give vitamin A some minor protection, it is not enough to stabilize it efficiently for use in a terminally heat-sterilized PN product with a shelf-life of 12 to 24 months without the need to refrigerate or otherwise specifically treat such product (Ferguson et al. A Review of Stability Issues Associated with Vitamins in Parenteral Nutrition; Clinical Nutrition ESPEN 2014, vol. 9 issue 2). Furthermore, sorption of retinol may occur with bags and administration set tubing, further reducing the amount of vitamin A being administered to the patient. This problem has been much reduced by using the less reactive palmitate ester, rather than the acetate ester. The introduction of tubing containing polyolefine, which is free of PVC, plasticizers, adhesives, or latex, has further reduced the adsorption of vitamin A. Still, these measures, when scrutinized, proved to be not good enough to allow for a product for TPN providing all nutrients in liquid preparations that stably comprises vitamin A.

However, as vitamin A as well as vitamin C and vitamin B12, for example, are regarded as vitamins required in total PN (TPN), it must be a component of an "all-inone" ready-to-use formulation. Several guidelines address the vitamins which are considered relevant in parenteral nutrition (Mirtallo et al., JPEN J Parenter Enteral Nutr. 2004, 28(6):539-570; Vanek et al., A.S.P.E.N. Nutrition in Clinical Practice 2012, 27:440-491; Osland et al., Australasian Society for Parenteral and Enteral Nutrition (AuSPEN) adult vitamin guidelines for parenteral nutrition. Asia Pac J of Clin Nutr 2016, 25(3):636-650).

Regarding trace elements, most patients being transitioned to parenteral nutrition are depleted in micronutrients and will have high demands caused by inadequate gastro-intestinal absorption, excessive losses, or abnormalities in storage or metabolism. Micronutrient depletion can lead to clinical issues and it is important to ensure there is adequate provision in all parenteral nutrition (PN) regimens (Hardy et al., Nutrition 2009, 25:1073-1084). Trace elements currently considered to be essential for humans are the metals copper, chromium, iron, manganese, molybdenum, and zinc, the metalloid selenium, and the non-metal iodine. Several guidelines such as the ESPEN Guidelines from 2009 address the trace elements considered relevant for parenteral nutrition.

For example, it is known in the art that selenium, iodine and copper—especially in combination—are difficult to include in nutrition bags, as they can undergo chemical reactions, especially when they have to undergo extreme conditions such as a heat sterilization and extended storage periods (see, for example, Allwood et al. Compatibility and Stability of Additives in Parenteral Nutrition Admixtures.

Nutrition 1998, Vol. 14, No. 9, pp. 697-706; Eisenberg et al. Stability of selenium sources reviewed. Feedstuffs, Jun. 18, 2012).

Furthermore, in various formulation studies, when attempting to introduce trace elements into nutrition multichamber bags, serious stability issues have been experienced. Especially the notorious loss of selenium is an unsolved problem. This may be due to the fact that selenium in the form of Se(IV) and specifically in the form of sodium selenite, selenious acid or selenium dioxide is prone to adsorption, for example to plastic materials or iron oxides; it can be reduced into metallic selenium in the presence of reducing agents like ascorbic acid; it can be reduced into hydrogen selenide, which is a volatile substance; and/or it can be transformed into selenious dioxide at low pH, which is also a volatile substance under certain conditions.

In addition to selenium, iodine, fluoride and copper also showed stability issues during formulation trials. Copper is a reactive entity and can catalyze various chemical reactions and it is known that it can precipitate. Iodide can be reduced into iodine, which is potentially volatile. Furthermore, fluoride showed a decreasing concentration over time. So, while it is possible, under certain conditions such as in Peditrace, Nutryelt or Addaven, to stabilize selenium with certain other trace elements in specifically tailored plastic ampoules or glass vials for addition to a parenteral nutrition product as described above, it turned out to be challenging to stabilize it in standard parenteral nutrition products which contain a variety of different compounds in flexible bags, where the container and the conditions cannot readily be adapted to the special requirements of selenium alone or in combination with other trace elements such as, for example, iodine and/or copper, and which in addition will generally have to undergo terminal heat sterilization specifically in the presence of lipid emulsions.

pH is another important parameter to be considered when targeting the stability of vitamins and trace elements in a multi-chamber AIO product. Vitamins and trace elements have different requirements but pH is also important regarding lipid stability. Glucose formulations and many trace elements require a low pH, whereas several vitamins and lipid emulsions require a higher pH. For example, it is known that iodide (I) is more stable in solutions having an acidic pH. However, regarding lipid emulsions, a decrease in pH can lead to a decrease in the zeta potential of the emulsion droplets and ultimately lead to emulsion instability. This is intensified in the presence of positively charged trace elements. Thus, pH for various PN formulations of macro- and micronutrients must be carefully controlled and placement of vitamins and trace elements in different chambers, such as glucose or amino acid chambers which have different pH in combination with incompatibilities between certain vitamins and trace elements is not straightforward. In addition, the optimal pH should be maintained throughout the shelf-life of a product.

Another critical factor especially in ready-to-use, multi-chamber PN products that are design also for an extended shelf-life is oxygen. Various vitamins have been reported to be sensitive to oxygen when stored in sealed containers, such as in sealed flexible bags. Multi-chamber bags comprising parenteral nutrition formulations and vitamins will therefore be designed to avoid the presence or uptake of oxygen, e.g., by using oxygen-impermeable films and containers and oxygen absorbers. However, certain compounds, especially certain trace elements, may require oxygen for prolonged stability. So, finding a balance between these two conflicting conditions in one MCB is extremely difficult.

Finally, elevated temperatures that are required for terminally heat-sterilizing a PN product to make it safe for intravenous administration can have a significant impact on vitamins and trace elements, so that even optimal conditions in unsterile formulations may not be maintained during and after terminal heat-sterilization. This general issue is aggravated in large volume products containing heat-sensitive components such as MCBs for PN, as higher volumes require a significant heat exposure in comparison to low volume products. In some cases, PN solutions containing heat-sensitive vitamins and/or trace elements can be sterilized by aseptic filtration, thereby avoiding the impact of heat on certain components of the PN formulations. However, terminal sterilization generally provides greater assurance of sterility of the final product. Sterilization by filtration is also not straightforward for formulations comprising lipid emulsions, which is why products on the market that make use of aseptic filtration generally do not encompass lipid emulsions. For example, aseptic filtration requires the emulsion droplet size to be below 200 nm. Alternatively, aseptic processing may be employed. However, this process is very cumbersome, labor intensive and requires additional process validation data and justification during regulatory submissions. These issues multiply when it comes to a ready-to-use AIO product comprising a multitude of compound and formulations and such process is therefore generally ruled out as a viable option in such scenario. In contrast, heat sterilization is well tolerated by injectable emulsions.

Some products have been developed that contain at least some trace elements in nutrition multi-chamber bags, such as, for example, Pediaven, a parenteral nutrition binary solution intended for infants, children and adolescents, which contains trace elements such as the aforementioned selenium in the glucose chamber. However, it has been reported that the selenium, provided as selenium dioxide in the product, is absent in the finished product potentially due to degradation, as announced in July 2014 (http://www.pharmacovigilance-tours.fr/490.html), underlining the problems around stabilizing the trace element in PN products. Another product, Elneopa, from Otsuka Pharmaceuticals, contains certain trace elements in a small, separate and dedicated chamber as part of a multi-chamber bag. However, this product does not contain selenium, which, for example, is known for its delicate stability, and it also does not contain lipids.

KR1020190105737 relates to an infusion solution preparation containing lipid-soluble vitamins and trace elements, and more particularly, to an infusion solution preparation which includes a plurality of chambers therein and thus stores reducing sugars, amino acids, lipids and lipid-soluble vitamins, and trace elements separately. The publication, among other trace elements contained in a chamber of a multi-chamber nutritional product, also mentions selenium ions and a preferred concentration of 3 μg/mL to 7.0 μg/ml based on a selenium cation. Specific ions or ways to address the known problems and stabilize such selenium compounds in the formulation are, however, not mentioned.

EP2080501A1 discloses a drug solution for parenteral nutrition which combines an amino acid and saccharide solution as well as a lipid-soluble vitamin containing solution in a multi-chamber bag that is characterized by a reduced dissolved oxygen content.

WO2010067251A1 discloses an injectable trace element solution which comprises zinc, manganese and selenium as sodium selenate as well as copper.

US2010092446A1 describes a multi-chamber formulation for PN comprising an amino acid chamber and a saccharide chamber wherein the vitamin containing saccharide solution contains a saccharide and a water-soluble vitamin selected from the group consisting of vitamin B1, vitamin B2, vitamin B6, vitamin B12, vitamin C, folic acid, niacin, biotin and a pantothenic compound.

EP0704199A1 also describes a heat sterilized multi-chamber container for parenteral nutrition, wherein the glucose is associated with vitamin B12 and B1.

EP3053582A1 discloses a multi-chamber container wherein vitamins B12 and B6 are associated with glucose at a pH of about 5 and an oxygen content of about 4 ppm.

WO2016188876A1 discloses an emulsion for parenteral nutrition comprising retinol palmitate, fish oil, oleic acid and tocopherol.

CN102743394A relates to an injectable solution of lipid-soluble vitamins comprising vitamin A, vitamin D, vitamin E and vitamin K.

JP2003212767A discloses a multi-chamber bag for parenteral nutrition which comprises a small separate container within the amino acid chamber, wherein the separate container contains the trace elements copper, iron, manganese and zinc at a pH of from 4.0 to 7.5 or vitamins. It further discusses the optional presence of vitamins in the amino acid and/or carbohydrate chamber. A lipid chamber is not present.

In summary, while there are some products available that combine at least partially provide for ready-to-use formulations containing certain macro- and/or micronutrients, the current state of the art still requires that in order to meet clinical guidelines for parenteral nutrition encompassing all relevant macro- and micronutrients, either said micronutrients must be added to macronutrient containing triple-chamber bags (3CB) before administration to the patient, that multiple bags with different formulations must be combined, or that macro- and micronutrients have to be assembled in specifically prepared, compounded parenteral nutrition formulation for each patient directly before administration. Adding micronutrients to a 3CB or said multiple-bag approach is time-consuming for the caregivers to make these adjustments, generates a significant amount of waste and it entails the risk of bloodstream infections, needle-stick injuries, and medication errors to the detriment of the patient.

Accordingly, there is a significant need to provide for a ready-to-use, all-in-one parenteral nutrition product which comprises all macronutrients and micronutrients to meet the clinical guidelines for parenteral nutrition, thereby avoiding the compounding of or manual combination of formulations, or the addition vitamins and trace elements to a product before administration. To date, said full set of required macro- and micronutrients cannot together be stably accommodated in terminally heat-sterilized parenteral nutrition products because of issues of incompatibility and stability of several critical micronutrients especially when terminally heat-sterilized products are sought for. Providing such ready-to-use AIO product would address ecological issues, enable a safe therapy also for HPN and TPN, and specifically allow to reduce medical risks, which could significantly contribute to advancing today's standard of care.

SUMMARY OF THE INVENTION

The present invention provides for a terminally heat-sterilized and ready-to-use parenteral nutrition product in the form of a multi-chamber bag that comprises macronutrients (carbohydrates, lipids and amino acids) and micronutrients (trace elements and vitamins) in a way that clinical guidelines for parenteral nutrition are met without having to add vitamins and/or trace elements to the formulation before administration of the parenteral nutrition formulation to the patient. It is intended to thereby avoid having to add vitamins and/or trace elements manually to a parenteral nutrition formulation before administration of the parenteral nutrition or combine multiple formulation products for a complete parenteral nutrition therapy, including having to a lipid formulation separately. The ready-to-use parenteral formulation is therefore designed to accommodate all macronutrients and micronutrient needed to meet the guidelines for the parenteral nutrition in one terminally heat-sterilized product, including vitamins and trace elements that so far could not stably be included and provided in such products due to instability and incompatibility issues. The ready-to-use parenteral formulation disclosed herein can safely be used for total parenteral nutrition or partial or complementary parenteral nutrition either inside or outside the hospital setting.

According to one aspect, a terminally heat-sterilized multi-chamber container (MCB) is provided which comprises at least:
  (a) a first chamber comprising a carbohydrate formulation and vitamins,
  (b) a second chamber comprising an amino acid formulation and vitamins,
  (c) a third chamber comprising a lipid formulation,
  (d) a fourth chamber comprising a trace element formulation, and
  (e) a fifth chamber comprising a vitamin formulation,
    wherein the vitamin formulation comprises at least vitamin B12, and wherein the trace element formulation comprises at least selenium (Se).

According to another aspect, the carbohydrate formulation comprises at least one vitamin selected from the group consisting of vitamin B1, vitamin B2, vitamin B5, vitamin B6, vitamin B8 and vitamin B9.

According to another aspect, the amino acid formulation comprises at least one vitamin selected from the group consisting of vitamin B1, vitamin B2, vitamin B5, vitamin B6, vitamin B8 and vitamin B9.

According to another aspect, the trace element formulation of terminally heat-sterilized multi-chamber further comprises zinc (Zn), copper (Cu) and/or manganese (Mn).

According to another aspect, the vitamin formulation of the terminally heat-sterilized multi-chamber container further comprises vitamin B2 and/or vitamin B5.

According to another aspect, the vitamin formulation of the terminally heat-sterilized multi-chamber container further comprises vitamin A and optionally further comprises vitamin D, vitamin E, and/or vitamin K.

According to another aspect, the terminally heat-sterilized multi-chamber container further comprises at least one electrolyte comprising or selected from the group consisting of sodium ($Na^+$), chloride ($Cl^-$), potassium ($K^+$), magnesium ($Mg^{2+}$), calcium ($Ca^{2+}$), hydrogen phosphate ($HPO_4^-$), glycerophosphate ($C_3H_7O_6P^{2-}$), acetate ($CH_3COO^-$) and hydrogen carbonate ($HCO_3^-$). One or more of said electrolytes can be present in one or more chambers or formulations of the multi-chamber container, such as, for example, in the amino acid formulation, the glucose formulation and/or the trace element formulation.

According to another aspect, one or more of the said electrolytes are provided in the amino acid formulation.

According to another aspect, the carbohydrate and/or the trace element chamber of the terminally heat-sterilized multi-chamber container comprise calcium.

According to another aspect, the carbohydrate formulation of the terminally heat-sterilized multi-chamber container comprises glucose and at least one vitamin selected from the group consisting of vitamin B1, vitamin B3 and vitamin B6.

According to another aspect, the carbohydrate formulation of the terminally heat-sterilized multi-chamber container is an aqueous solution having a pH of from about 3.2 to about 5.5, and comprises:
 (a) from about 24.0 g to about 411.0 g glucose,
 (b) from about 0.1 g to about 1.5 g calcium,
 (c) from about 1.1 mg to about 10.0 mg vitamin B1,
 (d) from about 16 mg to about 115 mg vitamin B3, and
 (e) from about 0.5 mg to about 10.5 mg vitamin B6.

According to another aspect, the carbohydrate formulation of the terminally heat-sterilized multi-chamber container is an aqueous solution having a pH of from about 3.2 to about 5.5, and comprises:
 (a) from about 50 g to about 300 g glucose,
 (b) from about 0.2 g to about 1.5 g calcium,
 (c) from about 2.5 mg to about 10.0 mg vitamin B1,
 (d) from about 30 mg to about 115 mg vitamin B3, and
 (e) from about 2.5 mg to about 10.4 mg vitamin B6.

According to another aspect, the carbohydrate formulation of the terminally heat-sterilized multi-chamber container is an aqueous solution having a pH of from about 3.2 to about 5.5, and comprises:
 (a) from about 25 g to about 150 g glucose,
 (b) from about 0.1 g to about 1.3 g calcium,
 (c) from about 1.0 mg to about 7.5 mg vitamin B1,
 (d) from about 16 mg to about 50 mg vitamin B3, and
 (e) from about 0.5 mg to about 2.5 mg vitamin B6.

According to another aspect, the amino acid formulation of the terminally heat-sterilized multi-chamber container comprises at least one vitamin selected from the group consisting of vitamin B8, vitamin B9 and vitamin C.

According to another aspect, the amino acid formulation of the terminally heat-sterilized multi-chamber container is an aqueous solution having a pH of from about 5.0 to about 7.0, preferably of from about 6.0 to about 7.0, and comprises:
 (a) from about 8 g to about 223 g amino acids,
 (b) from about 17 µg to about 125 µg vitamin B8,
 (c) from about 120 µg to about 1000 µg vitamin B9,
 (d) from about 60 mg to about 340 mg vitamin C, and
 (e) optionally one or more electrolytes selected from the group of electrolytes comprising sodium, potassium, glycerophosphate, magnesium, calcium, acetate, and chloride.

According to another aspect, the amino acid formulation of the terminally heat-sterilized multi-chamber container is an aqueous solution having a pH of from about 5.0 to about 7.0, preferably of from about 6.0 to about 7.0, and comprises:
 (f) from about 20 g to about 200 g amino acids,
 (g) from about 50 µg to about 100 µg vitamin B8,
 (h) from about 200 µg to about 1000 µg vitamin B9,
 (i) from about 100 mg to about 300 mg vitamin C, and
 (j) optionally one or more electrolytes selected from the group of electrolytes comprising sodium, potassium, glycerophosphate, magnesium, calcium, acetate, and chloride.

According to another aspect, the amino acid formulation of the terminally heat-sterilized multi-chamber container is an aqueous solution having a pH of from about 5.0 to about 7.0, preferably of from about 6.0 to about 7.0, and comprises:
 (a) from about 8 g to about 70 g amino acids,
 (b) from about 17 µg to about 50 µg vitamin B8,
 (c) from about 120 µg to about 350 µg vitamin B9,
 (d) from about 60 mg to about 340 mg vitamin C, and optionally one or more electrolytes selected from the group of electrolytes comprising sodium, potassium, glycerophosphate, magnesium, calcium, acetate, and chloride.

According to another aspect, the trace element formulation of the terminally heat-sterilized multi-chamber container is an aqueous solution having a pH of from about 2.0 to about 4.0 and comprises:
 (a) from about 580 µg to about 7000 µg zinc,
 (b) from about 10 µg to about 120 µg selenium,
 (c) from about 80 µg to about 800 µg copper,
 (d) from about 1 µg to about 350 µg manganese, and optionally
 (e) from about 0 µg to about 3000 µg iron,
 (f) from about 0 µg to about 25 µg chromium,
 (g) from about 5 µg to about 200 µg iodine,
 (h) from about 0 µg to about 1500 µg fluorine, and
 (i) from about 1 µg to about 30 µg molybdenum.

According to another aspect, the trace element formulation of the terminally heat-sterilized multi-chamber container is an aqueous solution having a pH of from about 2.0 to about 4.0 and comprises:
 (a) from about 2000 µg to about 7000 µg zinc,
 (b) from about 10 µg to about 120 µg selenium,
 (c) from about 100 µg to about 800 µg copper,
 (d) from about 25 µg to about 350 µg manganese, and optionally
 (e) from about 250 µg to about 3000 µg iron,
 (f) from about 2 µg to about 25 µg chromium,
 (g) from about 50 µg to about 200 µg iodine,
 (h) from about 500 µg to about 1500 µg fluorine, and
 (i) from about 5 µg to about 30 µg molybdenum.

According to another aspect, the trace element formulation of the terminally heat-sterilized multi-chamber container is an aqueous solution having a pH of from about 2.0 to about 4.0 and comprises:
 (a) from about 580 µg to about 2800 µg zinc,
 (b) from about 10 µg to about 60 µg selenium,
 (c) from about 80 µg to about 300 µg copper,
 (d) from about 1 µg to about 30 µg manganese, and optionally
 (e) from about 0 µg to about 1000 µg iron,
 (f) from about 0 µg to about 5 µg chromium,
 (g) from about 5.0 µg to about 45 µg iodine,
 (h) from about 0 µg to about 250 µg fluorine, and
 (i) from about 1 µg to about 10 µg molybdenum.

According to another aspect, the trace element formulation of the terminally heat-sterilized multi-chamber container further comprises an organic acid selected from the group comprising (or consisting of) malic acid, tartaric acid, citric acid, maleic acid, and fumaric acid in a concentration of from about 50 mM to about 400 mM.

According to another aspect, the vitamin formulation of the terminally heat-sterilized multi-chamber container comprises vitamin B2, vitamin B5 and/or vitamin B12.

According to another aspect, the vitamin formulation of the terminally heat-sterilized multi-chamber container comprises:
 (a) from about 0.5 mg to 6 about. 0 mg vitamin B2,
 (b) from about 4.3 mg to about 45.0 mg vitamin B5, and
 (c) from about 0.7 µg to about 35.0 µg vitamin B12.

According to another aspect, the vitamin formulation of the terminally heat-sterilized multi-chamber container comprises:
(a) from about 2 mg to about 6 mg vitamin B2,
(b) from about 10 mg to about 40 mg vitamin B5, and
(c) from about 2 µg to about 30 µg vitamin B12.

According to another aspect, the vitamin formulation of the terminally heat-sterilized multi-chamber container comprises:
(a) from about 0.5 mg to about 4.0 mg vitamin B2,
(b) from about 4.3 mg to about 45.0 mg vitamin B5, and/or
(c) from about 0.7 µg to about 15.0 µg vitamin B12.

According to another aspect, the vitamin formulation of the terminally heat-sterilized multi-chamber container further comprises vitamin B2, vitamin B5, vitamin B12, vitamin A, vitamin D, vitamin K and/or vitamin E.

According to another aspect, the vitamin formulation of the terminally heat-sterilized multi-chamber container is a lipid emulsion having a pH of from about 5.0 to about 7.0, and comprises an aqueous phase and about 1% to about 20% by weight of an oil phase based on the total weight of the lipid emulsion.

According to another aspect, the vitamin formulation of the terminally heat-sterilized multi-chamber container contains no more than 1.5 ppm of dissolved oxygen.

According to another aspect, the terminally heat-sterilized multi-chamber container comprises a sixth chamber comprising:
(a) a lipid emulsion having a pH of from about 5.0 to about 9.0 which comprises an aqueous phase and about 1% to about 20% by weight of an oil phase based on the total weight of the lipid emulsion, and contains no more than 1.5 ppm of dissolved oxygen, and
(b) vitamin A and optionally at least one of the vitamins selected from the group consisting of vitamin D, vitamin K and vitamin E.

According to another aspect, the vitamin formulation of the terminally heat-sterilized multi-chamber container is an aqueous solution having a pH of from about 5.0 to about 7.0, and comprises vitamin B12 and optionally at least one vitamin selected from the group consisting of vitamin B2 and vitamin B5, and further comprises less than 1.5 ppm dissolved oxygen.

According to another aspect, the lipid formulation of the terminally heat-sterilized multi-chamber container comprises an aqueous phase and about 5% to about 35% by weight of an oil phase.

According to another aspect, the lipid formulation of the terminally heat-sterilized multi-chamber container comprises vitamin A and optionally at least one vitamin selected from the group consisting of vitamin D, vitamin K and vitamin E. According to yet another aspect, the lipid formulation of the terminally heat-sterilized multi-chamber container comprises vitamin A, vitamin D, vitamin K and/or vitamin E.

According to another aspect, the terminally heat-sterilized multi-chamber container comprises lipid-soluble vitamins in an amount of
(a) from about 215 IU to about 6600 IU vitamin A,
(b) from about 400 IU to about 1700 IU vitamin D,
(c) from about 8 IU to about 40 IU vitamin E, and
(d) from about 30 µg to about 650 µg vitamin K, respectively.

According to another aspect, the terminally heat-sterilized multi-chamber container comprises lipid-soluble vitamins in an amount of
(a) from about 500 IU to about 6000 IU vitamin A,
(b) from about 1000 IU to about 1500 IU vitamin D,
(c) from about 10 IU to about 40 IU vitamin E, and
(d) from about 100 µg to about 400 µg vitamin K, respectively.

According to another aspect, the terminally heat-sterilized multi-chamber container comprises lipid-soluble vitamins in an amount of
(a) from about 215 IU to about 6000 IU vitamin A,
(b) from about 400 IU to about 1500 IU vitamin D,
(c) from about 8 IU to about 25 IU vitamin E, and
(d) from about 30 µg to about 300 µg vitamin K, respectively.

According to another aspect, the terminally heat-sterilized multi-chamber container is terminally heat-sterilized by moist heat.

According to another aspect, the chambers of the terminally heat-sterilized multi-chamber container are separated from each other by non-permanent seals.

According to another aspect, the fourth and fifth chamber of the terminally heat-sterilized multi-chamber each have a volume of from about 2.5 mL to about 50 mL.

According to another aspect, the formulations in the terminally heat-sterilized multi-chamber container can be reconstituted by breaking the non-permanent seals separating the chambers from each other.

According to another aspect, the terminally heat-sterilized multi-chamber container is covered by an overpouch or overwrap, preferably by a light-protective overpouch that protects the formulations of the MCB from the impact of light, and preferably providing another moisture and/or gas barrier, such as, for example, aluminium foil or polypropylene films. It is possible to sterilize the MCB of the invention before overpouching it, but it can also be sterilized together with the overpouch. In this case, the overpouch material must be able to withstand heat-sterilization.

According to another aspect, an oxygen absorber or scavenger, such as, for example, absorbent material based on iron salts, is placed between the inner or primary bag and the overpouch.

According to another aspect, an oxygen indicator which indicates if oxygen has penetrated the overpouch and the product (see, for example, EP1909736B1) is added to the overpouched product.

According to another aspect, a terminally heat-sterilized parenteral nutrition formulation is provided which is reconstituted from a multi-chamber container according to the present invention.

According to another aspect, a terminally heat-sterilized parenteral nutrition formulation is provided which has a pH of from about 5.0 to about 7.2, preferably of from about 6.0 to about 7.0, and comprises lipids, amino acids, carbohydrates and (a) from about 10 µg to about 120 µg selenium,
(b) from about 215 IU to about 6600 IU vitamin A, and
(c) from about 0.7 µg to about 35.0 µg vitamin B12.

The terminally heat-sterilized parenteral nutrition formulation can be provided by reconstituting the aforementioned terminally heat-sterilized multi-chamber bag of the invention.

According to one aspect, the terminally heat-sterilized parenteral nutrition formulation further comprises:
(a) from about 580 µg to about 7000 µg zinc,
(b) from about 80 µg to about 800 µg copper, and
(c) from about 1 µg to about 350 µg manganese.

According to another aspect, the terminally heat-sterilized parenteral nutrition formulation further comprises:

(a) from about 400 IU to about 1700 IU vitamin D,
(b) from about 8 IU to about 40 IU vitamin E,
(c) from about 30 μg to about 650 μg vitamin K,
(d) from about 1.1 mg to about 10.0 mg vitamin B1,
(e) from about 16 mg to about 115 mg vitamin B3,
(f) from about 0.5 mg to about 10.5 mg vitamin B6,
(g) from about 17 μg to about 125 μg vitamin B8,
(h) from about 120 μg to about 1000 μg vitamin B9,
(i) from about 60 mg to about 340 mg vitamin C,
(j) from about 0.5 mg to about 6.0 mg vitamin B2, and/or
(k) from about 4.3 mg to about 45.0 mg vitamin B5.

According to another aspect, terminally heat-sterilized parenteral nutrition formulation further comprises:
(a) from about 0 μg to about 3000 μg iron,
(b) from about 0 μg to about 25 μg chromium,
(c) from about 5 μg to about 200 μg iodine,
(d) from about 0 μg to about 1500 μg fluorine, and/or
(e) from about 1 μg to about 30 μg molybdenum.

According to another aspect, terminally heat-sterilized parenteral nutrition formulation comprises from about 20 g/L to about 40 g/L of lipids, from about 60 g/L to about 160 g/L of glucose, and from about 20 g/L to about 80 g/L of amino acids.

According to another aspect, the parenteral nutrition formulation comprises from about 0.3 g to about 4.5 g of sodium acetate trihydrate, from about 0.4 g to about 6.8 g potassium chloride, from about 0.1 g to about 3.0 g of magnesium chloride hexahydrate, from about 0.5 to about 11.0 g of sodium glycerophosphate, hydrated, and from about 0.08 g to about 1.6 g of calcium chloride dihydrate.

According to another aspect, the parenteral nutrition formulation comprises from about 0.5 g to about 1.5 g or from about 1.0 g to about 3.2 g of sodium acetate trihydrate, from about 0.6 g to about 2.0 g or from about 1.8 g to about 4.5 g of potassium chloride, from about 0.2 g to about 0.8 g or from about 0.6 g to about 2.0 g of magnesium chloride hexahydrate, from about 1.0 g to about 3.0 g or from about 2.7 g to about 8.0 g of sodium glycerophosphate, hydrated, and from about 0.1 g to about 0.5 g or from about 0.4 g to about 1.2 g of calcium chloride dihydrate.

According to another aspect, the terminally heat-sterilized parenteral nutrition formulation comprises from about 1.0 to about 1.6 g/L of sodium acetate trihydrate, from about 1.0 g/L to about 2.5 g/L potassium chloride, from about 0.3 g/L to about 1.0 g/L of magnesium chloride hexahydrate, from about 1.5 to about 4.0 g/L of sodium glycerophosphate, hydrated, and from about 0.1 g/L to about 0.8 g/L of calcium chloride dihydrate.

According to another aspect, the terminally heat-sterilized multi-chamber container and the parenteral nutrition formulation reconstituted therefrom comprise excipients.

According to another aspect, the terminally heat-sterilized multi-chamber container or the parenteral nutrition formulation reconstituted therefrom comprise one or more excipients selected from excipients such as, for example, purified egg phosphatide, glycerol, sodium oleate, sodium hydroxide, acetic acid, hydrochloric acid, malic acid, MCT oil, or nitrogen.

According to another aspect, the parenteral nutrition formulation reconstituted from the terminally heat-sterilized multi-chamber container is provided to a patient when oral or enteral nutrition is impossible, insufficient, or contraindicated.

According to another aspect, the patient to whom the parenteral nutrition formulation reconstituted from the terminally heat-sterilized multi-chamber container is provided is an adult or an adolescent patient.

According to another aspect, the terminally heat-sterilized multi-chamber container and the parenteral nutrition formulation reconstituted therefrom are designed for providing parenteral nutrition to patients in a hospital or home setting. According to another aspect, the terminally heat-sterilized multi-chamber container and the parenteral nutrition formulation reconstituted therefrom are designed for providing home parenteral nutrition (HPN) patients.

BRIEF DESCRIPTION OF THE DRAWINGS

FIG. 1 (including FIG. 1A, FIG. 1B and FIG. 1C) is a set of schematic depictions of a multi-chamber bag according to the invention, comprising five chambers which contain a carbohydrate formulation (1), an amino acid formulation (2), a lipid formulation (3), a trace element formulation (4) and a vitamin formulation (5). FIG. 1C further shows a schematic depiction of a six-chamber bag according to the invention, which comprises two vitamin formulations (5A) and (5B), one an aqueous solution ($V_{aq}$) and one a lipid emulsion ($V_{LE}$), both accommodating certain vitamins. Besides the vitamin formulation (5), or (5A) and (5B), vitamins can also be comprised in the lipid formulation, in the carbohydrate formulation, and in the amino acid formulation. Electrolytes can be present in one or more of the formulations, and can, for example, be accommodated at least in part in the amino acid formulation, the glucose formulation and/or the TE. Generally, the electrolytes will be located in more than one of the formulations, generally in two or three, but can also be present in only one of the formulations. The MCB can include an administration tube (7) which is, for example, in fluid communication with the amino acid chamber (2), and a medication tube (8) which can also be in fluid communication with the amino acid chamber (2). The medication tube (8) provides communication with the interior of the amino acid chamber (3) and the final, reconstituted formulation, respectively, and can be equipped with a seal such as a septum that allows components such as a liquid drug to be added to chamber (2) or to the container after the contents of the chambers have been mixed. Tube (7) can also include a membrane that seals shut the tube, and which can be pierced by, for example, a cannula or spike of an administration set. Tube (7) can be sealed until the time to access the contents of the container. The remaining tubes, such as tube (6) and corresponding tubes, can be used to fill the respective chambers and will generally be sealed afterwards. The MCB will generally also include a hanger (9).

FIG. 3 (including FIG. 3A, FIG. 3B and FIG. 3C) is a set of graphs showing the recovery of cyanocobalamin (FIG. 3A) and hydroxocobalamin (FIG. 3B) depending on $C_0$. Also shown is the recovery of vitamin B12 in total, as a combination of hydroxocobalamin (FIG. 3C). With rising $C_0$, recovery of cyanocobalamin decreases. At the same time, recovery of hydroxocobalamin increases as a result of the transformation of cyanocobalamin. The overall vitamin B12 recovery therefore remains relatively stable for a $C_0$ of about up to 120 minutes.

FIG. 7 (including FIG. 7A and FIG. 7B) is a set of graphs showing the influence of (A) an oxygen semipermeable bag material and (B) an oxygen-impermeable bag material on selenite stability (RT).

FIG. 8 (including FIG. 8A and FIG. 8B) is a set of graphs depicting the influence of headspace and the presence of a port tube on DO concentration in a solution containing a selenium (selenite) containing TE composition (FIG. 8A). An oxygen-impermeable bag material is used for the analysis. FIG. 8B is specifically directed at the headspace volume. DO is consumed by redox reactions in the solution, see open black circles, dashed line, or otherwise lost from the container. 2 ml headspace per 25 ml container/chamber volume or 15 ml solution is not fully sufficient to retain DO (black triangles). With 6 ml headspace the threshold of 0.5 ppm can be met even if a port tube is present (grey square, continues line) and is fully sufficient if a port tube is absent (grey square, dashed line). Best results are obtained with a headspace of 10 ml per 15 ml solution of the chamber/container (filled grey circles, continuous line), even if a port tube is present (filled grey circles, dashed line).

FIG. 9 refers to a solution containing selenium as sodium selenate.

FIG. 10 refers to a solution containing selenium as selenomethionine.

FIG. 11 refers to a solution containing selenium as selenite.

DETAILED DESCRIPTION OF THE INVENTION

Figure 2:
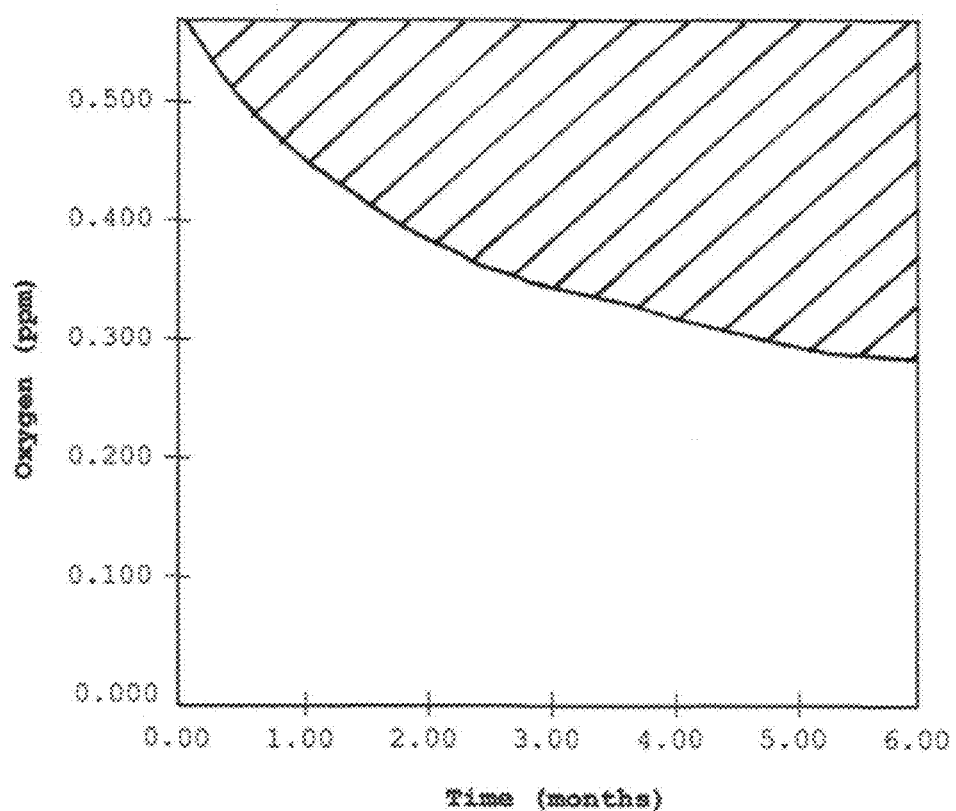
FIG. 2 is a diagram depicting the dependency of vitamin A recovery on the presence of dissolved oxygen over time.

The present invention generally relates to the field of parenteral nutrition. More particularly, the present invention relates to formulations for parenteral administration that are provided in a terminally heat-sterilized multi-chamber container having at least five chambers, wherein the formulations stably provide a combination of lipids, carbohydrates, amino acids, vitamins and trace elements in a manner that they are ready to be used for administration to a patient and meet the nutritional requirements of current guidelines for parenteral nutrition without further addition of further substances. Related embodiments described herein relate to multi-chamber containers that optionally have a sixth chamber. Further related embodiments relate to the formulations reconstituted from such five or six chamber bags and their use for parenteral nutrition of patients in need thereof.

Parenteral nutrition products, specifically for total parenteral nutrition, should provide for all macronutrients and micronutrients that allow for a safe and sustainable parenteral nutrition which addresses all the nutritional needs of a patient for whom oral or enteral uptake of nutrients is impossible, insufficient or contraindicated. Today, when providing parenteral nutrition in the form of ready-to-use multi-chamber containers, at least some relevant micronutrients are typically added to nutrition bags before administration because they are not contained in such products. For this purpose, vitamins are, for example, provided in glass vials in the form of lyophilizates or solutions to be reconstituted and/or mixed into the nutrition/infusion bags. Trace elements are also provided in glass vials or polypropylene ampules meant to be mixed into infusion bags prior to administration. Prior to usage, referring to the start of administering the formulation to the patient, the micronutrients are sometimes added to the nutrition solution via the medical port of the container or bag, or are added via a Y-connector to the infusion line. As mentioned before, these processes take time and several handling steps are required, thereby increasing the risk of medication errors and/or bacterial contamination. In addition, significant amounts of waste are generated, such as ampoules, gloves, lines, and syringes that are only needed for the mixing or addition of micronutrients and are then discarded.

To avoid these problems, it would seem a straightforward solution to provide ready-to-use "all-in-one" products that accommodate all relevant macro- and micronutrients products as well as electrolytes. However, it is persistently difficult to stably accommodate vitamins and trace elements that are deemed relevant for meeting the patients' needs in one terminally heat-sterilized product. For example, incompatibilities may occur when mixing vitamin and trace elements in the same preparation, and/or certain vitamins cannot withstand the terminal heat-sterilization of the product, which is, however, a preferable way of excluding bacterial contamination. Ways to tackle these issues encompass the aforementioned addition of vitamins and/or trace elements to such PN products before administration, or by aseptic filtration of formulations comprising vitamins and trace elements in order to avoid the impact of heat during terminal heat-sterilization. However, the aseptic filtration of nutrition products is a complex process in case of MCBs and generally means that lipids are not included in such products as the aseptic filtration of lipids or lipid emulsions is difficult.

The present invention addresses the issue by a careful design of separate formulations within a multi-chamber bag (MCB) that allows to include, into one MCB, trace elements and vitamins that so far could not be stabilized in such terminally heat-sterilized, ready-to-use PN products. The formulations are designed in a way that they can stably accommodate certain macro- and micronutrients together, in one terminally heat-sterilized MCB, over a prolonged time, including a shelf-life of up to 24 months without the need of cooling or refrigeration, and which can be reconstituted for immediate administration without further manipulation and handling and without loss of the included sensitive vitamins and trace elements.

Unless defined otherwise, all technical and scientific terms used herein have the same meaning as commonly understood by one of ordinary skill in the art to which this invention belongs. As used herein the following terms have the following meanings.

The expression "comprising" or "comprises," as used herein, is intended to mean that the compositions and methods include the recited elements, but not excluding others.

The expression "about," when used before a numerical designation, e.g., temperature, time, amount, and concentration, including range, indicates approximations which may vary by (+) or (−) 10%, 5% or 1%.

As used herein, the expression "nutrient" refers to a substance used by an organism, such as a human, to survive, grow, and reproduce. Some nutrients can be metabolically converted to smaller molecules in the process of releasing energy, such as carbohydrates and lipids. All organisms require water. Essential nutrients for animals and humans are the energy sources, some of the amino acids that are combined to create proteins, a subset of fatty acids, vitamins, and certain minerals and trace elements.

A classification used primarily to describe nutrient needs of humans and animals divides nutrients into "macronutrients" and "micronutrients". Consumed in relatively large amounts, macronutrients are used primarily to generate energy or to incorporate them into tissues for growth and repair. Specifically, the expression "macronutrient" or "macronutrients" refers to nutrients comprising carbohydrates, amino acids, and lipids.

"Micronutrients" are essential elements required by humans in small quantities throughout life for a range of physiological functions to maintain health. In the context of the present invention, the expression "micronutrients" refers to vitamins and trace elements. In the context of the invention, trace elements may be provided, for example, as chloride or sodium salts, as gluconates or sulfates.

The expression "carbohydrates" generally refers to the group of compounds including sugars, starches, and cellulose. In the context of the present invention, the expression refers to carbohydrates that can be used in formulations for parenteral nutrition, specifically to glucose, fructose and xylitol. It especially refers to glucose (D-glucose or dextrose). The expression is interchangeably used with the expression "saccharide(s)".

The expression "amino acids" as used herein, refers to amino acids as well as to dipeptides and oligopeptides, and encompasses, for example, alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), acetyl-tyrosine (Ac-Tyr), Acetylcysteine (Ac-Cys), taurine, asparagine (Asn), alanyl-glutamine (Ala-Gln), glycylglutamine (Gly-Gln), alanyl-tyrosine (Ala-Tyr) and glycyl-tyrosine (Gly-Tyr).

The expression "lipids" (or, as interchangeably used herein, the expression "fats") refers to sources of fatty acids (FA) that can be used for parenteral nutrition. Lipids consist of triglycerides (TGs), and phospholipids. TGs constitute molecules of glycerol to which three fatty acids (FAs) have been esterified. FAs are an important component of lipid emulsions that can be used for providing lipids to a patient intravenously. FAs are classified based on several characteristics including the carbon chain length, degree of unsaturation, and location of the first double bond. Short chain FAs (SCFAs) have 2-4 carbons, medium chain FAs (MCFAs) have 6-12 carbons, while long chain FAs (LCFAs) have more than or equal to 14 carbons. Saturated FAs have no double bonds, monounsaturated FAs (MUFAs) have one double bond, and polyunsaturated FAs (PUFAs) have two or more double bonds. Saturated lipids can be sub-classified into short chain, medium chain, and long chain lipids whereas mono- and polyunsaturated lipids are all long chain lipids.

The expression "home parenteral nutrition" as used herein means nutrition support of patients who cannot meet their nutritional requirement by oral or enteral intake, and who are able to receive therapy outside the hospital setting. HPN is the primary life-saving therapy for patients with, for example, chronic intestinal failure (CIF). HPN may also be provided as palliative nutrition to patients in late phases of end-stage diseases, including cancer (Pironi et al.: ESPEN guideline on home parenteral nutrition. Clinical Nutrition (2020), 39:1645-1666).

The expression "total parenteral nutrition (TPN)" refers to parenteral nutrition that provides all daily nutritional requirements intravenously to patients who cannot otherwise ingest and/or digest nutrition. TPN can be a short-term or long-term nutritional therapy. "Partial parenteral nutrition (PPN)" refers to parenteral nutrition to patients whose nutritional requirements cannot be fully met via the enteral or oral route. TPN and PPN can be provided to hospitalized patients, including patients in intensive care, but also to home parenteral patients, to avoid malnutrition.

The expression "terminally sterilized" means that such products must have a probability of nonsterile unit (PNSU) or a sterility assurance level (SAL) of not more than one in a million units produced, in accordance with the guidelines in Europe and the United States. SAL has been defined by European Pharmacopoeia in such a way that its numerical value is the same of PNSU. Accordingly, a SAL or PNSU of $10^{-6}$ indicates that the probability of an organism surviving to the end of the sterilization process in any single unit of product is less than one in one million. The proof that a terminally sterilized product complies with the $10^{-6}$ SAL/PNSU can be accomplished by several different sterilization cycle development approaches. The proper application of this method requires extensive scientific knowledge regarding the sterilization method selected for use with a specific product. Further background information is provided, for example, in von Woedtke and Kramer, GMS KHI (2008), 3(3), 1-10 (ISSN 1863-5245). The expression "sterility" or "sterile" means the absence of all viable microorganisms including viruses. The expression "terminal heat-sterilization" means that terminal sterilization is achieved by subjecting the product to be sterilized to heat.

As used herein, the expression "reconstituted solution" as used herein refers to a solution for parenteral administration which is generated by admixing the content of the chambers of a multi-chamber container before use. Generally, all chambers or compartments are admixed for reconstituting a multi-chamber bag. However, it is also possible to provide MCBs that support the selective activation of the peelable seals to permit the admixing of less than all of the separately stored components. The resulting solution, e.g. in case at least one of the compartments of the MCB is not activated, such as, for example, the chamber comprising the lipid emulsion, would still be considered a "reconstituted solution" according to the invention.

As used herein, the expression "multi-chamber bag (MCB)" which is interchangeably used herein with the expression "multi-chamber container", refers to containers or bags made from a flexible film material and which are compartmentalized into two or more chambers. They allow for the safe and stable accommodation of medical solutions that must be kept separate until the formulations can be mixed (reconstituted) shortly before their administration to a patient to avoid inevitable reactions between the formulations. Therefore, MCBs have peelable seals or welds (e.g., removable thermo-welds) between the chambers to be reconstituted. The weld or seals can be opened, for example, by squeezing.

The expression "adult(s)" or "adult patient(s)" as used herein refers to persons of 19 years of age and older. The expression "pediatric" as used herein refers to neonates, including premature (pre-term), full term, and post-mature neonates of up to (and including) 5 months of age; infants of between six month and of up to (and including) 24 months of age; children of between 2 years and of up to (and including) 12 years of age, and adolescents of between 13 and up to (and including) 18 years of age.

The expression "stable" or "stably" as used herein in connection with components of the terminally heat-sterilized MCB of the invention (e.g., vitamin or trace element formulations) means that at least 50%, at least 60%, at least 70% or at least 80% of the amount of such component initially provided in the product is still available after terminal heat-sterilization and storage of the terminally heat-sterilized multi-chamber bag of the invention for at least 6 months, preferably for at least 12 months, and more preferably for at least 18 months and even more preferably for at least 24 months at a temperature of from 1° C. to 40° C., such as at temperatures of from 1° C. to 25° C. For example, at least 50%, at least 60%, at least 70% or at least 80% of the amount of such component initially provided in the product is still available after terminal heat-sterilization and storage of the terminally heat-sterilized multi-chamber bag of the invention for at least 6 months, preferably for at least 12 months, at a temperature of up to 40° C. Preferably, at least 80%, at least 85%, at least 90% and at least 95% of the component provided in the MCB of the invention at the time it is produced is still available after terminal heat-sterilization and storage of the terminally heat-sterilized MCB of the invention for at least 6 months, preferably for at least 12 months, at a temperature of up to 40° C., such as from 30° C. to 40° C.; and for at least 12 months, for at least 18 months and preferably for at least 24 months at a temperature of up to 25° C., such as from 1° C. to 25° C.

The term "dissolved oxygen" (DO) refers to the level of free, non-compound oxygen present in water or other liquids or solutions, such as solutions for parenteral nutrition. Oxygen saturation (symbol SO2) is a relative measure of the concentration of oxygen that is dissolved or contained in a given medium as a proportion of the maximal concentration that can be dissolved in that medium. It can be measured with a dissolved oxygen probe such as an oxygen sensor or an optode in liquid media, usually water.

The present disclosure provides for a multi-chamber bag which addresses the problems of accommodating vitamins and trace elements together with all macronutrients, i.e. lipids, carbohydrates and amino acids, in one large-volume, terminally heat-sterilized multi-chamber bag by providing for at least five chambers which accommodate a carbohydrate formulation in a first chamber, an amino acid formulation in a second chamber, a lipid formulation in a third chamber, a trace element formulation in a fourth chamber and a vitamin formulation in a fifth chamber.

The major reason for adding reconstituted micronutrients and in particular vitamins that have been reconstituted from lyophilized formulations to macronutrients or the reconstituted mixture of an MCB directly before administration is that some vitamins have significant stability issues when provided in liquid ready-to-use products. Vitamin A and vitamin C are two major examples (Ferguson et al. A Review of Stability Issues Associated with Vitamins in Parenteral Nutrition; Clinical Nutrition ESPEN 2014, vol. 9 issue 2). However, as vitamin A as well as vitamin C are regarded as an essential vitamin required in total PN (TPN), it must be a component of an "all-in-one" ready-to-use formulation. Vitamin A is generally difficult to stabilize. For one, vitamin A, or retinol, is the most light-sensitive micronutrient found in PN admixtures besides vitamin B1 and also, to some extent, vitamin C and vitamin B12. For example, when subjected to light in unprotected bags or administration sets, it undergoes extensive photodegradation. Known approaches of stabilizing vitamin A compounds in a liquid preparation for PN have placed vitamin A together with the other lipid-soluble vitamins in the lipid formulation or, alternatively, include stabilizing vitamin A in a lipid-containing lyophilized mixture with other vitamins for later addition to the PN product. Since it is known that vitamin A is light sensitive, light protection has also been used in the state of the art (e.g., in the form of an appropriate container such as brown glass or aluminum covers around flexible bags). For example, the product Vitalipid® (Fresenius Kabi) comprises vitamin A together with vitamins D2, K1 and E in a lipid emulsion provided in a 10 mL ampoule which contains, per 1 mL, 100 mg soy oil, 12 mg egg lecithin and 22 mg glycerol. The lipid emulsion is added to parenteral nutrition formulations for injection before administration to the patient. Furthermore, sorption of retinol may occur with bags and administration set tubing, further reducing the amount of vitamin A being administered to the patient. This problem has been much reduced by using the less reactive palmitate ester, rather than the acetate ester. The introduction of tubing containing polyolefin, which is free of PVC, plasticizers, adhesives, or latex, has further reduced the adsorption of vitamin A. The amount of vitamin A is specified in international units (IU). 1 IU vitamin A is equal to 0.3 µg retinol and 1.8 µg β-carotene. Vitamin A amounts may also be specified in retinol equivalents (RE). One RE corresponds to 1 µg retinol and 6 µg β-carotene (dissolved in oil).

Still, these measures, when scrutinized, are not sufficient to allow for a product according to the invention, which stably provides vitamin A in a terminally heat-sterilized MCB.

For example, it is known that another source of degradation of vitamins are peroxides which are generated by lipid emulsions such as contained as a micronutrient source in PN formulations (see, for example, Hoff et al., put the hours *Effects of Light Exposure on Total Parenteral Nutrition and its Implications in the Neonatal Population*, J Pediatr Pharmacol Ther 2009; 14:132). Lipid emulsions containing polyunsaturated fatty acids (PUFAs) are at an increased risk of peroxidation. Vitamin E acts as a major scavenger for free radicals and prevents lipid peroxyl radicals from reacting with fatty acid side chains. Nevertheless, peroxidation still occurs to some degree and further investigation is required to understand the relationship between the composition of lipid emulsions and the degradation of vitamins, specifically of vitamin A, when provided in the lipid formulation of a PN product.

There have been descriptions of products including lipid soluble vitamins such as vitamin A into the chamber containing the lipid formulation to prevent dissociation, oxidation, and isomerization. However, while such an approach may give vitamin A at least some protection, it is not enough to stabilize it efficiently for use in a terminally heat-sterilized PN product according to the invention with a shelf-life of at least 12 to 24 months without the need to refrigerate or otherwise specifically treat such product (Ferguson et al. *A Review of Stability Issues Associated with Vitamins in Parenteral Nutrition*; Clinical Nutrition ESPEN 2014, vol. 9 issue 2). Consequently, some experts believe that the best way of reliably providing the required amounts of vitamin A in the context of TPN is the provision of a stand-alone formulation that should be combined with the other required nutrients at the time of administration.

Accordingly, there is no TPN product available at the moment that provides sufficient amounts of prestored vitamin A in a ready-to-use AIO parenteral nutrition product that is sufficiently stable for prolonged storage, such as 6, 12 or even 24 months at temperatures of up to at least 25° C. and up to 40° C. as defined herein, which would be required in many countries if storage is intended at room temperature. In particular, it has so far not been possible to stabilize vitamin A in standard parenteral nutrition products which contain a variety of different compounds in flexible multi-chamber bags, which in addition have to undergo terminal heat sterilization to be compliant with, for example, Unites States and European Pharmacopoeia requirements. As mentioned before, a technical problem underlying the present invention is to provide a preferably terminally heat-sterilized and ready-to-use AIO PN product, such as an MCB, that stably contains vitamins prone to degradation for various reasons. In particular, it is difficult to provide a multi-chamber bag comprising macronutrients selected from lipids, carbohydrates and amino acids, peptides and proteins, and micronutrients comprising vitamins and trace elements, wherein the terminally heat-sterilized multi-chamber bag also stably comprises vitamin A.

Vitamin B12 is another example of a relevant but critical vitamin in terms of stability in heat-sterilized multi-chamber bags. Vitamin B12, also known as cobalamin, is a water-soluble vitamin involved in the metabolism of every cell of the human body. It is a cofactor in DNA synthesis, and in both fatty acid and amino acid metabolism. It is particularly important in the normal functioning of the nervous system via its role in the synthesis of myelin, and in the maturation of developing red blood cells in the bone marrow. Vitamin B12 is generally considered to be stable under most food processing operations, but like all water-soluble vitamins, it is subject to large losses upon heating of up to 100° C. in solution (Leskova et al. Journal of Food Composition and Analysis; 19 (2006), 252-276), and is therefore a notorious issue for terminally heat-sterilized IV products. The most important associated compound with vitamin B12 activity is cyanocobalamin, which is decomposed by both oxidizing and reducing agents. In neutral and weak acid solutions, it is relatively stable to both atmospheric oxygen and heat. It is only slightly stable in alkaline solutions and strong acids. The stability of vitamin B12 is significantly influenced by the presence of other vitamins. Vitamin B12 is normally stable during pasteurization, but is instable during sterilization, which is usually associated with considerable losses of vitamin B12. Accordingly, it is difficult to stabilize vitamin B12 in terminally heat-sterilized nutritional products for parenteral nutrition. There is no terminally heat-sterilized ready-to-use (AIO) parenteral nutrition product available, such as a MCB, which stably comprises vitamin B12 for providing total or partial parenteral nutrition to a patient. In particular, there is no terminally heat-sterilized TPN product available that provides pre-packaged, prestored vitamin B12, together with all other required micronutrients and macronutrients, in a ready to use liquid formulation for injection that is sufficiently stable for prolonged storage, such as 6, 12 or even 24 months. Known problems with vitamin B12 in such products encompass the heat-sensitivity of vitamin B12, which makes it difficult to make it a component of said AIO or MCB product, as these generally have a relatively high volume and therefore require a higher exposure to be terminally heat-sterilized. In addition, vitamin B12 is sensitive to the presence of other regular components of such parenteral nutrition products, including macronutrients, such as amino acids or carbohydrates, certain other vitamins and/or certain trace elements. In combination with issues around determining optimal pH and redox conditions for all components of such MCB products, vitamin B12 so far withstood many attempts to stably include it in terminally heat-sterilized PN products as mentioned before.

Other vitamins have similar stability issues. For example, vitamin B1, in the context of the present invention, was found to be stable at a pH below 6.0, but to be sensitive to heat and light, may cause degradation of vitamin B9, vitamin B2, vitamin C and vitamin B12, and is itself degraded when present in its thiamin carboxylase form in the glucose matrix. Another example is vitamin B2, which was found to be stable at a broader pH range but is sensitive to heat and light. It was also found that vitamin B2 may be incompatible with vitamins B1 and C and, under certain conditions, with vitamin B12. It is degraded in lipid emulsions under certain pH conditions after sterilization and throughout shelf-life. Accordingly, in order to be able to accommodate vitamin B2, it was found that it should be provided in a separate chamber with vitamin B12, but this is only possible upon careful selection of the pH conditions in such chamber to avoid an impact on vitamin B12. Vitamin B3, a relatively stable vitamin, was found to negatively impact, under certain conditions, the stability of vitamin B12. Vitamin B5 is sensitive to heat. Vitamin B6, in the context of the present invention, was found to be sensitive to light and heat and may cause degradation of vitamin B12. Vitamin B8 was found to be more stable in the presence of vitamin B9 and be stable mainly at a pH of from 5 to 8. Vitamin B9, in turn, is stable at a pH of above 6, but was found to be sensitive to light and towards the presence of vitamins B1, C, and/or B2 under certain conditions. Vitamin C, as mentioned before, was found to be sensitive to light, heat and/or oxygen, and sensitive to vitamins B1 and B2 under certain conditions. Vitamin D cannot be introduced into an aqueous matrix, is sensitive to light and heat as well as oxygen. Vitamin E cannot be introduced into an aqueous matrix and is also light an oxygen sensitive.

In consequence, while it is comparatively easy to prepare formulations comprising only one or maybe two of the above mentioned vitamins, depending on their respective requirements, it is a significant and so far unsolved challenge to accommodate more or even all of them in one terminally heat-sterilized multi-chamber bag without compromising on stability or resorting to not include them and recommend adding them before administering the reconstituted MCB formulation. It is necessary not only to adjust the specific conditions for each vitamin, but to find an optimal distribution of vitamins over a set of formulations with relatively fixed conditions, develop adjusted and/or new ways to formulate the compounds involved to design formulations which allow the stabilization of preferably more than one vitamin in one formulation, and in addition allow terminally heat-sterilizing the various formulations in one single MCB. As a result, providing an MCB according to the invention is a major, so far unsolved challenge as it needs to satisfy several conflicting requirements. Interestingly, while there is some prior art that proposes combinations and distribution of vitamins and/or trace elements in MCBs, no product such as suggested herein ever could be realized and be brought to the market. The said prior art suffers from taking a theoretical approach which, without the in-depth analysis performed in the context of the present invention and the development of new and inventive solutions to address exactly the obstacles identified in such analysis, does not provide for the means to actually put such theoretically conceived formulations and MCBs such as described herein into practice.

Because of the above, to date there is no terminally heat-sterilized, ready-to-use, all-in-one (AIO) product for parenteral administration available that stably comprises a solution for parenteral administration to a patient in need thereof comprising, for example, vitamin A and vitamin B12 in a way that ensures stability over a prolonged period of time. Products which provide for carbohydrate and amino acid solutions in dual chamber bags and which also comprise vitamin A are known, such as, for example, Elneopa or Neoparen (both Otsuka Pharmaceutical Factory, Inc.) or Onepal (AY Pharmaceuticals Co., Ltd.). However, such products do not provide for a lipid emulsion. Ready-to-use products comprising a lipid emulsion formulation, generally in a 3-chamber container, are more complex in production and cannot be readily sterilized by aseptic filtration, which is generally the way to avoid the negative impact of heat on the stability of certain vitamin and also trace elements.

In addition, it is important to note that such products tend to have lower total volumes than the products contemplated herein, which also comprise a lipid emulsion formulation. Products according to the invention may have volumes of more than 2000 mL, such as 2100 mL, 2300 mL, 2400 mL or 2500 mL, even though they may also have volumes of below 1000 mL, such as about 700, 800 or 900 mL (which can still be considered large volumes). This is an important aspect, as higher volumes also require a higher heat exposure during heat sterilization which is an issue for many vitamins as mentioned before. So, even in case of terminal heat-sterilization, the required heat exposure is or would be lower for the above-mentioned lipid-free products than for products also encompassing lipid emulsion formulations, such as in the present invention. Accordingly, a specific challenge to address in the context of the present intention was to overcome the impact of a relatively high heat exposure required for terminally heat-sterilizing high volume MCBs on top of the already existing sensitivity of many compounds, such as the above-mentioned vitamins, towards light, oxygen, pH and/or other the presence of other compounds.

Another specific challenge that could be addressed by the present invention was to stabilize all critical components within one single multi-chamber bag without using unwanted excipients or stabilizers that should be avoided to exclude any potential health impact. Products that have succeeded in providing at least some of the discussed vitamins and/or trace elements within one product, such as Elneopa and Onepal, rely on the use of, for example, sodium bisulfite, chondroitin sulfate, macrogol 400, succinic acid, citric acid and/or polsorbate 20 and 80. The use of sodium bisulfite and other bisulfites that are used as antioxidants is no longer recommended due hypersensitivity risks (Belayneh et al. *Safety and Biopharmaceutical Challenges of Excipients in Off-Label Pediatric Formulations*. Int J Gen Med 2020. 13:1051-1066). Chondroitin sulfate and Macrogol 400 can also be avoided in the MCB according to the invention. For example, succinic acid, which serves as complexing agent, carries the risk of impacting the trace element bioavailability. In contrast, the terminally heat-sterilized multi-chamber bag according to the invention, based on the respective formulations and careful distribution of components, provides for stability of the complete product without using any of the above-mentioned excipients.

It was thus a significant achievement made in the context of the present invention that many vitamins as well as trace elements that are recommended according to current guidelines, but could not be provided so far in ready-to-use and terminally heat-sterilized parenteral nutrition products can now be provided in the formulations in a stable way and without having to use unwanted excipients, thereby removing another concern connected to such products. The concentration of the macronutrients and electrolytes as well as of the vitamins and trace elements that can be provided in the terminally heat-sterilized MCB of the invention can be varied over a broad range without deviating from the invention. Typical concentrations used in MCB that provide for macronutrients and optionally electrolytes as well as typical concentrations or daily amounts recommended per kg and day are generally known in the art and are otherwise described in some detail in guidelines for the parenteral nutrition of patients of different ages, such as pediatric and adult patients. If not expressly indicated otherwise, the amounts described herein, e.g., in Tables I and II, encompass amounts as provided in MCBs of different sizes, i.e., from about 300 mL (reconstituted volume) to about 3000 mL (reconstituted volumes) and for different patient groups, including pediatric patients, specifically neonates (pre-term and term), infants and children, as well as adolescent and adult patients. As will be readily discernible from the disclosure, lower amounts and volumes as indicated herein are preferred for terminally heat-sterilized MCBs according to the invention that are provided for said pediatric patients, specifically neonates (pre-term and term), infants and children, whereas higher amounts and volumes as disclosed herein are preferably provided for adult, or, as the case may be, adolescent patients.

Vitamins that can stably be added to the said terminally heat-sterilized MCB according to the invention encompass at least the ones shown in Table I. Even though the vitamins can be added in various forms to the formulations as shown there, if not prohibited due to certain incompatibilities, Table I provides for specifically suitable forms of the vitamins that can be used according to the invention to achieve a high stability of the respective vitamins within their respective preferred formulations and in the reconstituted solution.

TABLE I

Vitamins, their preferred forms, and preferred amounts as provided in the terminally heat-sterilized multi-chamber container and reconstituted solution according to the invention. The underlined form of a given vitamin is an especially suitable form according to the invention; however, the alternative forms can also be used. Also shown are recommended amounts of the vitamins according to currently applicable guidelines (ASPEN and auSPEN, see Mirtallo et al., *JPEN J Parenter Enteral Nutr.* 2004, 28(6): S39-S70; Vanek et al., A.S.P.E.N. *Nutrition in Clinical Practice* 2012, 27: 440-491; Osland et al., Australasian Society for Parenteral and Enteral Nutrition (AuSPEN) adult vitamin guidelines for parenteral nutrition. *Asia Pac J of Clin Nutr* 2016, 25(3): 636-650.

| Vitamin | Form | Invention | ASPEN 2004 and 2012 | AuSPEN 2016 |
|---|---|---|---|---|
| Vitamin A (IU#) | Retinol palmitate; Retinol acetate; Retinol propionate | 215-6600 | 3300 | 3500 |
| Vitamin D3* (IU) | Cholecalciferol; Ergocalciferol | 400-1770 | 200 | 200 |
| Vitamin E (IU) | Alpha-Tocopherol; Alpha-Tocopherol acetate; Alpha-Tocopherol succinate; Alpha-Tocopherol nicotinate | 8-40 | 10 | 10 |
| Vitamin C (mg) | Ascorbic acid; Sodium ascorbate; Ascorbyl palmitate | 60-340 | 200 | 110-150 |
| Vitamin B1 (mg) | Thiamin chloride; Thiamin mononitrate; Cocarboxylase | 1.1-10.0 | 6 | 3 |
| Vitamin B2 (mg) | Riboflavin sodium phosphate; Riboflavin | 0.5-6.0 | 3.6 | 4-5 |
| Vitamin B6 (mg) | Pyridoxine hydrochloride; Pyridoxine phosphate; Pyridoxal phosphate | 0.5-10.5 | 6 | 3 |
| Vitamin B12 (µg) | Cyanocobalamin; Hydroxocobalamin; Cobalamin | 0.7-35.0 | 5 | 5-6 |
| Vitamin B9 (µg) | Folic acid | 120-1000 | 600 | 400 |
| Vitamin B5 (mg) | Pantothenic acid; Panthenol | 4.3-45.0 | 15 | 16-17 |
| Vitamin B8 (µg) | Biotin | 17-125 | 60 | 60 |
| Vitamin B3 (µg) | Nicotinamide | 16-115 | 40 | 40-47 |
| Vitamin K (µg) | Phytomenadione; Menaquinone | 30-650 | 150 | — |

IU is an International Unit, usually used to measure lipid soluble vitamins including Vitamin A, D and E. The conversion of IU to mg varies depending on the nutrient.
*Referred to as "vitamin D" in the context of the present invention.

According to the invention, not all vitamins are located in the vitamin formulation, but are present in one or more of the other chambers, depending on the requirements of the respective vitamins with regard to stability over a prolonged time after and including the terminal heat sterilization. For example, besides in the vitamin formulation, vitamins can be accommodated in the amino acid formulation, the glucose formulation, and the lipid formulation, when said formulations and the overall distribution of vitamins is adapted accordingly as disclosed herein.

According to one embodiment of the invention, the vitamin formulation comprises the water-soluble vitamin B12. According to another embodiment, the vitamin formulation comprises vitamin B12, vitamin B2 and/or vitamin B5. According to yet another embodiment of the invention the vitamin formulation comprises vitamin B12, vitamin B2 and vitamin B5. According to another embodiment, the vitamin formulation further comprises lipid-soluble vitamins, i.e., vitamin A, vitamin D, vitamin E, and/or vitamin K. According to one embodiment, the vitamin formulation further comprises vitamin A, and optionally further comprises vitamins D, E, and/or K. According to another embodiment, the vitamin formulation comprises all lipid-soluble vitamins. It is surprising that these vitamins can be stably included together in one formulation, terminally heat-sterilized in the context of a large-volume MBC, and are still stable and available for up to 24 months at a temperature of up to about 25° C. in the absence of any critical excipients. Specifically, such formulation allows the inclusion of vitamin B12, which is a relatively sensitive vitamin that could so far not be accommodated in a multichamber bag for providing a ready-to-use parenteral nutrition formulation, as well as the notoriously challenging vitamin A. Vitamin B12, for example, cannot be stably provided in the amino acid chamber, or in the glucose chamber. It is also incompatible with B1 and vitamin C. Due to these restraints, it was found that the vitamin formulation preferably is a lipid emulsion comprising an aqueous phase and from 1% to 20% by weight of an oil phase based on the total weight of the lipid emulsion. Preferably the lipid emulsion comprises from 1% to 10% by weight of an oil phase based on the total weight of the lipid emulsion, such as, for example, about 2%, about 3%, about 4%, about 5%, about 6%, about 7%, about 8%, about 9% or about 10% by weight of an oil phase based on the total weight of the lipid emulsion. According to one aspect, the lipid emulsion comprises from about 4% to about 8%, or from about 4% to about 6% by weight of an oil phase based on the total weight of the lipid emulsion. According to another aspect of the invention, oils with low peroxide levels should be used. According to one specific embodiment, medium-chain triglyceride (MCT) oil is used for forming the lipid emulsion. The said lipid emulsion of the vitamin formulation in chamber five, according to another aspect, further comprises purified egg phosphatide in a concentration of from about 3.0 mg/L to about 4.0 mg/L of the vitamin formulation, such as, for example, about 3.5 mg/L. According to another aspect, the vitamin formulation further comprises sodium oleate in a concentration of from about 0.05 to about 0.1 g/L of the vitamin formulation. According to another aspect, hydrochloric acid (0.1N) may be added to adjust the pH, and nitrogen is present as well as water for injection. The pH of the vitamin formulation preferably is in the range of from about 5.0 to about 9.0, especially preferably in the range of from about 5.0 to about 7.0, and especially preferably in the range of from about 5.5 to about 6.5.

Alternatively, it is also possible to have a sixth chamber which comprises vitamin A and optionally vitamins E, D and/or K, whereas vitamin B12 and optionally vitamins B2 and/or B5 remain in a fifth chamber. In such scenario, the respective vitamin formulations can be further optimized to support the stability of the respective contents for potentially even longer stability during shelf-life. However, a five-chamber bag would fully address the stability target as defined herein and would be preferable regarding ease of handling of the MCB, e.g. when reconstituting the formulation, and regarding manufacturing of such MCB. According to one aspect, the vitamin formulation of the sixth chamber is a lipid emulsion such as the one described before for the vitamin formulation, and accommodates therein the lipid-soluble vitamins A optionally in combination with vitamins D, E and/or K. In such case, the vitamin formulation of the fifth chamber preferably is an aqueous solution which has the potential to further increase the stability of vitamin B12. The pH of the vitamin formulation of the fifth chamber which accommodates vitamins B12 and optionally also vitamin B2 and/or B5 is in the range of from about 5.5 to about 6.5, such as, for example, about 5.8, about 5.9, about 6.0 or about 6.1. For adjusting the pH of the aqueous vitamin solution of the fifth chamber, which preferably is in the range of from 5.5 to 7.5, HCl and/or NaOH can be used as needed. Optionally, a phosphate monobasic buffer can be used.

According to another embodiment, one or more of the lipid-soluble vitamins can, however, be also accommodated in the lipid emulsion of the third chamber. For example, vitamin A and/or E may be present in the lipid emulsion, whereas the remaining vitamins, e.g., vitamin D and vitamin K, may be present in the vitamin formulation of the fifth or, alternatively, of the sixth chamber. According to one embodiment, vitamin A and one, two or all of the other lipid-soluble vitamins can be present in the lipid formulation of the third chamber, whereas the vitamin formulation is an aqueous solution as described above and which comprises vitamin B12 and, optionally, vitamins B2 and/or B5.

As mentioned before, vitamin A is difficult to enclose in a MCB according to the invention for several reasons. However, it was found, in the context of the present invention, that vitamin A is accessible to being comprised in a terminally heat-sterilized MCB, especially also in a large-volume MCB as described above, which is subject to a considerable heat exposure during sterilizations. It is a surprising finding that it is possible to provide such terminally heat sterilized multi-chamber container for parenteral nutrition which also stably comprises vitamin A. Accordingly, the present invention allows to provide a large volume product, such as the described multichamber container for parenteral nutrition, which is terminally heat-sterilized and does not require any aseptic filling step for at least one of the comprised formulations, such as, for example, the formulation comprising vitamin A.

The use of the terms "large-volume" (multi chamber) container and (multi chamber container "high(er) volume" in the context of the invention preferably refers to containers having a total reconstituted volume of at least 500 mL, of at least 800 mL, of at least 1000 mL, of at least 1200 mL, of at least 1500 mL, of at least 1800 mL, of at least 2000 mL, of at least 2200 mL, of at least 2400 mL, of at least 2600 mL, or of at least 2800 mL. Being able to add vitamin A to such high-volume products is the outcome of several unexpected findings made due to in-depth analyses and the dedicated adjustments made as a result.

Accordingly, the present invention modifies and adjusts known parameters influencing vitamin A stability to a MCB scenario as disclosed herein, but also modifies additional factors that were not known to influence vitamin A stability so far. In summary, this led to the surprising and unexpected finding that vitamin A can indeed be provided in a terminally sterilized multi-chamber bag while at the same time ensuring vitamin A stability in the product. Importantly, besides including vitamin A in the lipid phase of a lipid emulsion that can also comprise other lipid-soluble vitamins, modification of the oxygen concentration and the pH of the emulsion were studied in order to identify the best conditions for long-term stabilization of vitamin A in a formulation that can be accommodated in a terminally heat-sterilized large-volume MCB according to the invention.

Specifically, it was found that exposure of vitamin A to an oxygen concentrations of more than 1.5 ppm in the process of producing the MCB of the invention, and in particular in the lipid emulsion wherein vitamin A is accommodated, is detrimental for long-term stability of vitamin A and that, therefore, in the context of the invention, exposure of the lipid emulsion and its components to a DO concentration of more than 1.5 ppm has to be avoided. Preferably, the DO concentration is below 1.0 ppm, below 0.8 ppm or preferably below 0.6 ppm. In further preferred embodiments, the DO concentration is below 0.5 ppm.

Accordingly, it is one aspect of the present invention that in the formulation in which vitamin A is located the concentration of DO is no more than 1.5 ppm. According to one aspect, this is relevant for the vitamin formulation based on a lipid emulsion in cases when vitamin A and potentially other vitamins such as vitamins D, E, and K and/or vitamin B2, B5 and B12 are present. According to another aspect, this is equally relevant to the lipid emulsion formulation of a potential sixth chamber which comprises at least vitamin A as described above, whereas the aqueous vitamin formulation of the fifth chamber does not contain vitamin A or any of the other lipid-soluble vitamins. According to yet another aspect, this also refers to the lipid formulation located in the third chamber if vitamin A is accommodated therein.

Preferably, the concentration of DO in a lipid emulsion comprising vitamin A is below 1.0 ppm and in embodiments is below 0.5 ppm. It is particularly preferred that also in the process of producing the lipid emulsion and preferably also in the whole manufacturing process of the vitamin formulation and the MCB of the invention, it is ensured that the DO is below 1 ppm, preferably below 0.5 ppm.

Furthermore, it was an unexpected finding that the pH has a clear impact on the stability of vitamin A, and that a pH of 5.0-9.0, such as a pH from about 5.0 to about 7.0, would be especially suitable to support stability of vitamin A in the terminally heat-sterilized MCB of the invention; so far, pH had not been examined as a relevant parameter that may influence vitamin A stability. In particular, the fact that especially a pH in the range of about 5.2-about 6.2, and especially a pH in the range of about 5.5 to about 6.5 is suitable to support long-term stability of vitamin A together with all other relevant parameters for stability was surprising.

According to another aspect, the vitamin A in the MCB according to the invention is predominantly present as retinyl palmitate. In certain aspects, retinyl palmitate is the only form of vitamin A that is added to the lipid emulsion of the invention during the method of preparing it. According to another aspect, the vitamin A provided in a MCB according to the invention consists of retinyl palmitate.

According to another aspect of the invention and as mentioned above, the lipid emulsion comprises as a lipid component a low peroxide level oil. Such oil are preferably selected from the group of oils consisting of soybean oil with low peroxides, olive oil, medium chain triglycerides, fish oil, fish oil extract, krill oil, algae oil, safflower oil, sunflower oil, corn oil, coconut oil, palm kernel oil, rapeseed oil, fungal oil and hydrogenated oils or mixtures thereof. MCT is one preferred embodiment according to the invention. A skilled person could not assume that the selection of specific lipid components in the context of the invention would be an important factor in enhancing stability of vitamin A and even support other vitamins that are comprised by the of the vitamin formulation of the invention. It was specifically surprising and a significant step towards the MCB of the invention that the conditions developed for the vitamin formulation are beneficial for the preferred combination of vitamins, i.e., the lipid-soluble vitamins A, D, E and K as well as the water-soluble vitamins B2, B5 and B12, including two of the most difficult to address vitamins, vitamin A and vitamin B12. However, in the process of developing the terminally heat-sterilized MCB of the invention, it was found that oils or lipids with low amounts of primary and secondary oxidation products are advantageous and may contribute to the stability of the vitamins in a MCB according to the invention. For example, in case soybean oil is used, it should be ensured that comprises a low level of peroxides. The same is true for other oils, especially those which do not naturally have low levels of peroxides. Accordingly, according to a preferred embodiment, the vitamin formulation of the invention, where it is a lipid emulsion, comprises as a lipid component an oil with a peroxide value of no more than 5 milliequivalents (mEq) $O_2$/kg, preferably no more than 3 mEq $O_2$/kg, more preferably no more than 1.5 mEq $O_2$/kg.

According to the invention, it is possible to include, into the lipid emulsion, an antioxidant agent, for example an agent selected from the group consisting of EDTA, tocopherol, ascorbyl palmitate and butylhydroxytoluen (BHT). However, no additional antioxidant agent is generally required in the vitamin formulation of the invention including options where it is a lipid emulsion and comprises the lipid-soluble vitamins as mentioned before and optionally also vitamins B2, B5 and B12, which is another benefit of the MCB as disclosed herein. The use of an antioxidant as mentioned before may be advantageous and indicated in cases where lipid components and oils are used that are prone to oxidation, such as soybean oil. Such antioxidants prevent or slow down autooxidation of oils and lipids/fats by giving their hydrogen to free radicals formed in the initiation and propagation stages of autoxidation. There are various kinds of antioxidants like the ones mentioned above, including natural antioxidants that can be extracted from parts of olive plants, green tea, sesame, medicinal plants, etc.

In further embodiments of the invention, vitamin A, optionally in combination with vitamins D, E and K, is stable in the vitamin formulation as disclosed herein for at least 6 months, preferably for at least 12 months, at a temperature of up to 40° C. and for at least 6 months, for at least 12 months, for at least 18 months, or for at least 24 months, at a temperature of up to 25° C., such as at a temperature of from 1° C. to 25° C.

In a further aspect, the present invention relates to a method of preparing a vitamin formulation comprising a lipid emulsion according to the present invention that comprises at least vitamins A, D, E and/or K, wherein the lipid emulsion comprises a lipid phase and an aqueous phase and is prepared by the steps comprising:
  (a) separately heating up the lipid phase and the aqueous phase to a temperature of from about 60° C. to about 90° C. under agitation;
  (b) adding vitamin A, vitamin D, vitamin E and/or vitamin K to the lipid phase;
  (c) preparing the pre-emulsion by transferring the lipid phase to the aqueous phase under agitation;
  (d) homogenizing the pre-emulsion at a temperature of from about 40° C. to about 60° C. under pressure;
  (e) optionally adding water to adjust the required volume and concentrations; and
  (f) adjusting the lipid emulsion to a concentration of dissolved oxygen (DO) below 1.5 ppm and a pH value of about 5.0-about 9.0, preferably of about 5.0 to about 7.0.

According to one aspect, in step (a) the lipid phase and the aqueous phase are heated up under agitation to a temperature of about 70° C.-about 80° C.

According to one aspect, steps (a) to (0 for preparing the vitamin formulation is followed by the steps comprising
  (g) filling the lipid emulsion into the chamber of the multi-chamber bag which is intended for holding the vitamin formulation, and
  (h) terminally heat-sterilizing the multi-chamber bag, preferably by terminal heat sterilization with moist heat.

According to one aspect, step (g) is done simultaneously with filling the other chambers of the MCB of the invention. The filling can also be done subsequently, i.e., one or more of the other chambers of the MCB can be filled before or after the chamber holding the vitamin formulation.

Another critical vitamin that is addressed in the present invention in some detail is vitamin B12. Vitamin B12 in a preferred embodiment of the invention is located in the vitamin formulation that was described above in connection with vitamin A. Obviously, it can be located in the vitamin formulation in the form of a lipid emulsion as described there, together with vitamin A and potentially other lipid-soluble vitamins, vitamin E, vitamin D, and/or vitamin K. Alternatively, it can be located in the vitamin formulation in the form of an aqueous solution as described before, in cases where vitamin A and other lipid-soluble vitamins are accommodated in a separate lipid emulsion in a sixth chamber or the lipid formulation of the third chamber as described before.

Regarding vitamin B12, it was an important finding in the context of the present invention that the vitamin should not be added to the carbohydrate formulation or the amino acid formulation, and should not be accommodated in a formulation together with vitamin B1 and/or vitamin C, in order to stabilize it in a heat-sterilized multi-chamber container of the invention. In contrast, it was found that certain conditions can surprisingly support the stability of vitamin B12, and that, on top of that, such conditions can be aligned with the requirements of, for example, vitamin A and other lipid-soluble as well as certain other water-soluble vitamins, specifically vitamins B2 and B5. This is surprising and an important step towards providing a MCB according to the invention, as vitamin A, for example, is an equally critical vitamin in terms of stability.

It was found that the stability of vitamin B12 can be supported by certain concentrations of dissolved oxygen which can be aligned with optimal DO conditions identified for stabilizing vitamin A. Specifically, a vitamin B12 containing formulation may preferably contain less than 1.5 ppm dissolved oxygen (DO), preferably less than 1.0 ppm dissolved oxygen, preferably less than 0.8 ppm dissolved oxygen and preferably less than 0.5 ppm dissolved oxygen.

In addition, vitamin B12 is especially sensitive to heat. As described before, this is especially relevant in the context of the invention, as vitamin B12 must be added to a large-volume multi-chamber container which for terminal heat-sterilization will have to withstand a significant heat exposure. The terminally heat sterilized multichamber container for parenteral nutrition should be sterilized in a way that the sterilization process has an F0 value of at least 8 minutes for all parts and components of the product, including the vitamin B12 comprising vitamin formulation according to the invention. In the context of the present invention, each of the formulations present in the MCB will undergo sterilization with an F0 value of at least 8 minutes.

It is generally accepted that vitamin B12 will be degraded upon exposure to temperatures above 100° C., in particular when included in a complex solution comprising multiple compounds and components, such as in the present case, that can potentially interact with and destabilize vitamin B12. Such components can be oxygen or other vitamins, macronutrients or trace elements. Specifically and importantly, it was found that vitamin B12 is basically unstable in the course of sterilization and subsequent storage in standard parenteral nutrition formulations such as, for example, lipid emulsions, glucose formulations and amino acid formulations, which so far made the addition of this vitamin to parenteral nutrition products a challenge. For example, it was found that while vitamin B12 can be kept stable during sterilization in a glucose formulation, such compositions lead to a rapid degradation of vitamin B12 during subsequent storage. Accordingly, prior art solutions which typically provide vitamin B12 in a glucose solution were found to be undesirable.

It was also found that amino acid formulations as provided in parenteral nutrition products and MCB as provided herein lead to a significant and rapid degradation of vitamin B12 following sterilization and storage. Equally, several studies showed that irrespective of the oil source, the pH, or the stabilizing agent used, cyanocobalamin is rapidly transformed into hydroxocobalamin and that no more cyanocobalamin can be detected at T3M40° C. (storage for 3 months at 40° C.), even though hydroxocobalamin seems to remain relatively stable for about 6 months at 40° C.

In the studies leading to the present invention, it was found that stability of vitamin B12 in a terminally heat-sterilized multi-chamber container for parenteral nutrition can be improved when vitamin B12 is provided in a formulation which meets certain requirements, such as oxygen levels, absence of certain compounds which seem to impact the long-term stability of vitamin B12 in said formulations, a dedicated pH range, light protection and sterilization at certain defined conditions. As mentioned before, it was a significant step towards a MCB as described herein that these requirements could be aligned with the requirements of other critical components such as, specifically, vitamin A.

As mentioned before, it is important to protect the formulation comprising vitamin B12 from light and oxygen concentrations of more than 1 ppm, preferably already during manufacture, to ensure storage stability after heat sterilization. It was also found that sterilization and storage stability can be increased at certain sterilization conditions which are defined by F0 and C0 values. Also, certain pH values have been found to increase the stability of vitamin B12 in aqueous solutions as well as in lipid emulsions. In addition, certain stabilizing agents were found to have a positive impact on the stability of vitamin B12 during sterilization and subsequent storage, such as, for example, EDTA and/or polyvinylpyrrolidone (PVP), but that, importantly, such excipients are not required for the intended stability of the vitamin according to the invention if the other parameters are met, which is a major achievement and benefit.

Specifically, it was found that exposure of vitamin B12 to a concentration of more than 1 ppm throughout the process of producing the vitamin B12 containing vitamin formulation of the invention is detrimental for long-term stability of vitamin B12. Accordingly, in the context of the invention, exposure of the vitamin B12 containing formulation and its components to a DO concentration of more than 1 ppm must be avoided. In the context of the invention, the concentration of DO in the vitamin B12 containing vitamin formulation is no more than 1 ppm. Preferably, the concentration of DO in the vitamin B12 formulation is below 0.5 ppm. It is preferred that in the process of producing and sterilizing the formulation and final MCB of the invention and preferably it is ensured that the DO is no more than 1 ppm, preferably no more than 0.5 ppm, and especially preferably below 0.3 ppm. As vitamin A is similarly susceptible to oxygen, see before, it was found that both can be located together in one formulation, such as the vitamin formulation of the invention, when expressed as a lipid emulsion.

Furthermore, it was found that light protection of the vitamin B12 containing vitamin formulation is important for reducing the loss of vitamin B12 in the formulation comprised in the MCB according to the invention. Light exposure leads to a degradation of vitamin B12 in the product during storage. Accordingly, the production and storage of the formulation should be done under light protection, and the final MCB should preferably be covered with a light-protective overpouch or overwrap, which may be designed to also act as a gas and moisture barrier.

According to one aspect of the invention, the vitamin B12 containing formulation of the terminally heat sterilized multi-chamber container of the invention does not comprise glucose or any other carbohydrate. Furthermore, it was found that inclusion of ascorbic acid (vitamin C) in the vitamin B12 formulation was associated with loss of vitamin B12. Similarly, inclusion of vitamin B1 (i.e., thiamine) in the vitamin B12 formulation was observed to contribute to vitamin B12 degradation under the tested conditions, particularly in case of terminal heat sterilization. In addition, when vitamin B12 was included in an aqueous solution intended for serving as an amino acid source of a nutritional product, it was found that the amounts of cyanocobalamin and hydroxocobalamin in the sterilized solution strongly decreased over the tested storage periods in the presence of amino acids.

Therefore, according to one aspect of the present invention, the vitamin B12 formulation does not comprise amino acids. According to another aspect, the vitamin B12 containing formulation does not comprise vitamin-B1. According to yet another aspect of the invention, the vitamin B12 formulation does not comprise vitamin C. According to another, preferred aspect, the vitamin B12 containing formulation does not comprise glucose, vitamin B1 and vitamin C. According to yet another aspect of the invention, the vitamin B12 containing formulation does not comprise cysteine. Preferably, the formulation does not contain any amino acid. According to one preferred embodiment, the vitamin B12 containing formulation of the MCB according to the invention does not comprise cysteine, glucose, vitamin B1 and vitamin C.

Regarding pH, the pH of the vitamin B12 containing formulation according to the invention can be in the range of from about 5.0 to about 9.0, preferably it will be chosen to be in the range of from about 5.0 to about 8.0, more preferably in the range of from about 5.5 to about 6.5, and especially preferably in the range of from about 5.7 to about 6.1, especially when vitamin B12 is co-located in the vitamin formulation together with vitamin A. It was found that exposure to more acidic or basic environments contributes to the destabilization of vitamin B12 in its formulations, and that a pH in the preferred ranges is beneficial for the long-term stability of vitamin B12 in the terminally heat-sterilized MCB of the invention. It was unexpected that the preferred pH ranges would indeed be relevant for supporting stability of vitamin B12 formulation in the terminally heat-sterilized multi-chamber container of the invention. So far, pH had not been examined as a major parameter that influences vitamin B12 stability. In particular, the fact that especially a mildly acidic pH in the range of from about 5.2 to about 6.2, such as about 5.9, can contribute to long-term stability of vitamin B12 especially in a vitamin formulation which also contains vitamin A and other lipid-soluble vitamins as well as vitamins B2 and B5, i.e., in a lipid emulsion as described above, was a surprising finding.

Also, in the case of vitamin B12, the stability of the vitamin can be further supported by adding stabilizing agents comprising, for example, phosphate buffer, citrate buffer, EDTA, PVP and/or glutamic acid. However, as mentioned before, it is important to note that another surprising finding was that the vitamin formulation as provided herein and comprising vitamin B12 is able to meet the stability criteria without any such excipients, which is an important improvement over similar formulation in the prior art. According to aspect, if any stabilizing agents are added, it was found that EDTA, preferably at a concentration of no more than 0.1 g/L, and/or monobasic sodium phosphate buffer, preferably at a concentration of no more than 0.5 mM provided for the best results.

It was found that like in the case of vitamin A, the lipid phase of the lipid emulsion forming a vitamin formulation according to the invention should comprise or consist of a low peroxide level as further described there.

According to one embodiment of the invention, vitamin B12 can also be co-located with other vitamins, preferably with vitamins B2 and B5, in a vitamin formulation which is an aqueous solution provided in the fifth chamber of the MCB according to the invention, while lipid-soluble vitamins such as vitamin A will be provided in the lipid formulation or in a separate, dedicated lipid emulsion provided in a sixth chamber of the MCB of the invention.

In a further aspect, the present invention relates to a method of preparing a terminally heat-sterilized multi-chamber container according to the invention wherein vitamin B12 is provided in an aqueous vitamin formulation, preferably together with vitamins B2 and B5. Such formulation is prepared by the steps comprising:
(a) providing an aqueous medium suitable for injection, preferably water for injection,
(b) adjusting the aqueous solution to a concentration of dissolved oxygen (DO) of no more than 1 ppm and a pH value of about 5-about 9, preferably about 5 to about 7, and
(c) dissolving vitamin B12, preferably in the form of cyanocobalamin, in the low DO solution of step b), optionally together with vitamins B2 and B5.

According to one aspect, steps (a) to (c) for preparing the aqueous vitamin formulation is followed by the steps comprising:
(i) filling the aqueous vitamin formulation into the chamber of the multi-chamber bag which is intended for holding the vitamin formulation, and
(j) terminally heat-sterilizing the multi-chamber bag, preferably by terminal heat sterilization with moist heat.

According to one aspect, step (i) is done simultaneously with filling the other chambers of the MCB of the invention. The filling can also be done subsequently, i.e. one or more of the other chambers of the MCB can be filled before or after the chamber holding the vitamin formulation.

According to one embodiment of the present invention, the vitamin formulation provided in the fifth chamber is a lipid emulsion comprising the lipid-soluble vitamins A, D, E, and K as well as the water-soluble vitamins B2, B5 and B12. In this case, the formulation is formed by the steps comprising:
(a) providing an aqueous solution suitable for injection, preferably water for injection,
(b) providing a lipid phase including adding at least one lipid-soluble vitamin selected from the group consisting of vitamin A, vitamin E, vitamin D, and vitamin K to the lipid phase,
(c) separately heating up the lipid phase and the aqueous solution to a temperature of from about 60° C. to about 90° C. under agitation;
(d) preparing the pre-emulsion by transferring the lipid phase to the aqueous solution under agitation;
(e) homogenizing the pre-emulsion at a temperature of from about 40° C. to about 60° C. under pressure;
(f) optionally adding water to adjust the required volume and concentrations;
(g) adjusting the lipid emulsion to a concentration of dissolved oxygen (DO) of no more than 1 ppm and a pH value of about 5.0-about 7.0;
(h) dissolving vitamin B12, preferably in the form of cyanocobalamin, in the low DO lipid emulsion, preferably together with vitamin B2 and vitamin B5.

In embodiments, the lipid phase and the aqueous phase are heated up in step (c) under agitation to a temperature of about 70° C.-about 80° C. In further embodiments, step (e) is followed by allowing the lipid emulsion to cool down to temperatures of between about 15° C. to about 30° C., preferably room temperature.

Again, steps (a) to (h) will be followed by the steps of filling and terminally heat-sterilizing the multi-chamber bag, for example by heat sterilization using water spray technology.

According to another important aspect of the invention, the carbohydrate formulation comprises vitamin B1, vitamin B3 and vitamin B6, preferably together with calcium chloride as calcium source. If calcium is present, the calcium concentration preferably is from about 5.0 mmol/L to about 15.0 mmol/L of carbohydrate solution. The carbohydrate formulation preferably contains from about 50.0 g to about 180.0 g of glucose, even though other carbohydrates could also be used. Glucose anhydrous or glucose monohydrate can be used, for example, for preparing the carbohydrate formulation. Vitamin B1 can be added as thiamin chloride, but other forms can be used as well. Vitamin B3 can be added, for example, as nicotinamide, and vitamin B6 as pyridoxine. The pH of the carbohydrate formulation preferably is in the range of about 3.2 to about 5.5. The carbohydrate formulation may comprise certain excipients, such as, HCl which will generally be used as HCl of about 25% w/w to adjust the pH of the formulation during production. Otherwise, the formulation may contain nitrogen and will contain water for injection. The composition is designed in way to allow stable provision of glucose and especially also the vitamins mentioned during preparation of the formulation, including terminal heat-sterilization, storage, reconstitution, and administration. In the final, reconstituted formulation for administration, the glucose concentration will be in the range of from about 60 g/L to about 160 g/L.

According to another aspect of the invention, the amino acid chamber comprises vitamin B8, vitamin B9 and vitamin C, optionally together with various electrolytes that can also be accommodated in the amino acid formulation. For example, the electrolytes contained in the amino acid formulation according to the invention encompass sodium acetate trihydrate, potassium chloride, magnesium chloride hexahydrate and sodium glycerophosphate. The amino acid formulation preferably comprises from about 4.0 g/100 mL to about 20.0 g/100 mL amino acids. Vitamin B8 can be added, for example, as biotin, vitamin B9 as folic acid, and vitamin C as ascorbic acid. The pH of the amino acid formulation is preferably in the range of from about 5.0 to about 7.0, more preferably in the range of from about 5.9 to about 6.9. The amino acid formulation may further comprise excipients such as acetic acid, glacial, which can be used for adjusting the pH of the formulation, nitrogen, and water for injection. The composition is designed in a way to allow stable accommodation of amino acids, electrolytes and especially also the vitamins in the MCB according to the invention during preparation of the formulation, including terminal heat-sterilization, storage, reconstitution, and administration.

It is a significant achievement to be able to stably accommodate the vitamins mentioned in Table I which are considered relevant components of parenteral nutrition in one, terminally heat-sterilized MCB which is ready-to-use. Specifically, it was a critical step forward to distribute the respective vitamins over the respective formulations of the present invention in a way to avoid instabilities and incompatibilities between the vitamins or with compounds and/or conditions in the various chambers, that still must contain the macronutrients in a stable way, and adjust various parameters, including, for example, presence and/or combination with other vitamins, pH, and dissolved oxygen, without compromising on critical excipients, shelf life and storage temperatures. It is a special achievement that also vitamin A and vitamin B12 can be stably accommodated in the MCB according of the invention.

In light of the prior art, another major technical problem underlying the present invention was to provide a terminally heat-sterilized multi-chamber bag that in addition to relevant vitamins as mentioned before contains such trace elements as to meet the requirements of the currently applicable guidelines for parenteral nutrition. As is the case for vitamins, and especially for certain sensitive vitamins described before, trace elements are generally also provided in glass vials or polypropylene ampules meant to be reconstituted and/or mixed into infusion bags prior to administration.

Some products have been developed that already contain some selected trace elements in nutrition multi-chamber bags, such as, for example, Pediaven, a parenteral nutrition binary solution intended for infants, children and adolescents, which contains trace elements in the glucose chamber. However, it has been reported that, for example, the trace element selenium, provided as selenium dioxide in the product, is absent in the finished product potentially due to degradation, as announced in July 2014 (http://www.pharmacovigilance-tours.fr/490.html). Another product, Elneopa, from Otsuka Pharmaceuticals, contains certain trace elements in a small dedicated chamber as part of a multi-chamber bag. However, this product does not contain selenium.

It is known in the art that selenium, iodine and copper are difficult to include in nutrition bags, as they can undergo chemical reactions, especially under extreme conditions such as a heat sterilization step and during the storage period. See, for example, Allwood et al. *Compatibility and Stability of Additives in Parenteral Nutrition Admixtures*. Nutrition 1998, Vol. 14, No. 9, pp. 697-706; Eisenberg et al. Stability of selenium sources reviewed. Feedstuffs, Jun. 18, 2012.

Furthermore, in various formulation studies, when attempting to introduce trace elements into nutrition multi-chamber bags, serious stability issues have been experienced, in particular the loss of selenium has been observed. This may be due to the fact that selenium in the form of sodium selenite (and selenious acid) is prone to adsorption, for example to plastic materials or iron oxides; can be reduced into metallic selenium in the presence of reducing agents like ascorbic acid; can be reduced into hydrogen selenide, which is a volatile substance; and/or can be transformed into selenious dioxide at low pH, which is also a volatile substance under certain conditions. Furthermore, nutritional solutions comprising selenate salts are unknown in the state of the art. In addition to selenium, iodine, fluoride, and copper also showed stability issues during formulation trials. Copper is a reactive entity and can catalyze various chemical reactions and it is known that it can precipitate. Iodide can be reduced into iodine, which is potentially volatile. Furthermore, fluoride showed a decreasing concentration over time.

Accordingly, to date there is no sterilized, ready-to-use parenteral nutrition solution available that stably comprises a solution for parenteral administration to a patient in need thereof, comprising selenium and preferably also zinc, copper and manganese, which is stable over a prolonged period of time. Parenteral nutrition solutions which are terminally sterilized and ready-to-use and further comprise, for example, iron, chromium, iodine, fluoride and/or molybdenum in one ready-to-use MCB for PN are even more difficult to provide due to instability and/or incompatibility of one or more of the components either with each other or with the compounds and/or conditions of the standard macronutrient formulations. Selenium and other trace elements are, therefore, generally manually added to the ready-made solutions shortly before administration, because currently applicable guidelines for parenteral nutrition recommend the addition of at least zinc, copper, manganese and selenium for meeting the nutritional requirements of a patients and for avoiding harmful effects if said trace elements are not provided in sufficient amounts. See, for example, Vanek et al., A.S.P.E.N. *Nutrition in Clinical Practice* 2012, 27:440-491; Osland et al., *Australasian Society for Parenteral and Enteral Nutrition (AuSPEN) adult vitamin guidelines for parenteral nutrition. Asia Pac J of Clin Nutr* 2016, 25(3): 636-650; or Blaauw et al. *Parenteral Provision of Micronutrients to Adult Patients: An Expert Consensus Paper. JPEN J Parenter Enteral Nutr.* 2019 March; 43 Suppl 1:S5-S23.

Table II summarizes the trace elements that, for example, can stably be added alone or in various combinations to a terminally heat-sterilized multi-chamber bag according to the invention. According to the invention, preferably at least selenium, zinc, copper, and manganese are present in the MCB of the invention, preferably in the trace element formulation. One or more of the trace elements iron, chromium, iodine, fluorine, and molybdenum can be added, for example iron and chromium or any other combination of iron, chromium, molybdenum, iodine and fluorine. According to another embodiment, the trace element formulation thus comprises at least selenium, zinc, copper, manganese, and iron. According to another embodiment, the trace element formulation comprises at least selenium, zinc, copper, manganese, iron, and chromium. According to another embodiment, the trace element formulation comprises at least selenium, zinc, copper, manganese, and chromium. According to another embodiment, the trace element for mulation comprises at least selenium, zinc, copper, manganese, and iodine. According to another embodiment, the trace element formulation comprises at least selenium, zinc, copper, manganese, iodine, and iron. According to another embodiment, the trace element formulation comprises at least selenium, zinc, copper, manganese, iodine, chromium, and iron. According to another embodiment, the trace element formulation comprises at least selenium, zinc, copper, manganese, iodine, molybdenum, and iron. According to another embodiment, the trace element formulation comprises at least selenium, zinc, copper, manganese, chromium, iodine, fluorine, and iron. According to another embodiment, the trace element formulation comprises at least selenium, zinc, copper, manganese, iodine, fluorine, molybdenum, chromium, and iron. According to another embodiment, the trace element formulation comprises at least selenium, zinc, copper, manganese, iodine, molybdenum, chromium, and iron.

The trace elements can be added to the MCB in different forms or as different salts which can act as a source for the respective trace element, see also Table II. For example, sources of selenium that can be used in the context of the invention are, for example, sodium selenite, potassium selenite, selenious acid, selenium dioxide, selenomethionine, selenocysteine, and sodium selenate. Regarding zinc, iron, copper and chromium, the respective chloride, gluconate or sulfate salts can be used. Fluoride and iodine can be provided by adding, for example, potassium iodide or sodium iodide, and sodium fluoride or potassium fluoride. Sources of molybdenum that can be used according to the invention are for example, sodium molybdate dihydrate, potassium molybdate, molybdenum chloride, molybdenum sulfate, or molybdenum glycinate. For example, the trace element formulation according to the invention can comprise sodium selenite, zinc chloride, copper chloride, manganese chloride, iron chloride, chromium chloride, potassium iodide, sodium fluoride, and/or sodium molybdate dihydrate. As will be readily understood by persons skilled in the art, amounts may vary with the size (total reconstituted volume) of the MCB of the invention and/or the targeted patient group, for example, pediatric or adult patients.

TABLE II

Trace elements considered relevant for parenteral nutrition according to different guidelines and that can be added to the terminally heat-sterilized multi-chamber bag of the invention. Also shown are the respective preferred amounts of the trace elements in the MCB and reconstituted solution. The underlined salt form of a given trace element is the most preferred salt form according to the invention; however, the other salt forms can also be used according to the invention. Also shown are recommended amounts of certain trace elements according to selected, currently applicable guidelines. See, for example, Vanek et al., A.S.P.E.N. *Nutrition in Clinical Practice* 2012, 27: 440-491; Blaauw et al. *JPEN J Parenter Enteral Nutr.* 2019 March; 43 Suppl 1: S5-S23.

| Trace Element | Salt Forms | Invention | ASPEN 2012 | Blaauw et al. (2019) |
|---|---|---|---|---|
| Zinc ($\mu g$) | Zinc chloride, gluconate or sulfate | 580-7000 | 3000-5000 | 2500-6500 |
| Iron ($\mu g$) | Iron chloride, gluconate or sulfate | 0-3000 | — | 1000-1200 |
| Copper ($\mu g$) | Copper chloride, gluconate or sulfate | 80-800 | 300-500 | 300-610 |
| Manganese ($\mu g$) | Manganese chloride, gluconate or sulfate | 1-350 | 55 | 55-100 |
| Chromium ($\mu g$) | Chromium chloride, gluconate or sulfate | 0-25 | 10-15 | 10-15 |
| Selenium ($\mu g$) | Sodium selenite; potassium selenite; selenious acid; selenium dioxide; selenomethionine; selenocysteine; sodium selenate; potassium selenate; barium selenate; ammonium selenate | 10-120 | 60-100 | 20-100 |
| Iodine ($\mu g$) | Potassium iodide; sodium iodide | 5-200 | — | 70-150 |
| Fluorin ($\mu g$) | Sodium fluoride; potassium fluoride | 0-1500 | — | — |
| Molybdenum ($\mu g$) | Sodium molybdate dihydrate; potassium molybdate; molybdenum chloride; molybdenum sulfate; molybdenum glycinate | 1-30 | — | No recommendation |

The trace elements according to the invention can be added in various forms and amounts without deviating from the invention, see Table II.

It will be readily understood by the skilled person, that the preferred amounts shown in Table I can be reduced or enlarged without deviating from the present invention, which is largely unrelated to amounts used.

According to one embodiment, the trace elements encompassed by the MCB according to the invention are located in the trace element formulation. However, selected trace elements, that are less critical as to their requirements for stability may also be accommodated elsewhere, such as, for example, in the glucose chamber. It will be readily understood by the skilled person that the concentrations of the trace elements within the MCB of the invention may vary, depending on the volume of the formulation or chamber they are located in, while their total amount per MCB as disclosed herein will remain in the disclosed ranges (see Table II). For example, the volume of the trace element chamber may vary over a certain range, such as, for example, from about 2.5 mL to about 100 mL, such as, for example, from about 5 mL to about 50 mL, and from about 10 mL to about 30 mL. Accordingly, the concentrations of the respective trace elements in a given formulation, such as the trace element formulation, can vary (see, for example, Example 1). Following reconstitution, the concentration of the respective trace elements, depending on the total volume of the reconstituted multi-chamber bag, may be, for example, in the range of (a) from about 2200 $\mu g/L$ to about 7500 $\mu g/L$ zinc, for example from about 2400 $\mu g/L$ to about 7400 $\mu g/L$, or from about 2400 $\mu g/L$ to about 4900 $\mu g/L$, such as, for example, about 2500 μg/L, about 3200 μg/L, about 4500 μg/L, about 4800 μg/L, about 5500 μg/L, about 6000 μg/L, about 6800 μg/L or about 7350 μg/L;

(b) from about 450 μg/L to about 1500 μg/L iron, for example from about 480 μg/L to about 1470 μg/L, or from about 480 μg/L to about 1000 μg/L, such as, for example, about 490 μg/L, about 550 μg/L, about 650 μg/L, about 970 μg/L, about 1100 μg/L, about 1300 μg/L or about 1450 μg/L;

(c) from about 130 μg/L to about 475 μg/L copper, for example from about 140 μg/L to about 450 μg/L, or from about 140 μg to about 300 μg/L, such as, for example, about 150 μg/L, about 200 μg/L, about 300 μg/L, about 400 μg/L, or about 450 μg/L;

(d) from about 20 μg/L to about 100 μg/L manganese, for example from about 25 μg/L to about 85 μg/L, or from about 25 μg/L to about 55 μg/L, such as, for example, about 27 μg/L, about 35 μg/L, about 54 μg/L, about 65 μg/L, about 75 μg/L, or about 80 μg/L;

(e) from about 3 μg/L to about 18 μg/L chromium, for example from about 4 μg/L to about 16 μg/L, or from about 4 μg/L to about 10 μg/L, such as, for example, about 5 μg/L, about 7 μg/L, about 10.0n/L, about 12 μg/L, or about 15 μg/L;

(f) from about 25 μg/L to about 120 μg/L selenium, for example from about 30 μg/L to about 110 μg/L, or from 30 μg/L to about 70 μg/L, such as, for example, about 35 μg/L, about 50 μg/L, about 60 μg/L, about 70 μg/L, about 80 μg/L, about 90 μg/L, or about 100 μg/L;

(g) from about 35 μg/L to about 175 μg/L iodine, for example from about 40 μg/L to about 150 μg/L, or from about 40 μg/L to about 100 μg/L, such as, for example, about 50 μg/L, about 65 μg/L, about 80 μg/L, about 90 μg/L, about 100 μg/L, about 125 μg/L, or about 150 μg/L;

(h) from about 450 μg/L to about 1500 μg/L fluorine, for example from 480 μg/1 to about 1480 μg/L, or from about 480 μg/L to about 1000 μg/L, such as, for example, about 490 μg/L, about 650 μg/L, about 970 μg/L, about 1050 μg/L, about 1250 μg/L, or about 1470 μg/L;

(i) from about 5 μg/L to about 30 μg/L molybdenum, for example from about 8 μg/L to about 30 μg/L, or from about 8 μg/L to about 20 μg/L, such as, for example, about 10 μg/L, about 13 μg/L, about 20 μg/L, about 25 μg/L, and about 30 μg/L.

The skilled person will be aware that the concentrations refer to the respective trace element and not to the respective salt or other form of the trace element. For example, if zinc is said to be present in a concentration of 4850 μg/L in the trace element formulation, this corresponds to a concentration of zinc chloride ($ZnCl_2$) of 10.1 mg/L.

According to one embodiment of the invention, the trace element chamber has a pH of from about 2.0 to about 4.0, which is especially beneficial for stabilizing the trace element formulation according to the invention. It is also possible to adjust the pH to a range of from about 2.0 to about 3.5 or select a pH range of from about 2.5 to about 3.2. Such pH is specifically beneficial for stabilizing selenium. The stability at such acidic pH conditions is important, in particular if the solution also includes other trace elements that may not be stable at neutral pH, but only under acidic conditions. This is, for example, the case for iodide (I), which has been reported to be more stable in solutions with acidic pH.

According to one aspect of the invention, the trace element formulation comprises an acid, which can be an inorganic or an organic acid. According to one embodiment, an organic acid selected from the group comprising malic acid, tartaric acid, citric acid, maleic acid, fumaric acid, more preferably malic acid is used, wherein the concentration of the organic acid is preferably in the range of from about 50 mM to about 400 mM, preferably from about 190 mM to about 220 mM, and more preferably about 200 mM.

In another embodiment, the solution comprises malic acid. In embodiments, the solution comprises malic acid at a concentration in the range of from about 50 mM to about 400 mM, preferably from about 190 mM to about 220 mM, such as, for example, about 140 to about 180 mM or about 160 mM to about 200 mM. The use of malic acid in the context of a parenteral nutrition product is particularly advantageous since it is an organic acid that naturally occurs in fruits, such as apples, apricots, blackberries, blueberries, cherries, grapes, peaches and others and is particularly well tolerated by human subjects when administered in the context of a nutritional product.

According to another embodiment, the solution comprises dissolved oxygen (DO) in a concentration of from at least 0.5 ppm to about 8 ppm.

In certain embodiments of the invention, the MCB comprises selenium in the form of selenite, such as, for example, sodium selenite. In some embodiments, the solution of the medical product of the invention comprises selenous acid. In some embodiments, the solution of the medical product of the invention comprises selenium dioxide. It was surprising that the presence of dissolved oxygen, in particular at the indicated, stable concentration of from about 0.5 ppm to about 8 ppm, leads to the stabilization of sodium selenite, selenous acid and/or selenium dioxide in an environment which is otherwise protected from the interchange of gases with its surrounding, because it is generally the case and therefore expected that oxygen is involved in redox reactions and is often deleterious for macro- and micronutrient stability in solution, such as in the case of the vitamin formulation comprising vitamin A.

Accordingly, it was an unexpected and important finding in the context of the present invention that the presence of a stable and controlled concentration of dissolved oxygen in a trace element formulation comprising sodium selenite, selenous acid and/or selenium dioxide alone or in combination with further sensitive trace elements, such as iodine and/or copper, leads to the stabilization of these selenium containing compounds within the MCB disclosed herein, and which are known to be unstable in solution, particularly when presented in parenteral nutrition products which are generally provided in oxygen-impermeable containers to avoid the above-mentioned redox reactions. Specifically, while oxygen-permeable containers are known, such as used, for example, for Peditrace™, and which allow gas exchange between the interior of the container and the surrounding air, most parenteral products are provided in oxygen-impermeable containers due to the redox sensitivity of the nutritional components contained. Oxygen-permeable containers, on the other hand, will not provide for a defined, stable oxygen concentration which was, however, found to be a prerequisite for providing long-term stability especially of a highly sensitive composition of various trace elements, and cannot in any case be used for a MCB according to the invention which must accommodate formulations and components that are severely impacted by oxygen. It is therefore obvious that there is an inherent contradiction between formulation and components that must be protected from oxygen, while others that contain selenium for example in the form of Se(IV), like sodium selenite, will only be stable if provided with sufficient oxygen.

In the context of the present invention, it is understood that the expression "stable (and controlled) concentration of dissolved oxygen in a solution of 0.5 ppm to 8 ppm" relates to a DO concentration that remains in the range of 0.5 ppm and 8 ppm throughout production and shelf-life of the trace element formulation and MCB according to the invention, wherein 8 ppm corresponds about to oxygen saturation of trace element formulation. In other words, it is not necessary that the exact oxygen concentration of the solution in the medical product remains stable, but it is required that throughout production, especially including filling and sterilization, and shelf life the concentration does not drop below this range, namely below 0.5 ppm. Accordingly, in preferred embodiments of the invention, the DO concentration in the solution is at least 0.5 ppm DO.

In embodiments, the DO in the Se(IV)-containing solution is at least 0.5 ppm during shelf life. In embodiments, the DO in the Se(IV)-containing solution does not fall below 0.5 ppm throughout shelf life of the medical product. In preferred embodiments, the DO in the Se(IV)-containing solution at the time of filling (and optionally sealing) of the solution in the flexible container and before sterilization is at least 6 ppm. In embodiments, the DO concentration in the solution at the time of filling and before sterilization is from 6 ppm to 8 ppm (wherein 8 ppm corresponds about to the oxygen saturation level of the solution).

In embodiments of the invention, the concentration of DO in the selenite comprising trace element formulation may be any value in the range of about 0.5, about 0.75 or about 1 to about 2 ppm or about 0.5, about 0.75, about 1 or about 2 to about 8 ppm, such as about 0.5, about 0.75, about 1, about 1.5, about 2, about 2.5, about 3, about 3.5, about 4, about 4.5, about 5, about 5.5, about 6, about 6.5, about 7, about 7.5 or about 8 ppm. The indicated ranges include the noted end-values. Ranges comprising any combination of disclosed values are considered as embodiments of the invention.

In embodiments, the concentration of DO in the solution is equal or above 0.5 ppm, more preferably equal or above 1.0 ppm, throughout shelf life of the medical product. In embodiments of the invention, the DO in the Se(IV) containing trace element formulation is at least 0.5 ppm throughout shelf life of the MCB of the invention. In embodiments, the DO concentration in the solution can decrease during shelf life but remains above 0.5 ppm. For example, it is preferable that the DO concentration of the solution is above 6 ppm, such as 8 ppm, at the time of filling of the formulation into the flexible container and before sterilization. During sterilization and storage, the DO concentration may decrease, but does not fall below 0.5 ppm throughout shelf life.

In preferred embodiments, an oxygen-tight sealed chamber of the flexible multi-chamber container comprising the Se(IV)-containing trace element formulation comprises a headspace of a gas composition comprising oxygen. In other words, in such embodiments, the chamber of the MCB comprising the Se(IV)-containing trace element formulation comprises additionally a volume of a gas composition comprising oxygen. It is understood that such an additional gas volume or "headspace" is a space or volume within a sealed chamber that is not filled with the solution, i.e., a volume filled with air/gas left at the top of a filled container before sealing. Generally, headspace would be avoided or minimized to the extent possible regarding potentially unwanted interactions between the gas included therein (ambient air) and the liquid (or solid) content of the container (see, for example, US20030110736A1). In contrast, in the context of the present invention such headspace can be intentionally used and designed to be sufficient for stocking oxygen, for example via the ambient air, so that consumed oxygen can be replaced and the DO in the solution can be maintained above 0.5 ppm throughout intended shelf-life. Using a headspace according to the invention, i.e. providing for a sufficient gas reservoir including, for example ambient air and or any other gas or gas mixture that might be consumed in the Se(IV)-containing trace element formulation of a gas- or oxygen impermeable bag or a chamber thereof is a general principle which can be used also in connection with other compounds that require a certain level of gas, such as, for example, oxygen, for prolonged stability in situations where gas is consumed by one or more components of the solutions stored in the bag or chamber of an MCB or where there is a risk of loss of such gas, e.g., through the primary container or any port tube, for example.

Dissolved oxygen is usually reported in milligrams per liter (mg/L) or as a percent of air saturation. However, studies also report DO in parts per million (ppm) or in micromoles (µmol). 1 mg/L is equal to 1 ppm. The relationship between mg/L and % air saturation varies with temperature, pressure and salinity of the water. One micromole of oxygen is equal to 0.022391 milligrams. Thus 100 µmol/L O2 is equal to 2.2 mg/L O2. To calculate dissolved oxygen concentrations from air saturation, it is necessary to know the temperature and salinity of the sample. Barometric pressure has already been accounted for as the partial pressure of oxygen contributes to the percent air saturation. Salinity and temperature can then be used in Henry's Law to calculate what the DO concentration would be at 100% air saturation. However, it is easier to use an oxygen solubility chart. These charts show the dissolved oxygen concentration at 100% air saturation at varying temperatures, and salinities. This value can then be multiplied by the measured percent air saturation to calculate the dissolved oxygen concentration (Fondriest Environmental, Inc. "Dissolved Oxygen." Fundamentals of Environmental Measurements. 19 Nov. 2013). There are several methods available in the art for measuring dissolved oxygen concentrations. Modern techniques involve either an electrochemical or optical sensor, where the dissolved oxygen sensor is attached to a meter for spot sampling and laboratory applications or to a data logger, process monitor or transmitter for deployed measurements and process control. An example is the fiber-optic oxygen meter Microx TX3 from PreSens Precision Sensing GmbH (Germany) for gaseous and dissolved $O_2$. The colorimetric method offers a basic approximation of dissolved oxygen concentrations in a sample. There are two methods designed for high-range and low-range dissolved oxygen concentrations. These methods are quick and inexpensive for basic projects but limited in scope and subject to error due to other re-doxing agents that may be present in the water. The traditional method is the Winkler titration.

In preferable embodiments, the gas composition comprising oxygen is ambient air, which comprises about 78% nitrogen, about 21% oxygen, and about 1% of other gases. However, in embodiments, the gas composition comprising oxygen may be an oxygen-enriched gas composition that may even be composed of almost only oxygen, especially in cases where the headspace volume should be reduced. In embodiments, the gas composition of the headspace may comprise from about 10-about 100% oxygen, such as, for example, from about 20-about 60% oxygen, and from about 20-about 40% oxygen.

In case of ambient air, the volume of the headspace is preferably in the range of about 40% of the volume of the selenium solution comprised in the chamber. For example, in case of 25 ml of a Se(IV)-containing trace element formulation preferably comprising about 70 μg of selenium, the headspace may be 10 ml. However, in embodiments, the volume of the headspace may be in the range of about 10-about 80% of the volume of the Se(IV)-containing trace element formulation, such as about 11, about 12, about 13, about 14, about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, about 40, about 42, about 44, about 46, about 48, about 49, about 50, about 55, about 60, about 65, about 70, about 75 or about 80% of the volume of the selenium solution. For example, in case of 25 ml of a Se(IV)-containing trace element formulation sealed in a chamber of the MCB of the invention, the headspace may be in the range of about 2.5 ml to about 12.5 ml, preferably about 3-about 12 ml, such as about 3, about 4, about 5, about 6, about 7, about 8, about 9, about 10 or about 11 ml. The skilled person can calculate corresponding volumes of headspace based on this disclosure in case of other volumes of the selenium solution. As mentioned before, the volume of the headspace may be adjusted accordingly if a different gas composition is used. For example, in case of a gas with enriched oxygen content, a smaller headspace can be used, as is evident to the skilled person and can be calculated on the basis of the above ratios indicated for ambient air.

Accordingly, where the trace element formulation of the MCB of the invention comprises selenite (Se(IV)), the sealed chamber of the MCB comprises a headspace of a gas composition comprising oxygen.

In embodiments of the invention, the DO stabilizes the sodium selenite, selenous acid and/or selenium dioxide containing trace element formulation also in the presence of other trace elements in the formulation for at least 6 months, preferably for at least 12 months, more preferably for at least 18 months, most preferably for at least 24 months, at a temperature of up to 30° C., such as, for example, at a temperature of from about 18° C. to about 25° C., or in a refrigerated conditions, such as from about 1 to about 10° C.

It is highly preferable that the multi-chamber container or at least the chamber of the container containing the Se(IV)-comprising trace element formulation is able to stabilize the DO content between about 0.5 and about 8 ppm. According to the invention, this can be realized in different ways, such as, for example, by making use of an oxygen-impermeable film material where an oxygen absorber is added to the primary pouch to protect other formulations contained in the MCB of the invention that require the absence of oxygen. In addition, ports that are in fluid communication with the trace element chamber comprising selenite should preferably be attached or sealed into the container in a way that ensures the chamber containing the solution comprising Se(IV) is sealed in an oxygen tight manner, to the extent possible. An inevitable loss of oxygen, for example, through the port seals where oxygen absorbers are used, can be addressed according to the invention with an appropriate headspace used as a reservoir of e.g. oxygen to assure the stability of Se(IV) for the intended shelf-life. In embodiments, the chamber comprising the solution containing selenium comprises a port that is essentially oxygen impermeable.

As used herein, the term "shelf life" relates to the time that the medical product of the invention can be stored at defined storage conditions after sealing and sterilizing. Depending on the storage conditions, shelf life may vary.

A selenite (Se(IV)) containing trace element formulation according to the invention can be prepared by the steps comprising:

(a) dissolving sodium selenite, selenous acid or selenium dioxide in a liquid medium, preferably water for injection,
(b) further dissolving an acid, preferably an organic acid selected from the group comprising malic acid, tartaric acid, citric acid, maleic acid and fumaric acid,
(c) further dissolving zinc, copper, and manganese, and
(d) adjusting the solution to a concentration of dissolved oxygen of from about 0.5 ppm to about 8 ppm, preferably to more than about 4 ppm and more preferably to more than about 6 ppm.

Following steps (a) to (d), the trace element formulation is filled into the chamber of the MCB intended for holding the trace element formulation and the chamber can be sealed. Preferably, the fill tube is then removed. The other chambers of the MCB can be filled simultaneously, before or after filling the trace element chamber. After overpouching the primary container, the MCB can be terminally heat sterilized, e.g. by moist heat sterilization.

According to one embodiment of the invention, selenium can also be provided as selenate, for example as sodium selenate, selenomethionine or selenocysteine. It is a particular advantage that selenate salts, selenomethionine and/or selenocysteine are stable also in solutions with an acidic pH such as preferably used for the trace element formulation according to the invention, and not only at about neutral pH in the range of about 7 to about 7.5 as would have been expected. In addition, it was also found that the stability of selenate is positively affected by the presence of an inorganic or organic acid, especially by the presence of an organic acid selected from the group comprising malic acid, tartaric acid, citric acid, maleic acid, fumaric acid, more preferably malic acid, wherein the concentration of the organic acid is preferably in the range of from about 50 mM to about 400 mM, preferably from about 190 mM to about 220 mM, and more preferably about 200 mM, as mentioned already for selenite.

Trace element formulations comprising a selenate as disclosed before can be prepared in analogy to the formulations comprising selenite, including the conditions for sterilization.

Accordingly, it is one aspect of the present invention that the trace element formulation according to the invention can also contain a selenate, such as sodium selenate, as a selenium source within an MCB according to the invention. Selenate remains equally stable as selenite and may be an excellent alternative to selenite in MCBs according to the invention.

Carbohydrate formulations such as the carbohydrate formulation used in accordance with the invention provide a supply of calories, typically in the form of glucose. In particular, the carbohydrate formulation provides an amount of carbohydrate sufficient to avoid adverse effects such as hyperglycemia that has been observed in patients receiving parenteral nutrition. A broad range of carbohydrate formulations can be used according to the invention, including carbohydrate formulation used in currently marketed products. Typically, the carbohydrate formulation includes about 20 to about 50 grams of glucose per 100 mL of carbohydrate formulation. Carbohydrates comprise glucose, sucrose, ribose, amylose (a major component of starch), amylopectin, maltose, galactose, fructose, and lactose. As mentioned elsewhere, the carbohydrate formulation preferably has a pH of from about 3.2 to about 5.5, such as, for example, from about 3.5 to about 4.8, which is beneficial for stably accommodating vitamins according to the invention.

As used herein, amino acid formulations include a sterile, aqueous solution of one or more amino acids and one or more electrolytes. Typically, amino acid formulations that can be used in amino acid formulation provided in MCBs for PN according to the invention include from about 4 grams to about 25 grams of amino acids per 100 mL of amino acid formulation, such as about 3 grams to about 20 grams per 100 mL of amino acid formulation, about 4 grams to about 17 grams per 100 mL of amino acid formulation, or about 4 grams to about 12 grams per 100 mL of amino acid formulation, such as, for example, about 4 g/100 mL, about 5 g/100 ml, about 6 g/100 mL, about 7 g/100 mL, about 8 g/100 mL, about 9 g/100 mL, about 10 g/100 mL, about 11 g/100 mL, about 12 g/100 mL, about 13 g/100 mL, about 14 g/100 mL, about 15 g/100 mL, about 16 g/100 mL, about 17 g/100 mL, about 18 g/100 mL, about 19 g/100 mL, or about 20 g/100 mL. Amino acids which are included into amino acid formulations are, for example, selected from the group consisting of alanine (Ala), arginine (Arg), aspartic acid (Asp), glutamic acid (Glu), glutamine (Gln), glycine (Gly), histidine (His), leucine (Leu), isoleucine (Ile), lysine (Lys), methionine (Met), phenylalanine (Phe), proline (Pro), serine (Ser), threonine (Thr), tryptophan (Trp), tyrosine (Tyr), valine (Val), cysteine (Cys), ornithine (Orn), taurine and asparagine (Asn). The amino acid formulations according to the invention can further comprise oligopeptides consisting of at least three amino acids and/or dipeptides selected from the group consisting of Acetyl-cysteine (Ac-Cys), Acetyl-Tyrosine (Ac-Tyr), Alanyl-glutamine (Ala-Gln), Glycyl-glutamine (Gly-Gln), and glycyl-tyrosine (Gly-Tyr). Further, the content of tyrosine can be increased by adding, for example, a glycyl-tyrosine dipeptide or acetyl-tyrosine (Ac-Tyr). Typically, however, the glycyl-tyrosine dipeptide has improved pharmacokinetics compared to Ac-Tyr, which is more rapidly eliminated by the kidney, resulting in diminished release of tyrosine in the blood.

According to one embodiment, the amino acid formulation of the present invention comprises the amino acids alanine, arginine, aspartic acid, glutamic acid, glycine, histidine, isoleucine, leucine, lysine, methionine, phenylalanine, proline, serine, threonine, tryptophan, tyrosine, and valine. Said amino acids can be present in the amino acid formulation in a broader range of concentration. Typical concentrations ranges are known in the prior art.

For example, the amino acid formulation according to the invention depending also on the volume and size of the multi-chamber bag and the amino acid chamber of the invention, can include from about 3.0 g to about 25 g alanine (e.g., from about 3.5 g to about 22 g), from about 2.0 g to about 18.0 g arginine (e.g., from about 2.4 g to about 15 g), from about 0.5 g to about 6.0 g aspartic acid (e.g., from about 0.7 g to about 4.5 g), from about 0.6 g to about 10 g glutamic acid (e.g., from about 1.2 g to about 7.7 g), from about 1.2 g to about 12.0 g glycine (e.g., from about 1.6 g to about 11.0 g), from about 1.0 g to about 11.0 g histidine (e.g., from about 1.4 g to about 10.0 g), from about 0.8 g to about 10.0 g isoleucine (e.g., from about 1.1 g to about 8.0 g), from about 1.0 g to about 12.0 g leucine (e.g., from about 1.5 g to about 11.0 g), from about 1.0 g to about 14.0 g lysine (e.g., from about 1.5 g to about 12 g), from about 0.6 g to about 9.0 g methionine (e.g., from about 1.0 g to about 8.0 g), from about 1.2 g to about 12.0 g phenylalanine (e.g., from about 1.5 g to about 11.0 g), from about 0.8 g to about 12.0 g proline (e.g., from about 1.0 g to about 10.0 g), from about 0.5 g to about 8.0 g serine (e.g., from about 0.8 g to about 6.5 g), from about 0.8 g to about 10.0 g threonine (e.g., from about 1.0 g to about 8.0 g), from about 0.04 g to about 0.5 g tyrosine (e.g., from about 0.05 g to about 0.4 g), from about 0.3 g to about 3.5 g tryptophane (e.g., from about 0.4 g to about 2.8 g), and from about 1.0 g to about 12.0 g valine (e.g., from about 1.5 g to about 10.0 g).

According to another embodiment, the amino acid formulation according to the invention, depending on the volume of the amino acid chamber, may contain from about 6.0 g to about 22 g alanine per liter of amino acid formulation; from about 4.0 g to about 15 g arginine per liter of amino acid formulation; from about 1.0 g to about 5.0 g aspartic acid per liter of amino acid formulation; from about 2.0 g to about 10.0 g of glutamic acid per liter of amino acid formulation; from about 2.8 g to about 12.0 g glycine per liter of amino acid formulation; from about 2.0 g to about 10.0 g histidine per liter of amino acid formulation; from about 2.0 g to about 8.0 g isoleucine per liter of amino acid formulation; from about 3.0 g to about 10.0 g leucine per liter of amino acid formulation; from about 3.0 g to about 12.0 g lysine per liter of amino acid formulation; from about 2.0 g to about 8.0 g methionine per liter of amino acid formulation; from about 2.8 g to about 11.0 g phenylalanine per liter of amino acid formulation; from about 2.0 g to about 10.0 g proline per liter of amino acid formulation; from about 1.0 g to about 7.0 g serine per liter of amino acid formulation; from about 1.8 g to about 9.0 g threonine per liter of amino acid formulation; from about 0.3 g to about 0.5 g tryptophane per liter of amino acid formulation; from about 0.09 g to about 0.5 g tyrosine per liter of amino acid formulation; and from about 2.8 g to about 11.0 g valine.

According to another embodiment, once reconstituted, the terminally heat-sterilized multi-chamber bag of the invention provides for a reconstituted solution wherein amino acids are present in a concentration of, for example, from about 3.0 g/L to about 12.0 g/L alanine; from about 1.9 g/L to about 8.5 g/L arginine; from about 0.5 g/L to about 2.6 g/L aspartic acid; from about 0.8 g/L to about 4.5 g/L glutamic acid; from about 1.4 g/L to about 6.0 g/L glycine; from about 1.0 g/L to about 5.5 g/L histidine; from about 0.9 g/L to about 4.5 g/L isoleucine; from about 1.4 g/L to about 6.0 g/L leucine; from about 1.4 g/L to about 6.5 g/L lysine; from about 0.8 g/L to about 4.5 g/L methionine; from about 1.4 g/L to about 5.5 g/L phenylalanine; from about 1.0 g/L to about 5.2 g/L proline; from about 0.5 g/L to about 3.5 g/L serine; from about 0.8 g/L to about 4.2 g/L threonine; from about 0.3 g/L to about 1.6 g/L tryptophan; from about 0.05 g/L to about 0.21 g/L tyrosine; and from about 1.2 g/L to about 5.2 g/L valine.

The amino acid formulation according to the invention may further include electrolytes. As used herein, electrolytes include sodium, potassium, chloride, calcium, magnesium, acetate, hydrogen carbonate, and/or phosphate, which is, for example, provided in the form of hydrogen phosphate or dihydrogen phosphate or as glycerophosphate, such as sodium glycerophosphate. For example, if an inorganic phosphate source is present, calcium will be provided in another chamber of the MCB, such as in the carbohydrate formulation and/or the trace element formulation. This is not mandatory where an organic phosphate source such as, for example, sodium glycerophosphate, is used.

The amino acid formulation according to the invention preferably comprises sodium ($Na^+$), potassium ($K^+$), magnesium ($Mg^{2+}$), glycerophosphate ($C_3H_7O_6P^{2-}$), acetate (CH₃COO⁻), and chloride (Cl⁻). Said electrolytes can be present in the amino acid formulation and the resulting reconstituted solution in a relatively wide range. Typical ranges are known in the prior art.

For example, the amino acid formulation according to the invention, depending also on the volume or size of the multi-chamber bag and the amino acid chamber of the invention, can include from about 0.1 mmol to about 10 mmol of sodium (e.g., about 3.75 mmol to about 10 mmol of sodium), from about 0.1 mmol to about 10 mmol of potassium (e.g., about 3.75 mmol to about 6.90 mmol of potassium), from about 0.05 mmol to about 1.0 mmol of magnesium (e.g., about 0.05 mmol to about 0.11 mmol and/or about 0.38 mmol to about 0.65 mmol of magnesium), from about 0.1 mmol to about 10 mmol of calcium (e.g., about 1.13 mmol to about 5.10 mmol of calcium), from about 0.1 mmol to about 10 mmol of phosphate (e.g., about 0.94 mmol to about 5.10 mmol of phosphate) and not more than 10 mmol of chloride (e.g., not more than 5.6 mmol of chloride) per 100 mL of amino acid formulation. When calcium and phosphorus are present together in the same heat-sterilized solution, insoluble calcium phosphate precipitation can occur. Using an organic salt of phosphorus such as sodium glycerophosphate or calcium glycerophosphate, calcium and phosphate amounts may be increased without solubility issues and without providing excess sodium or chloride. In the amino acid formulation, sodium may be provided in the form of sodium chloride or sodium acetate trihydrate; calcium may be provided in the form of calcium chloride dihydrate or calcium gluconate, magnesium may be provided in the form of magnesium acetate tetrahydrate or magnesium chloride hexahydrate, phosphate can be provided as sodium glycerophosphate and potassium may be provided in the form of potassium acetate or potassium chloride.

According to one embodiment of the invention, sodium is provided as sodium acetate trihydrate, potassium is provided as potassium chloride, magnesium is provided as magnesium chloride hexahydrate, and phosphate is provided as sodium glycerophosphate, hydrated. Accordingly, amino acid formulations according to the invention can contain from about 1.0 g to about 4.0 g sodium acetate trihydrate (e.g., about 1.1 g, about 1.5 g, about 1.8 g, about 2.0 g, about 2.3 g, about 3.0 g or about 3.5 g of sodium acetate trihydrate); from about 1.0 g to about 5 g of potassium chloride (e.g., about 1.2 g, about 1.8 g, about 2.0 g, about 2.2 g, about 2.5 g, about 2.8 g, about 3.0 g, about 3.5 g, about 4.0 g, or about 4.5 g potassium chloride); from about 0.3 g to 2.0 g magnesium chloride hexahydrate (e.g., about 0.4 g, about 0.5 g, about 0.6 g, about 0.7 g, about 0.8 g, about 0.9 g, about 1.0 g, about 1.1 g, about 1.2 g, about 1.4 g, about 1.6 g, about 1.8 g magnesium chloride hexahydrate); and from about 1.0 g to about 9.0 g sodium glycerophosphate 5·H2O (e.g., about 1.5 g, about 1.8 g, about 2.0 g, about 2.4 g, about 2.8 g, about 3.2 g, about 3.5 g, about 3.8 g, about 4.2 g, about 4.6 g, about 5.2 g, about 5.6 g, about 6.0 g, about 6.5 g, about 7.0 g, about 7.4 g, or about 7.8 sodium glycerophosphate 5·H2O)

According to another embodiment, the amino acid formulation of the invention comprises from about 1.8 g sodium acetate per liter of amino acid formulation to about 3.5 g sodium acetate per liter of amino acid formulation, such as, for example, from about 2.0 g/L to about 3.0 g/L. According to another embodiment, the amino acid formulation of the invention comprises from about 2.0 g potassium chloride per liter of amino acid formulation to about 5.0 g potassium chloride per liter of amino acid formulation, such as, for example, from about 2.0 g/L to about 4.2 g/L.

According to another embodiment, the amino acid formulation of the invention comprises from about 0.4 g magnesium chloride per liter of amino acid formulation to about 2.0 g magnesium chloride per liter of amino acid formulation, such as, for example, from about 0.7 g/L to about 1.7 g/L. According to yet another embodiment, the amino acid formulation of the invention comprises from about 2.5 g sodium glycerophosphate 5·H2O per liter of amino acid formulation to about 8.0 g sodium glycerophosphate 5·H2O per liter of amino acid formulation, such as, for example, from about 3.3 g/L to about 7.0 g/L.

Lipid formulations such as mentioned in the context of the present invention are an emulsion of an oil phase, a water phase, and an emulsifier that makes the two phases miscible. In case of lipid emulsions, which are to be used as an injectable emulsion for parenteral nutrition, the emulsion must be an oil-in-water (o/w) emulsion. This means that the oil must reside in the internal (or dispersed) phase, while water is the external (or continuous) phase, as the emulsion must be miscible with blood. Lipid emulsion as disclosed herein must therefore also be substantially free of any suspended solids. Of course, the lipid emulsions may contain further components, including, but not limited to, antioxidants, pH modifiers, isotonic agents, and various combinations thereof. Lipids emulsions often contain low amounts of vitamins such as, for example, vitamin E. Vitamin E, especially α-tocopherol, is, for example, present in olive oil or in certain fish oils as well as in various emulsion blends. Plant germs and seeds, as well as their oils, and products derived from them are also containing vitamin E. In wheat germ, sunflower seeds, cottonseed, and olive oil, α-tocopherol makes up most (50%-100%) of the vitamin E.

An overview over lipid emulsions, their composition and use is provided, for example, in Driscoll, Journal of Parenteral and Enteral Nutrition 2017, 41, 125-134. Further information on the use of lipid emulsions in parenteral nutrition of intensive care patients is provided, for example, in Calder et al, Intensive Care Medicine, 2010, 36(5), 735-749.

Typically, the oil phase of the lipid emulsion may include polyunsaturated fatty acids, such as long-chain polyunsaturated fatty acids, which may be present as the free acid, as an ionized or salt form of the free acid, and/or in ester form. Suitable esters of the polyunsaturated fatty acids/long-chain polyunsaturated fatty acids include, but are not limited to, alkyl esters (e.g., methyl esters, ethyl esters, propyl esters, or combinations thereof) and triglyceride esters. In some cases, the long-chain polyunsaturated fatty acid has a structure $R(C=O)OR'$, wherein R is an alkenyl group having at least 17 carbon atoms, at least 19 carbon atoms, at least 21 carbon atoms, or at least 23 carbon atoms, and R' is absent, H, a counter ion, an alkyl group (e.g., methyl, ethyl, or propyl), or a glyceryl group (e.g., $R(C=O)OR'$ is a monoglyceride, a diglyceride, or a triglyceride). Polyunsaturated fatty acids for use in the lipid formulations disclosed herein include, but are not limited to, linoleic acid (LA), arachidonic acid (ARA), alinolenic acid (ALA), eicosapentaenoic acid (EPA), docosahexaenoic acid (DHA), stearidonic acid (SDA), γ-linolenic acid (GLA), dihomo-γ-linolenic acid (DPA), and docosapentaenoic acid (DPA), particularly, DHA, ARA, and EPA, each of which may be present in free acid form, ionized or salt form, alkyl ester form, and/or triglyceride form. In some cases, the polyunsaturated fatty acids and/or long-chain fatty acids are present in triglyceride form.

Typically, the lipid formulation includes about 5% to about 35% by weight of an oil phase based on the total weight of the lipid emulsion. For example, the oil phase of the lipid formulation is present in an amount of about 8% to 12%, of about 10% to about 20%, of about 10% to about 15%, of about 15% to about 20%, of about 12% to about 17%, of about 18% to 22% and/or about 20% by weight based on the total weight of the lipid formulation. The oil phase typically and preferably contains, in various amounts depending on the source of the oil, omega-3 fatty acids. The three types of omega-3 fatty acids involved in human metabolism are eicosapentaenoic acid (EPA) and docosahexaenoic acid (DHA), both of which are usually found in marine fish oils and α-linolenic acid (ALA), commonly found in plant oils.

The oil phase and its components can be derived from a single source or different sources (see, for example, Fell et al, Advances in Nutrition, 2015, 6(5), 600-610). Of the plant oils, currently used sources include, but are not limited to, soybean and olive oil as well as coconut or palm kernel oil. Another source are algae, including microalgae such as *Crypthecodinium cohnii* and Schizochytrium sp., which in some cases serve as the single source of the long-chain polyunsaturated fatty acid docosahexaenoic acid (DHA). Marine oil used in parenteral lipid emulsions is processed from oily fish primarily found in cold water and including, but not limited to, herring, shad and sardines. However, other marine organisms can be used as an oil source, such as, for example, krill, such as Antarctic krill (*Euphausia superba* Dana). Krill oil, for example, provides for both EPA and DHA, in amounts of up to 35% w/w of the fatty acids.

The lipid emulsions referred to herein may further include additional components, such as surfactants (also referred to as emulsifiers), co-surfactants, isotonic agents, pH adjusters, and antioxidants. Generally, surfactants are added to stabilize emulsions by reducing the interfacial tension between the oil phase and the aqueous phase. Surfactants typically include a hydrophobic part and a hydrophilic part, and the amount of surfactant/emulsifier included in the formulations is determined based on the amount that is needed to achieve a desired level of stabilization of the emulsion. Typically, the amount of surfactant in the lipid formulation is about 0.01% to about 3% by weight based on the total weight of the lipid formulation, for example, about 0.01% to about 2.5% by weight. Suitable surfactants and co-surfactants include surfactants that are approved for parenteral use, and include, but are not limited to, phospholipids (e.g., egg phosphatide and soy lecithin), oleate salts, and combinations thereof. Krill oil can also be used as an emulsifier in the lipid emulsion, wherein the lipid emulsion comprises about 0.5 to about 2.2 wt % krill oil based on the total weight of the emulsion, and wherein the emulsion is free of egg yolk lecithin (US 2018/0000732 A1). Another exemplary surfactant is lecithin, including both natural and synthetic lecithin, such as lecithins derived from egg, corn or soybean or mixtures there-of. In some cases, lecithin is included in an amount of about 1.2% based on the total weight of the lipid formulation.

In some cases, the lipid emulsion formulation includes a cosurfactant. Typically, the amount of co-surfactant in the lipid formulation is less than the amount of surfactant, and typically the amount of co-surfactant in the formulation is about 0.001% to about 0.6% by weight based on the total weight of the lipid formulation. An exemplary co-surfactant is oleate, such as sodium oleate. In some cases, the lipid formulation includes lecithin and oleate as surfactant and co-surfactant, for example, an in amount of about 1.2% lecithin and about 0.03% oleate. In some cases, sodium oleate is included in an amount of about 0.03% by weight based on the total weight of the lipid formulation.

Isotonic agents can be added to the lipid emulsions to adjust the osmolarity of the lipid emulsion to a desired level, such as a physiologically acceptable level. Suitable isotonic agents include, but are not limited to, glycerol. Typically, the lipid emulsion formulation has an osmolarity of about 180 to about 300 milliosmole/liter, such as about 190 to about 280 milliosmole/liter. In some cases, the lipid emulsion includes an isotonic agent in an amount of about 1% to about 10% by weight based on the total weight of the lipid. In some cases, the lipid emulsion formulation includes about 2% to about 3% by weight of glycerol.

pH modifiers can be added to the lipid emulsions to adjust the pH to a desired level, such as a physiologically acceptable pH for parenteral use. Suitable pH modifiers include but are not limited to sodium hydroxide and hydrochloric acid.

The lipid formulation according to the invention can be prepared according to generally known processes (see, for example, Hippalgaonkar et al, AAPS PharmSciTech 2010, 11(4), 1526-1540 or WO 2019/197198 A1)).

According to one embodiment of the invention, the lipid formulation according to the invention is an association of refined olive oil and refined soya oil in a ratio of 80/20, comprising about 15% saturated fatty acids (SFA), about 65% monounsaturated fatty acids (MUFA), 20% polyunsaturated essential fatty acids (PUFA), and wherein the phospholipid/triglyceride ratio is about 0.06. Such composition can be especially beneficial in the context of the invention because olive oil naturally contains alpha tocopherol which, combined with a moderate PUFA intake, contributes to reduce lipid peroxidation. Therefore, it should be noted that in the context of the invention the lipid formulations (both the lipid formulation present in the third chamber and the lipid formulation forming the basis of the vitamin formulation, where applicable) may naturally contain certain amounts of vitamin E. However, amounts and concentrations provided for vitamin E in the context of the invention relate to vitamin E that is added to the respective formulations and does not encompass any naturally occurring vitamin E in said lipid emulsions to which vitamin E is added.

In some embodiments of the invention, the multi-chamber bag can be provided without the lipid formulation provided in the third chamber. For example, there are circumstances when it is undesirable to include a lipid emulsion into the MCB, or admix such lipid formulation with the formulations of the other chambers, for example in products dedicated to pediatric patients, specifically to neonates or infants, for example those under septic status, coagulation abnormalities, high bilirubin level, or for other reasons.

According to one embodiment, the MCB is provided with a seal between the lipid formulation in the third chamber and the other chambers that is permanent and not openable. The admixture and the separate lipid emulsion may then be administered separately without requiring selective activation of the openable seals. Administration ports are then provided on two of the chambers such that one administration port is provided so that the lipid emulsion chamber separated by the permanent seal may be administered (or may not be administered) while a second administration port is provided to allow the admixture of the remaining formulations to be administered.

According to yet another embodiment, the seal between the lipid chamber and the remaining chambers is openable but can be selectively activated as described, for example, in U.S. Pat. No. 8,485,727B2 when provided in a container configuration that allows for selective opening of the seals.

According to another embodiment, the multi-chamber bag of the invention does not comprise a lipid formulation in a third chamber but is provided without said macronutrient formulation. In such case, the terminally heat-sterilized multichamber container comprises at least:

(a) a first chamber comprising a carbohydrate formulation and vitamins,
(b) a second chamber comprising an amino acid formulation and vitamins,
(c) a third chamber comprising a trace element formulation, and
(d) a fourth chamber comprising a vitamin formulation, wherein the vitamin formulation comprises at least vitamin B12, and wherein the trace element formulation comprises at least selenium (Se).

According to one embodiment, the vitamin formulation in such scenario is a lipid emulsion having a pH of from about 5.0 to about 7.0 and comprises an aqueous phase, and about 1% to about 20% by weight of an oil phase based on the total weight of the lipid emulsion and preferably contains less than 1.5 ppm of dissolved oxygen as described above, wherein the vitamin formulation further comprises vitamin A and optionally at least one vitamin selected from the group of vitamins comprising or consisting of vitamin D, vitamin E and vitamin K. According to yet another embodiment, the vitamin formulation may further comprise vitamin B2 and/or vitamin B2. For example, the vitamin formulation may comprise vitamin B12 and vitamin A, or may comprise vitamin B12, vitamin A, vitamin D, vitamin E and vitamin K, or it may comprise vitamin B12, vitamin B2, vitamin B5, vitamin A, vitamin D, vitamin E and vitamin K. Other combinations according to the invention are also possible.

According to a further embodiment, the vitamin formulation of the said fourth chamber is an aqueous solution having a pH of from about 5.0 to about 7.0, and comprises vitamin B12 and optionally at least one vitamin selected from the group of vitamins consisting of vitamin B2 and vitamin B5, and preferably comprises less than 1.5 ppm dissolved oxygen. For example, the aqueous vitamin formulation may comprise vitamin B12, vitamin B2 and vitamin B5.

According to yet another embodiment, when the fourth chamber comprises a vitamin formulation which is an aqueous formulation as described above, the MCB according to the invention may comprise a fifth chamber which comprises another vitamin formulation which is a lipid emulsion having a pH of from 5.0 to 7.0 and comprises an aqueous phase, and 1% to 20% by weight of an oil phase based on the total weight of the lipid emulsion and preferably contains less than 1.5 ppm of dissolved oxygen, wherein the vitamin formulation further comprises vitamin A and optionally at least one vitamin selected from the group of vitamins comprising or consisting of vitamin D, vitamin E and vitamin K.

In the context of the present invention, the terminally heat-sterilized multi-chamber bag is a flexible container. Flexible containers or bags of the invention can be made of materials comprising, without limitation, polyvinyl chloride (PVC), polypropylene (PP), polyethylene (PE), ethylene vinyl alcohol (EVOH), ethylene-vinyl acetate (EVA) and all possible copolymers, essentially any synthetic material suitable for containing the components to be administered.

For example, oxygen impermeable flexible containers are made of gas barrier films that block oxygen migration to the outside of the container. Such a container can for example comprise an oxygen barrier film, preferably with an oxygen permeability of less than 50 cc/m$^2$/day. Different technologies have been developed to provide oxygen barrier to transparent films, such as PE films or polyethylene terephthalate films. The main technologies are the following: (1) Coating with high barrier materials, generally inorganic oxide layers (e.g., SiOx or $Al_2O_3$); (2) Multilayer films, wherein an inner layer consists a barrier material such as EVOH, polyamide, aluminum, halogenated polyvinylidene such as PVDC, amorphous nylon or crystalline nylon or combination of both, copolymers of ethylene vinyl alcohol copolymer layer (EVOH), polyolefins, including combinations of two or more of the above layers, and wherein the outer layers consist of structural polymer (e.g. PE, PP or PET).

The multi-chamber bag according to the invention may be prepared from any of the before-mentioned flexible films. Suitable containers, including soft bags, typically are sterile, non-pyrogenic, single-use, and/or ready-to-use. Such multi-chamber containers are particularly useful for holding a parenteral nutrition product.

The terminally heat-sterilized multi-chamber container according the invention, such as a five-chamber or six-chamber bag, may have various configurations wherein, for example, the five, six or even more chambers can be arranged vertically and/or horizontally, as long as the peelable seals between them allow for the reconstitution of the MCB and its various formulations in a way that the amino acid formulation which functions as a buffering solution is essentially admixed first with formulations having a relatively low pH, such as the carbohydrate formulation. The outside seals of the multi-chamber container are strong seals that do not open under the fluid pressure supplied to open the weaker peel seals or frangible seals between the chambers. In some embodiments, the openable seals of the multi-chamber container may be designed to allow for the admixing or reconstitution of only selected chambers of the multichambered container, for example, the admixing of the lipid emulsion with the vitamin formulation and the amino acid formulation, if so desired.

The chambers of the MCB of the invention may have the same size or may have different sizes to accommodate the various formulations which may different volumes. The chambers may be designed to contain volumes of from, for example, about 1 to about 5 ml, from about 5 to about 10 ml, from about 10 to about 50 ml, from about 50 to about 100 ml, from about 100 to about 250 ml, from about 250 ml to about 500 ml, from about 500 to about 1000 ml, from about 1000 to about 1500 ml. The MCBs can be designed to have chambers which are located adjacent to each other. The chambers may have various shapes. The chambers can be oriented horizontally and/or vertically to each other. Small chambers, such as, for example, chambers designed to hold the vitamin or the trace element formulation, can be designed to be located within another, larger chamber, wherein, for example, the small chamber which is located within another, larger chamber can be accommodated and fixed into said larger chamber by welding at least one edge of said small chamber in between the weld seam of the surrounding larger chamber.

For example, the amino acid chamber of the MCB according to the invention can have a volume of from about 320 mL to about 1200 mL, for example from about 400 mL to about 1200 mL. Typical volumes of the amino acid formulation encompass, for example, about 500 mL, about 800 mL or about 1000 mL. However, larger or smaller volumes are also possible, such as, for example, about 350 mL, if the MCB is designed to provide reconstituted volumes of about 500 mL to about 800 mL only.

The carbohydrate formulation generally has a somewhat smaller volume compared to the amino acid formulation. Volumes of the carbohydrate formulation can have a range of from about 150 mL to about 600 mL, for example from about 250 mL to 550 mL. Typical volumes of the carbohydrate chamber according to the invention are, for example, about 250 mL, about 400 mL or about 550 mL. However, larger or smaller volumes are also possible, such as, for example, about 180 mL, if the MCB is designed to provide reconstituted volumes of about 500 mL to about 800 mL only.

The lipid formulation is generally provided in volumes of from about 100 mL to about 500 mL, for example from about 120 mL to about 450 mL. Typical volumes of the amino acid formulation encompass, for example, about 200 mL, about 300 mL, or about 400 mL. However, larger or smaller volumes are also possible, such as, for example, about 130 mL, if the MCB is designed to provide reconstituted volumes of about 500 mL to about 800 mL only.

As mentioned before, the vitamin formulation and/or the trace element formulation will generally be provided in relatively small chambers, containing from about 2.5 mL to about 100 mL of the formulation. Typically, said chambers will have a volume of from about 10 to about 30 mL.

The heat-sterilized multi-chamber container according to the invention will preferably have a reconstituted volume of from about 600 mL to about 2200 mL, even though smaller or larger volumes are feasible and do not deviate from the invention. Typical reconstituted volumes are, for example, in the range of from about 1000 mL to about 2000 mL, such as, for example, about 1000 mL, about 1300 mL, about 1500 mL, about 1800 mL or about 2000 mL. Smaller reconstituted volumes are, for example, about 620 mL, about 680 mL or about 720 mL.

Multi-chamber containers that can be adapted according to the invention are disclosed, for example, in EP0790051A2, US20160000652A1, and in US20090166363A1. For example, the multi-chamber container may be configured as a bag that includes three adjacent chambers or compartments for the macronutrient formulations and another two or three adjacent chambers for the micronutrients, such as, for example, schematically shown in FIG. 1. If desired, frangible barriers or openable seals (e.g., peel seals or frangible seals) are used to separate the chambers of the multichamber container. The openable seals permit formulations to be separately stored and admixed just prior to administration thereby allowing storage in a single container of formulations which should not be stored as an admixture for an extended period. Opening of the seals allows communication between the chambers and mixing of the contents of the respective chambers. The outside seals of the multi-chamber container are strong seals that do not open under the fluid pressure supplied to open the weaker peel seals or frangible seals between the chambers. A multi-chamber container according to the invention can have filling ports that allow filling of the chambers with the respective formulations during manufacture. Providing a medical port will allow addition of drugs, such as, for example, antibiotics, to the reconstituted solution. According to the invention, such medical port may also be absent. A port for administration is provided in the MCB for allowing administering the reconstituted solution. The container should preferably provide a hanger portion for hanging the container, for example to an IV pole.

The multi-chamber container may be provided with instructions explaining a desired order with which to open the peel seals, so that constituent fluids are mixed in a desired order. The unsealing strengths of the respective peel seals may be varied to promote the opening of the seals in the desired order. For example, the unsealing strength of the peel seal to be opened first may be adjusted to first admix the amino acid, lipid and glucose solution before the unsealing strength required to open the peel seal to be opened second.

The terminally heat-sterilized multi-chamber bag of the invention is a sterilized product. In the context of the invention, the term "sterilized" relates to a solution that has undergone a process of sterilization. Sterilization refers to any process that eliminates, removes, kills, or deactivates all forms of life (in particular referring to microorganisms such as fungi, bacteria, viruses, spores, unicellular eukaryotic organisms such as *Plasmodium*, etc.) and other biological agents like prions present in a specific surface, object or fluid, for example food or biological culture media. Sterilization can be achieved through various means, including heat, chemicals, irradiation, high pressure, and filtration. Sterilization is distinct from disinfection, sanitization, and pasteurization, in that those methods reduce rather than eliminate all forms of life and biological agents present. After sterilization, an object is referred to as being sterile or aseptic.

According to one embodiment of the invention, sterilization is done by heat. According to another embodiment of the invention, methods encompass sterilization with moist heat. The term "moist heat" as used herein includes the use of saturated steam with or without pressure, steam air or water spray sterilization. According to one embodiment of the invention, sterilization with moist heat is preferable. Generally, said sterilization with moist heat can be used for drug products, medical devices, plastic bags and other single-use equipment, glass containers, surgical dressings and more.

In the context of the invention, the multi-chamber container can be terminally sterilized by superheated water sterilization methods. Such methods include, for example, water cascade sterilization and water spray sterilization, including methods employing serial tower continuous sterilization equipment. Superheated water is liquid water under pressure at temperatures between the usual boiling point, 100° C. (212° F.) and the critical temperature, 374° C. (705° F.). It is also known as "subcritical water" or "pressurized hot water." Superheated water is stable because of overpressure that raises the boiling point, or by heating it in a sealed vessel with a headspace, where the liquid water is in equilibrium with vapor at the saturated vapor pressure. Superheated water cascade systems are also very useful for terminally sterilizing the product of the invention. Such systems enable liquids in closed receptacles made of glass or other temperature-resistant materials (such as flexible bags used in the context of the present invention) to be sterilized quickly, reliably and gently. The advantage of the hot water cascade system lies in its very short cycle times, which are achieved through a high circulation rate and cascade density in combination with short heating up and cooling down times.

It is one aspect of the present invention, that the MCB according to the invention undergoes a terminal heat sterilization process that ensures a sterility corresponding to the sterility that is achieved by exposition to a sterilization temperature of 121° C. for 8 minutes. In the context of the invention, a heat sterilization process with an F0 of at least 8 minutes is to be understood as a sterilization process that ensures a sterility corresponding to the sterility that is achieved by exposition to a sterilization temperature of 121° C. for 8 minutes. An F0 value of 8 minutes is understood as referring to 8 minutes exposition to 121° C., meaning that the solution is at a temperature of 121° C. for 8 minutes.

Accordingly, the MCB of the invention and the formulations comprised therein, including heat sensitive components, such as, for example, vitamin B12, may be sterilized by exposing/heating the solution to a temperature that is different from 121° C., but the product requires to have a sterility level that corresponds to at least F0=8 minutes in order to be considered sterile in the context of the invention.

In a preferred embodiment, the multi-chamber container for parenteral nutrition according to the invention is sterilized by moist-heat sterilization, specifically by a superheated water sterilization method. In particular, the use of superheated water sterilization methods, water cascade or water spray sterilization with a serial tower continuous sterilization equipment are preferred methods in the context of the invention, since it was found that the methods can be adjusted for applying low F0/C0 ratios to minimize the total heat-exposure of the formulation containing heat-sensitive components such as, for example, vitamin B12, thereby reducing a loss of the vitamin during sterilization and subsequent storage.

According to one aspect of the invention, the sterilization process that has been applied to the vitamin B12 formulation as part of a multi-chamber bag according to the invention has a C0 value of no more than 130 minutes, preferably no more than 120 minutes, no more than 115 minutes, no more than 110 minutes, no more than 100 minutes, no more than 90 minutes, no more than 80 minutes, no more than 70 minutes, no more than 60 minutes, no more than 50 minutes and no more than 40 minutes. As used herein, the C0 value can be understood as the time (in minutes) during which the vitamin B12 formulation is at a temperature of 100° C. or more during the sterilization process. In general, C0 is a physical parameter used to quantify the total heat consumption of a sample.

According to one aspect of the invention, the F0/C0 ratio of the sterilization process is not less than 0.08, more preferably not less than 0.1. In embodiments, the formulation comprising vitamin B12 underwent a sterilization process with a F0/C0 ratio of 0.08, 0.09, 0.1, 0.11, 0.12, 0.13, 0.14, 0.15, 0.16, 0.17, 0.18, 0.19, 0.2, 0.22, 0.24, 0.26, 0.28, 0.3, 0.32, 0.34, 0.36, 0.38, 0.4, 0.44, 0.48, 0.52, 0.56, 0.6, 0.65, 0.7, 0.75, 0.8, 0.9 or ideally almost 1.0.

The terminally heat-sterilized MCB of the invention is specifically designed for parenteral administration. Parenteral nutrition (PN) is the feeding of specialist nutritional products to a person intravenously, bypassing the usual process of eating and digestion. It is called total parenteral nutrition (TPN) or total nutrient admixture (TNA) when no significant nutrition is obtained by other routes, and partial parenteral nutrition (PPN) when nutrition is also partially enteric or oral. It may be called peripheral parenteral nutrition (PPN) when administered through vein access in a limb rather than through a central vein as central venous nutrition (CVN). The formulation provided by the present invention is especially suitable for CVN. Enteral food administration is via the human gastrointestinal tract and contrasts with parenteral administration.

The disclosure provides methods of treating patients who require parenteral nutrition when oral and enteral nutrition is not possible, insufficient, or contraindicated. The methods involve using the multi-chamber containers and reconstituted formulations disclosed herein. In particular, the methods involve parenterally administering the contents of a multi-chamber container and/or lipid formulations as disclosed herein to a patient. In a preferred embodiment, the patients are adult or adolescent patients but can be adjusted as well to the needs of pediatric patients. Pediatric patients encompass pre-term babies as well as neonates (from birth through the first 28 days of life), infants (29 days to less than 2 years) and children (2 years to less than 12 years).

As described above, the terminally heat-sterilized MCB of the invention provides macronutrients and micronutrients in a ready-to-use format without the need to add any micronutrients before administration in order to address the needs of the patient and meet the applicable guidelines for parenteral nutrition. Accordingly, the MCB of the invention and the parenteral formulation that is reconstituted therefrom can be advantageously used both in a hospital or home setting. The MCB of the invention and the parenteral formulation that is reconstituted therefrom can be used broadly for patients who require parenteral nutrition, including patients that require total or partial parenteral nutrition.

EXAMPLES

The invention is further described by the following examples. These are not intended to limit the scope of the invention but represent certain embodiments and/or certain aspects of the invention. They are provided for illustrating the invention described herein in greater detail and for illustrating the respective effects and findings connected to the invention disclosed herein.

Example 1: Five-Chamber Bags According to the Invention

A five-chamber bag is prepared according to the invention by preparing the respective formulations and filling them into the respective chambers of a 5-chamber bag. The vitamin formulation is prepared under exclusion of light an oxygen, whereas the trace element formulation is prepared in the presence of ambient air, so it will be saturated with oxygen. The chambers are flushed with nitrogen before filling up to final volume. The lipid emulsions are filtered with a 4.5 µm filter before filling. The dissolved oxygen was measured at the beginning of the filling to ensure that the vitamin formulation has a DO content of <1.0 ppm. The headspace volume was set as small as possible (≤10 mL) for the vitamin formulation. In case of the trace element formulation the dissolved oxygen content was measured at the beginning of the filling to confirm that the TE formulation has a DO content of >6.0 ppm. To avoid any risk of vitamin degradation, an aluminum overpouch is used to protect each monobag. An oxygen absorber is placed between the primary bag and overpouch. Seals are inspected before sterilization rack loading. The bag is sterilized by steam sterilization.

The complete formulations (carbohydrate formulation, amino acid formulation, lipid formulation, vitamin formulation, trace element formulation) of an MCB according to the invention are exemplarily shown in Table III-A to Table III-E. The MCB described in the Tables has a total (reconstituted) volume of 1030 mL.

TABLE III-A

The amino acid formulation of a terminally heat-sterilized multi-chamber bag according to the invention. For the other formulation see Tables III-B to III-D.

Amino Acid Formulation Chamber volume (mL): 533

| Components (mass unit) | | Amount in the chamber (x) | Conc. in the chamber (x/L) |
|---|---|---|---|
| AMINO ACIDS | Alanine (g) | 3.66 | 6.87 |
| | Arginine (g) | 2.48 | 4.65 |
| | Aspartic acid (g) | 0.73 | 1.37 |
| | Glutamic acid (g) | 1.26 | 2.37 |
| | Glycine (g) | 1.75 | 3.29 |
| | Histidine (g) | 1.51 | 2.83 |
| | Isoleucine (g) | 1.26 | 2.37 |
| | Leucine (g) | 1.75 | 3.29 |
| | Lysine (g) | 1.99 | 3.74 |
| | Methionine (g) | 1.26 | 2.37 |
| | Phenylalanine (g) | 1.75 | 3.29 |
| | Proline (g) | 1.51 | 2.83 |
| | Serine (g) | 1.00 | 1.88 |
| | Threonine (g) | 1.26 | 2.37 |
| | Tryptophan (g) | 0.43 | 0.80 |
| | Tyrosine (g) | 0.064 | 0.12 |
| | Valine (g) | 1.62 | 3.04 |
| ELECTROLYTES | Sodium acetate trihydrate (g) | 1.16 | 2.18 |
| | Potassium chloride (g) | 1.19 | 2.23 |
| | Magnesium chloride hexahydrate (g) | 0.45 | 0.84 |
| | Sodium glycerophosphate, hydrated (g) | 1.91 | 3.58 |
| VITAMINS | Vitamin B8 - Biotin (μg) | 60.0 | 113 |
| | Vitamin B9 - Folic Acid (μg) | 600 | 1125 |
| | Vitamin C - Ascorbic acid (mg) | 200 | 375 |
| EXCIPENTS | Acetic acid, glacial | q.s. pH target | |
| | Nitrogen | q.s. | |
| | Water for injections | q.s. 533 mL | |

TABLE III-B

The glucose formulation of a terminally heat-sterilized multi-chamber bag according to the invention (for other formulations see Table III-A and Tables III-C to III-E). Specific forms are included in italics for illustration purposes.

Carbohydrate formulation chamber volume (mL): 267

| Components (mass unit) | | amount in the chamber (x) | C in the chamber (x/L) |
|---|---|---|---|
| GLUCOSE | Glucose anhydrous (g) | 75.01 | 281.3 |
| | *Glucose monohydrate (g)* | *82.51* | *309.4* |
| ELECTROLYTES | Calcium chloride dihydrate (g) | 0.30 | 1.13 |
| VITAMINS | Vitamin B1 - Thiamine chloride (mg) | 6.00 | 22.5 |
| | Vitamin B3 - Nicotinamide (mg) | 40.0 | 150 |
| | Vitamin B6 - Pyridoxine (mg) | 6.00 | 22.5 |
| | *Pyridoxine HCl (mg)* | *7.29* | *27.3* |
| EXCIPIENTS | Hydrochloric acid 25% w/w | q.s. pH target | |
| | Nitrogen | q.s. | |
| | Water for injections | q.s. 267 mL | |

TABLE III-C

The lipid formulation of a terminally heat-sterilized multi-chamber bag according to the invention (for other formulations see Table III-A, III-B, Table III-D and Table III-E).

Lipid formulation Chamber volume (mL): 200

| Components (mass unit) | | amount in the chamber (x) | C in the chamber (x/L) |
|---|---|---|---|
| LIPIDS | Olive oil refined (oil ratio 80%) (g) | 24.0 | 120 |
| | Soybean oil (oil ratio 20%) (g) | 6.0 | 30 |
| | Total | 30.0 | 150 |
| EXCIPIENTS | Purified egg phosphatide (g) | 1.80 | 9.00 |
| | Glycerol (g) | 3.38 | 16.9 |
| | Sodium oleate (g) | 0.046 | 0.23 |
| | Sodium hydroxide 0.1N | q.s. pH target | |
| | Nitrogen | q.s. | |
| | Water for injections | q.s. 200 | |

TABLE III-D

The trace element formulation of a terminally heat-sterilized multi-chamber bag according to the invention (for other formulations see Table III-A to Table III-C and Table III-E). Specific forms are included in italics for illustration purposes.

Trace element formulation chamber volume (mL): 15

| Components (mass unit) | | amount in the chamber (x) | C in the chamber (x/L) |
|---|---|---|---|
| TRACE ELEMENTS | Zinc (mg) | 5.00 | 333 |
| | *Zinc Chloride (ZnCl$_2$) (mg)* | *10.4* | *695* |
| | Iron (mg) | 1.00 | 66.7 |
| | *Iron Chloride (FeCl$_3$, 6H2O) (mg)* | *4.84* | *323* |
| | Copper (mg) | 0.300 | 20.0 |
| | *Copper Chloride (CuCl$_2$, 2H$_2$O) (mg)* | *0.805* | *53.7* |
| | Manganese (mg) | 0.0550 | 3.67 |
| | *Manganese Chloride (MnCl$_2$, 4H$_2$O) (mg)* | *0.198* | *13.2* |
| | Chromium (μg) | 10.0 | 667 |

TABLE III-D-continued

The trace element formulation of a terminally heat-sterilized multi-chamber bag according to the invention (for other formulations see Table III-A to Table III-C and Table III-E). Specific forms are included in italics for illustration purposes.

| | | Trace element formulation chamber volume (mL) 15 | |
|---|---|---|---|
| | Components (mass unit) | amount in the chamber (x) | C in the chamber (x/L) |
| | *Chromium Chloride (CrCl₃, 6H₂O) (µg)* | *51.2* | *3416* |
| | Selenium (mg) | 0.0700 | 4.67 |
| | *Sodium Selenite (Na₂SeO₃) (mg)* | *0.153* | *10.2* |
| | Iodine (mg) | 0.100 | 6.67 |
| | *Potassium Iodide (KI) (mg)* | *0.131* | *8.72* |
| | Fluoride (mg) | 1.00 | 66.7 |
| | *Sodium Fluoride (NaF) (mg)* | *2.21* | *147* |
| | Molybdenum (mg) | 0.0200 | 1.33 |
| | *Sodium Molybdate (Na₂MoO₄, 2H₂O) (mg)* | *0.050* | *3.36* |
| EXCIPIENTS | Malic acid (g) | 0.336 | 22.4 |
| | Sodium hydroxide 10% w/V | q.s. pH target | |
| | Nitrogen | q.s. | |
| | Water for injection | q.s. 15 mL | |

TABLE III-E

The vitamin formulation of a terminally heat-sterilized multi-chamber bag according to the invention (for other formulations see Table III-A to Table III-D). Specific forms are included in italics for illustration purposes.

| | | Chamber volume (mL) 15 | |
|---|---|---|---|
| | Components (mass unit) | amount in the chamber (x) | C in the chamber (x/L) |
| VITAMINS | Vitamin A - Retinol (mg) | 0.990 | 66.0 |
| | Retinyl palmitate (mg) | 1.82 | 121 |
| | Vitamin D3 - Cholecalciferol (µg) | 5.00 | 333 |
| | Vitamin E - α-tocopherol (mg) | 10.0 | 667 |
| | Vitamin K - Phylloquinone (µg) | 150 | 10000 |
| | Vitamin B2 - Riboflavine (mg) | 3.60 | 240 |
| | Riboflavine sodium phosphate dihydrate (mg) | 4.92 | 328 |
| | Vitamin B5 - Panthotenic acid (mg) | 15.0 | 1000 |
| | Dexpanthenol (mg) | 14.0 | 936 |

TABLE III-E-continued

The vitamin formulation of a terminally heat-sterilized multi-chamber bag according to the invention (for other formulations see Table III-A to Table III-D). Specific forms are included in italics for illustration purposes.

| | | Chamber volume (mL) 15 | |
|---|---|---|---|
| | Components (mass unit) | amount in the chamber (x) | C in the chamber (x/L) |
| | Vitamin B12 - Cyanocobalamin (µg) | 5.00 | 333 |
| EXCIPIENT | MCT oil (g) | 0.750 | 50.0 |
| | Purified egg phosphatide (g) | 0.0525 | 3.50 |
| | Sodium oleate (g) | 0.001 | 0.075 |
| | Hydrochloric acid 0.1N | q.s. pH target | |
| | Nitrogen | q.s. | |
| | Water for injections | q.s. 15 mL | |

Example 2: Methods for Determining Vitamin a Concentration

Determination of lipid-soluble vitamins can be accomplished by Ultra Performance Liquid Chromatography (UPLC), which separates components of a solution by partitioning of the analytes between a mobile liquid phase and a liquid stationary phase (reversed phase mode). The resulting difference in elution time allows to independently detect the different analytes. It is also possible to determine vitamin A by using HPLC with UV, fluorescence (FLD), electrochemical (ED), or evaporative light scattering (ELSD), detection methods. Generally, care should be taken to reduce exposure of the samples to light and use the respective light-protective equipment. For example, Vitamin A concentrations can be determined by high-performance liquid chromatography (HPLC) as described by Lee et al., Simultaneous Determination of Vitamin A and E in Infant Formula by HPLC with Photodiode Array Detection, Korean J Food Sci Ani Resour 31(2) 191-199. The standard method for the quantitative determination of vitamin a comprises saponification of the test material with aqueous ethanolic potassium hydroxide, and the liberation of vitamin A by extraction with n-hexane. After concentration of the extract, the residue is dissolved in methanol and the vitamin A content is determined after HPLC separation on a RP-C18 column by means of an UV or fluorescence detector.

Example 3: Recovery of Vitamin a from Mixed Micelle and Lipid Emulsion Formulation Under Different Conditions The stability of vitamin A in terminally heat-sterilized compositions such as lipid emulsions and solutions comprising mixed micelles have been examined in laboratory experiments. Multiple studies have been performed, as summarized in Table 4.

TABLE 4

Summary of studies and experiments performed in order to optimize the composition of the vitamin formulation comprising vitamin A to be comprised in a terminally heat-sterilized multi-chamber bag according to of the invention.

| Formulation study | Pharmaceutical form | Formulation comprising | Container | Process | Outcome, Recovery of Vitamin A |
|---|---|---|---|---|---|
| Study A | Mixed micelles | A/D3/E/K sorbitol | Non-PVC, non-oxygen | Terminal heat sterilization | 26.2-27.2% recovery |

TABLE 4-continued

Summary of studies and experiments performed in order to optimize the composition of the vitamin formulation comprising vitamin A to be comprised in a terminally heat-sterilized multi-chamber bag according to of the invention.

| Formulation study | Pharmaceutical form | Formulation comprising | Container | Process | Outcome, Recovery of Vitamin A |
|---|---|---|---|---|---|
| | | | barrier bags | | 6 months at 25° C. |
| Study A1 | Mixed micelles | A/D/E/K sorbitol citric acid | Non-PVC, non-oxygen barrier bags | Terminal heat sterilization | 26.8-26.9% recovery 6 months at 25° C. |
| Study A2 | Mixed micelles | A/D/E/K sorbitol | Non-PVC, non-oxygen barrier bags | Non sterilized | 56.6-90.6% recovery 6 months at 25° C. |
| Study A3 | Mixed micelles | A/D/E/K sorbitol/ citric acid | Non-PVC, non-oxygen barrier bags | Not sterilized | 57.5-58.3% recovery 6 months at 25° C. |
| Study B1 | Emulsion | A/D/E/K 20% lipid emulsion; (80% olive oil, 20% soybean oil) ascorbyl palmitate | Non-PVC oxygen barrier bags | Terminal heat sterilization | 77.0-78.7% recovery 6 months at 40° C. |
| Study B2 | Mixed micelles | A/D/E/K ascorbyl palmitate | Non-PVC oxygen barrier bags | Terminal heat sterilization | 31.6-36.6% recovery 1 month at 40° C. |
| Study B3 | Micellar solution | A/D/E/K Polysorbate 80 & 20 PEG 400 sorbitol | Non-PVC oxygen barrier bags | Terminal heat sterilization | 30.2-33.8% recovery 1 month at 40° C. |
| Study C1 | Lipid emulsion | A/D/E/K 10% lipid emulsion; soybean oil ascorbyl palmitate | Non-PVC oxygen barrier bags + oxygen absorber | Terminal heat sterilization | 95% recovery 3 months at 40° C. |
| Study C2 | Lipid emulsion | A/D/E/K 20% lipid emulsion; soybean oil ascorbyl palmitate | Non-PVC, non-oxygen barrier bags | Terminal heat sterilization | 90% recovery 3 months at 40° C. |
| Study C3 | Lipid emulsion | A/D/E/K 5% lipid emulsion; olive oil ascorbyl palmitate | Non-PVC, non-oxygen barrier bags + oxygen absorber | Terminal heat sterilization | 90% recovery 3 month at 40° C. |
| Study D1 | Lipid emulsion | A/D/E/K 10% lipid emulsion; soybean oil | Non-PVC, non-oxygen barrier bags + oxygen absorber | Terminal heat sterilization | 78.0-86.0% recovery 6 months at 40° C. |

The experiments were performed with vitamin formulations comprising combinations of vitamins A, D, E and K. The results indicated that recovery rates for vitamin A are favorable especially in lipid emulsions, such as, for example, a 10% lipid emulsion with soybean or olive oil or mixtures of these oils, see also Study C1. However, 5% emulsions (e.g. Study C3) as well as 20% emulsions (Study C2) also gave good results, especially considering that the formulations were stored in non-oxygen barrier bags on the latter cases. Therefore, lipid emulsions in the range of from 5% to 20% oil phase in a range of from 5% to 20% w/v of an oil are recommendable for formulations for stably accommodating vitamin A. In addition, using oxygen barrier bags and potentially also oxygen absorbers further improve the stability and thus recovery of vitamin A after storage (Study C1).

In contrast, mixed micelle formulations could not provide for a reasonable stability of vitamin A, even in the presence of oxygen barrier bags (Study B2, B3) and in the presence of various antioxidants, such as, for example, sorbitol, citric acid or ascorbyl palmitate, and where the mixed micelle formulation was not terminally heat-sterilized (Studies A2 and A3). Using oxygen-barrier bags increased the stability of vitamin A (Study B1) but could not bring it to levels obtained with lipid emulsions in oxygen-barrier bags.

Using oxygen barrier bags clearly further improved the stability of vitamin A. Accordingly, it could be confirmed that oxygen levels play an important role in the stability of vitamin A. This was further investigated in the next Example.

Example 4: Impact of Oxygen on the Stability of Vitamin A

The stability of vitamin A was tested in a 10% soybean lipid emulsion having a peroxide level of below 5 milliequivalents (mEq) $O_2$/kg. The lipid emulsion contained vitamin A in a concentration of 1 dd/25 mL, as well as vitamin E in a concentration of 1 dd/25 mL and the pH was adjusted to 5.9 with HCl.

FIG. 2 depicts the dependency of vitamin A recovery on the presence of dissolved oxygen. Independently of the light exposure, it was found that vitamin A is not stable in the presence of oxygen of above 0.3 ppm for more than 6 months at 40° C. Specifically, it was found that for a recovery of at least 80% after 6 months at 40° C., as indicated in FIG. 2, DO level of less than about 0.3 ppm is required. In contrast, no such dependency could be found for vitamin E, which underlines the need to carefully adjust the conditions under which vitamin A is formulated into a parenteral nutrition formulation, specifically in a large volume container such as a multi-chamber container which should also be terminally heat-sterilized according to the invention.

Example 5: Impact of Heat Exposure on the Stability of Vitamin A

A 10% lipid emulsion based on soybean oil containing vitamin A at a concentration of 1 dd/25 ml was provided in a flexible container having a volume of 25 mL at a native pH of about 7.5-8.0. The container consisted of a non-oxygen barrier material. The container was overpouched with a light protective material and an oxygen absorber was added, meaning that no residual oxygen remains in the formulation. The formulation was then submitted to different sterilization conditions. The recovery of vitamin A after sterilization and storage for 6 months at 40° C. was assessed. The results are summarized in Table 5. The $C_0$ value is a measure of the total heat exposure of the API vitamin A. The results demonstrate that vitamin A is susceptible to the total heat exposure it is submitted to, which is a critical component for producing a product according to the invention, especially when the vitamin A formulation forms part of a multi-chamber container having a large volume, such as a 2-, 3-, four- or five-chamber container which, when terminally heat sterilized, requires a significantly higher heat exposure to arrive at a required $F_0$ compared to, for example, a small container of less than, for example, 100 mL, such as a 25 mL or 50 mL container, where also light exposure and oxygen levels can be controlled much more easily.

TABLE 5

Effect of heat on the stability of vitamin A. The heat exposure of the compound is provided as C0 in minutes, which gives a measure for the total heat exposure to which vitamin A is subjected. T0 represents the recovery of vitamin A before sterilization. Recovery rates after storage for 6 months at 40° C. show that the impact of steam sterilization on the vitamin A stability is more pronounced over longer storage times. Obviously, a higher heat exposure during sterilization has a long-term negative effect on vitamin A stability.

| Sterilization Method | Steam sterilization | Water cascade sterilization |
| --- | --- | --- |
| C0 (min.) | 77 | 49 | 37 |
| T0 | 104% | 96% | 97% |
| T6M40° C. | 78% | 82% | 86% |

Example 6: Impact of pH on the Stability of Vitamin A

Two batches of a vitamin A containing formulation as shown in Table 6 were tested regarding the impact of pH on the stability of vitamin A. Both batches were formulated as 5% lipid emulsions with olive oil and stored in an oxygen-barrier material flexible container (overpouched with light protective material and with oxygen absorber) having a volume of 25 mL.

TABLE 6

Effect of pH on vitamin A stability after sterilization and storage at 40° C. for 6 months. T0 refers to the recovery rate before sterilization.

| | Batch 1 | Batch 2 |
| --- | --- | --- |
| Emulsion type | 5% emulsion (olive oil) | 5% emulsion (olive oil) |
| Vitamins concentration | 1dd/25 mL | 1dd/25 mL |
| Bag material | Oxygen-barrier | Oxygen-barrier |
| pH | Native (7.5-8) | Adjusted (5.9) |
| T0 unsterilized | 100% | 100% |
| T6M40° C. sterilized | 73% | 87.5% |

Surprisingly, the recovery rate for vitamin A improves when adjusting the pH to a pH which is below the native one at about 7.5 to 8.0. Accordingly, the pH contributes together with other parameters to the stability of vitamin A in a product according to the invention, specifically also when the vitamin A formulation forms part of a terminally heat-sterilized multi-chamber container having a high volume.

Example 7: Stability of Vitamin B12 During Sterilization

C0 and F0 are two quantitative parameters used to evaluate the amount of heat transferred to a product during a moist-heat sterilization process. F0 describes the lethality performance of the process, whereas C0, a parameter used to quantify the total heat consumption of a sample, relates to the chemical degradation of the API (Active Pharmaceutical Ingredient). Both parameters together provide for relevant information regarding sterilization processes and their impact on the ingredients of the solution to be sterilized. The ratio of C0 vs F0 is therefore important to control heat degradation at defined lethality levels.

Therefore, in a first step, exemplary glucose solutions and lipid emulsions each containing vitamin B12 were submitted to different amounts of C0 during the sterilization step to analyze the impact of C0 on the stability of vitamin B12. Several C0 values were targeted and a wide range, from 20 min to 120 min, was screened to understand the correlation between C0 and the degradation of vitamin B12 in different media. Bags of lipid emulsion were produced, wherein the 5% olive-based emulsion contained vitamin B12 (cyanocobalamin form) at a concentration of 1 dd in 25 mL and, in one case, EDTA in a concentration of 0.1% w/v of the final emulsion (see Table 6). The glucose solutions used for the tests contained vitamin B12 in cyanocobalamin form or hydroxocobalamin form at a concentration of 1 dd in 400 mL. The heat sensitivity of the vitamin was assessed through the analysis of the respective degradation profile.

Results are provided in Table 7. The quantitative determination of vitamin B12 in the form of cyano- and hydroxocobalamins was done by Ultra Performance Liquid Chromatography (UPLC), which separates components of a solution by partitioning of the analytes between a mobile liquid phase and a liquid stationary phase (reversed phase mode). The resulting difference in elution time allows to independently detect the different analytes. The system used was a Waters ACQUITY UPLC I-class coupled with a MS/MS Waters ESI Zspray detector. The column used was ACQUITY UPLC HSS T3 (1.8 μm, 2.1×100 mm) from Waters. All solutions containing cyanocobalamin and hydroxocobalamin are extremely sensitive to light. Accord-

TABLE 6

Summary of formulations tested for analyzing the stability of vitamin B12 under different sterilization conditions (C0)

| Batch | Batch 1 | Batch 2 | Batch 3 | Batch 4 |
|---|---|---|---|---|
| Solution | Glucose A | Glucose B | Lipid Emulsion | Lipid Emulsion |
| Concentration % | 35% | 35% | 5% | 5% |
| Vitamin | B12 (cyanocobalamin) | B12 (hydroxocobalamin) | B12 (cyanocobalamin) | |
| Excipient | N/A | N/A | N/A | EDTA 0.1% w/v of final emulsion |
| pH unsterilized | 3.4 +/− 0.1 | 3.4 +/− 0.1 | 7.2 +/− 0.2 | |
| Bag material | Multi-layer non-PVC film 100 mL | Multi-layer non-PVC film 100 mL | Multi-layer non-PVC film 100 mL | Multi-layer non-PVC film 100 mL |

Five (5) sterilization cycles at 123.5° C. were used wherein five different $C_0$ values were targeted. For each cycle, bags of glucose with vitamin and bags with lipid emulsions comprising vitamin B12 were produced as described above in Table 6 and used. Eight bags were used for each Batch at a $C_0$ of 20 min, 45 min, 70 min, 95 min and 120 min.

The solutions were analyzed unsterilized and sterilized for each cycle. Before each first cycle of the day, an empty cycle at 123.5° C. for 15 minutes exposure was run. In that way, the heating phase of the cycle stayed equivalent for every cycle run. For the entire study, all bags used were multi-layer, non-PVC bags having a volume of 100 mL. The overpouching parameters were: vacuum=85%; gas=85%; sealing=7.5 sec. All cycles were set up at 123.5° C.

Bags were then analyzed at the respective points in time to evaluate the impact on the degradation of vitamin B12.

ingly, all preparations containing these compounds were prepared freshly and kept in an amber volumetric flask. Also, the analysis was done diligently and without unnecessary interruptions. The mobile phases were mM ammonium bicarbonate (A1) and acetonitrile (25 mL of acetonitrile in 475 mL of water for chromatography) (B1). Standard stock solutions of cyanocobalamin and hydroxocobalamin were prepared in acetate buffer. Test solutions were prepared by diluting the samples with purified water (all in amber volumetric flasks). The gradient used was optimized to separate hydroxocobalamin and cyanocobalamin from other constituents of the matrix (Vit B2, B5, FSV, emulsion), see Table 7. The method is known in the art and has been described, for example, in Hampel et al, Journal of Chromatography B, 903, 7-12 (2012) or in Jiang et al., Waters LC/MS Analysis of Vitamin B12, Application NOTE, 2003.

TABLE 7

Impact of $C_0$ (min.) on recovery rates for vitamin B12 for each batch before and after sterilization. Batches are designated according to the Batches shown in Table 6. "Target conc." refers to the concentration before sterilization. "US Recovery" refers to the recovery rate in the unsterilized probes. Vitamin B12 was used as cyanocobalamin ("CC") and as hydroxocobalamin ("HC"). "Sum B12" refers to the sum of CC and HC which could be recovered. "N/Q" means that no vitamin B12 could be recovered or was below the detection level.

| Batch | Vitamin | Target conc. (mg/L) | Unsterilized recovery (%) | 20 min. recovery (%) | 45 min. recovery (%) | 70 min. recovery (%) | 95 min. recovery (%) | 120 min. recovery (%) |
|---|---|---|---|---|---|---|---|---|
| 1 | B12 CC | 0.0125 | 103.2 | 123.2 | 91.2 | 99.2 | 84.8 | 80.8 |
|   | B12 HC | N/A | 29.6 | 15.2 | 26.4 | 25.6 | 23.2 | 36.0 |
|   | Sum B12 | 0.0125 | 132.8 | 138.4 | 117.6 | 124.8 | 108.0 | 116.8 |
| 2 | B12 CC | N/A | 3.9 | 10.9 | N/Q | N/Q | N/Q | N/Q |

TABLE 7-continued

Impact of $C_0$ (min.) on recovery rates for vitamin B12 for each batch before and after sterilization. Batches are designated according to the Batches shown in Table 6. "Target conc." refers to the concentration before sterilization. "US Recovery" refers to the recovery rate in the unsterilized probes. Vitamin B12 was used as cyanocobalamin ("CC") and as hydroxocobalamin ("HC"). "Sum B12" refers to the sum of CC and HC which could be recovered. "N/Q" means that no vitamin B12 could be recovered or was below the detection level.

| Batch | Vitamin | Target conc. (mg/L) | Unsterilized recovery (%) | 20 min. recovery (%) | 45 min. recovery (%) | 70 min. recovery (%) | 95 min. recovery (%) | 120 min. recovery (%) |
|---|---|---|---|---|---|---|---|---|
| | B12 HC | 0.0128 | 115.6 | 116.4 | 33.6 | 20.3 | 18.8 | N/Q |
| | Sum B12 | 0.0128 | 115.6 | 116.4 | 33.6 | 20.3 | 18.8 | N/Q |
| 3 | B12 CC | 0.200 | 109.9 | 81.2 | 85.6 | 41.4 | 35.7 | 11.8 |
| | B12 HC | N/A | N/Q | 11.6 | 23.4 | N/Q | 57.2 | 61.0 |
| | Sum B12 | 0.200 | 109.9 | 92.8 | 109.0 | N/Q | 92.8 | 72.7 |
| 4 | B12 CC | 0.1998 | 159.8 | 110.0 | 66.8 | 36.8 | 28.4 | 32.5 |
| | B12 HC | N/A | N/Q | 38.8 | 99.6 | 91.2 | 100.4 | 120.4 |
| | Sum B12 | 0.1998 | 159.8 | 148.8 | 166.4 | 128.0 | 128.8 | 153.0 |

As can be deduced from Table 7, vitamin B12 is clearly impacted by $C_0$. FIG. 3A and FIG. 3B provide for a graphical representation of the values of Table 7. Generally, it was found that the hydroxocobalamin (HC) form increases when cyanocobalamin form decreases as a result of an increasing $C_0$. It is assumed, therefore, that hydroxocobalamin is transformed into cyanocobalamin during the process. Hydroxocobalamin itself seems then to undergo degradation due to heat exposure.

In the lipid emulsion, Batch 3, this trend was also visible. Starting with about 110% recovery of cyanocobalamin for $C_0=0$ min, it could only be recovered at a rate of about 12% for $C_0=120$ min. At the same time, hydroxocobalamin could not be detected when samples were not yet sterilized but had a recovery rate of 61% for $C_0=120$ min. Results showed a degradation by about 35% of the total sum of vitamin B12 present at $C_0=120$ min. It may further be assumed from the data that hydroxocobalamin is itself subject to degradation. Batch 4 follows the same trend of degradation for the two vitamin B12 forms. Cyanocobalamin decreased and hydroxocobalamin increased with an increasing $C_0$. The total quantity of B12, however, remained relatively constant in Batch 4 which differed from Batch 3 regarding the presence of EDTA as an excipient.

Glucose Batch 1 contained cyanocobalamin as vitamin B12 source. When $C_0$ increases, cyanocobalamin recovery decreases from 123% ($C_0=20$ min) to 80% ($C_0=120$ min) while hydroxocobalamin recovery stays between 15.2% and 36%. The quantity of hydroxocobalamin was relatively constant. The total sum of vitamin B12 fluctuates between 108% and 138%. Vitamin B12 as cyanocobalamin accordingly seems to have a relatively good stability in glucose solutions. Indeed, it seems that $C_0$ has a somewhat lower impact on glucose solutions than on emulsions.

Glucose Batch 2 contained hydroxocobalamin (HC) as vitamin B12 source. Hydroxocobalamin recovery is 116% for $C_0=20$ min, but strong degradation was observed from $C_0=45$ min and HC has completely disappeared at $C_0=120$ min. Accordingly, this test shows that hydroxocobalamin is heat sensitive and will get destroyed at certain sterilization conditions, and that working at carefully selected F0/C0 conditions is important for vitamin B12 stability in either form. It needs to be selected carefully for the intended terminally heat-sterilized multi-chamber container of the invention.

In a next step, the stability of vitamin B12 was examined in Glucose Batch 1 which seemed to be the most promising based on the results shown in Table 7. Accordingly, several bags were stored at 40° C./25% RH for 6 months (T6M). Batch Glucose 1 was analyzed at T6M to revisit the presence of vitamin B12 in either its cyanocobalamin or hydroxocobalamin form. In order to test the validity of the test, vitamins B1, B3 and B6 were tested together with vitamin B12 both after sterilization and then throughout shelf life. All of B1, B3 and B6 showed no significant degradation during the above sterilization. As shown in Table 8, vitamins B1, B3 and B6 were still stable at T6M with more than 80% recovery. However, vitamin B12 could not be detected at T6M despite having been present in Batch 1 after sterilization in sufficient amounts.

Both Cyanocobalamin and hydroxocobalamin could not be detected, irrespective of the preceding $C_0$ value during sterilization. Accordingly, it was found that, surprisingly, even though glucose seems to be a viable medium for vitamin B12 during sterilization, it cannot be used for hosting vitamin B12 in either form. Accordingly, vitamin B12 cannot be stably provided in a glucose formulation and glucose should be avoided in a vitamin B12 formulation according to the invention.

TABLE 8

Vitamin B12 (cyanocobalamin (CC) and hydroxocobalamin (HC)) recovery from glucose solution Batch A (see Tables 6 and 7) after storing the solution at a relative humidity (RH) of 25% and a temperature of 40° C. for 6 months. A target concentration for HC is not provided because the starting material in each case was vitamin B12 in its cyanocobalamin form. "NQ" means that no vitamin B12 in its respective form could be detected.

| Batch | Vitamin | Target concentration (mg/L) | C0 = 45 min Recovery (%) | C0 = 70 min Recovery (%) | C0 = 120 min Recovery (%) |
|---|---|---|---|---|---|
| Glucose Batch 1 | B1 | 19.1 | 94.2 | 93.2 | 92.4 |
| | B3 | 100 | 94.6 | 93.5 | 90.7 |
| | B6 | 18.2 | 84.9 | 82.4 | 80.8 |
| | B12 CC | 0.0125 | NQ | NQ | NQ |
| | B12 HC | NA | NQ | NQ | NQ |

Example 8: Stability of Vitamin B12 in Glucose Formulations, Amino Acid Formulations and Lipid Emulsions During Sterilization and Storage For testing the stability of vitamin B12 in formulation as they are typically used in parenteral nutrition, a 35% glucose solution, a 14.2% amino acid formulation such as found, for example, in Olimel N9E (Baxter), and a 20% lipid emulsion such as found in Clinoleic 20% (Baxter) were supplemented with different vitamin combinations which always included vitamin B12. KCl was added into the glucose solution to understand if it has an effect on the stability of vitamin B12. Vitamin B1 was introduced as thiamin HCl. Ascorbyl palmitate was added to the lipid emulsion formulation as a stabilizing agent due to its antioxidant properties. In addition, two separate micellar solutions ("Vit A" and "Vit B", see Table 9) comprising certain vitamins to be assessed with regard to degradation (B3, B6, B8, B9, B12, C) but formulated with different excipients as micellization agents were tested for vitamin B12 stability. Vit A consisted of a solution of mixed micelles with ascorbyl palmitate as a potential stability enhancer. Vit B was formulated with a mix of polysorbates, PEG and sorbitol to form micelles. The micellar solutions were prepared by mixing, under high speed, a solution composed of glycocholic acid and lecithins dissolved in water. In case of Vit B, the glycocholic acid and lecithin were replaced by PEG and polysorbate. All formulations were provided in standard flexible containers and overpouched with an aluminum overpouch for subsequent sterilization. For an overview over formulations and conditions see Table 9.

All samples were submitted to two different sterilization technologies. Steam sterilization targeting a F0=8 min was used for large volumes (400/800 ml, Cycle 2) and for small volumes (25/50 ml, Cycle 1) as lined out in Table 9 above. The same samples were sterilized by water spray sterilization with a serial tower continuous sterilization equipment with two different exposure times (Cycles 3 (25 min.) and 4 (19 min.)).

The vitamin recovery was then compared between the different sterilization cycles and formulations to understand the impact of the formulation and the sterilization technology used on their respective short- and long-term stability. Therefore, after sterilization, the samples were stored at 40° C./25% RH for 6 months to evaluate the recovery of vitamin B12 at T1M, T3M and T6M. Besides, backup samples were stored at 5° C. Finally, some samples were also stored at 25° C./40% RH to provide for real time stability data.

Figure 4:
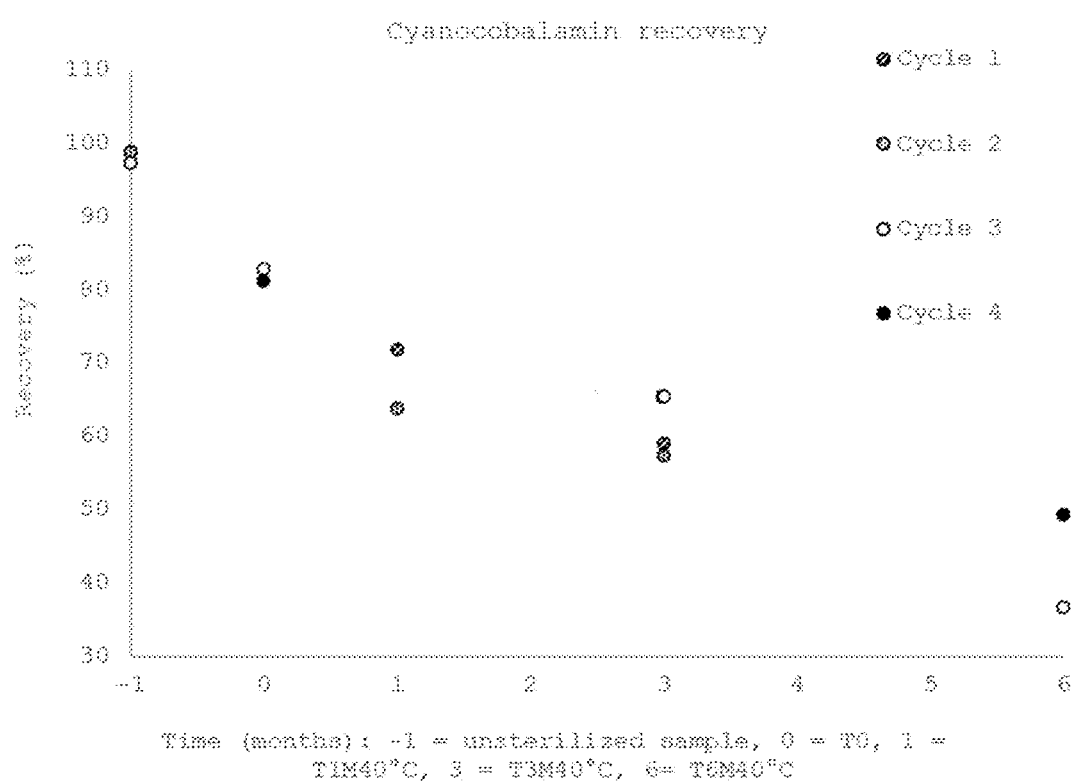
FIG. 4 is a set of graphs showing the recovery/degradation of vitamin B12 added as cyanocobalamin when present in a standard parenteral nutrition glucose solution when submitted to sterilization with steam or water spray sterilization in volumes of 800 ml. Cycle 1 and Cycle 2 show sterilization with steam, whereas Cycles 3 and 4 show sterilization with water spray technology. Degradation of cyanocobalamin in the presence of glucose immediately starts upon sterilization and rapidly progresses over the next months. Degradation is more pronounced when steam sterilization is used. In case of Cycles 1 and 2, after 6 months no cyanocobalamin can be detected anymore.

The results are shown in Table 10A and 10B and Table 11A and 11B, which reflect the outcome for the various sterilization approaches, respectively. The degradation of vitamin B12 in the glucose formulation when sterilized according to Cycles 1 through 4 is also shown in FIG. 4.

TABLE 9

Summary of formulations tested for analyzing the stability of vitamin B12 under different conditions in glucose, amino acid and lipid emulsion formulations. Vitamins were added in an amount of "1 daily dose (dd)" each, e.g. 200 mg vitamin C, 5 μg vitamin B12 etc.

| Compartment | Glucose 35% | Amino Acid 14.2% | Emulsion 20% | Micelles Vit A | Micelles Vit B |
|---|---|---|---|---|---|
| Micronutrients assessed for degradation | B3/B6/B12 | B8/B9/B12 | B12 | B8/B12/C | |
| Specific Excipients | KCl | With (Batch 5) and without EDTA/PVP 17 (Batch 4) | Ascorbyl Palmitate | Ascorbyl palmitate | Polysorbate 80 & 20 PEG 400 Sorbitol |
| pH | 3.9-4.2 | 6.3-6.5 | 8.6-8.7 | 5.7-6.1 | NA |
| Vitamin concentration | 1dd/800 mL | 1dd/400 mL | 1dd/400 mL | 1dd/50 mL | 1dd/25 mL |

TABLE 10A

Stability of vitamin B12 in glucose solutions sterilized according to Cycle 1 (steam sterilization), 25 ml. Vitamin B12 was not determined at T6M/40° C.

|   | Unsterilized | | | Cycle 1 | | | | | | |
|---|---|---|---|---|---|---|---|---|---|---|
|   | Target | T0 | | T0 | | T1M40° C. | | T3M40° C. | | T6M40° C. | |
|   | mg/L | mg/L | % | mg/L | % | mg/L | % | mg/L | % | mg/L | % |
| B3  | 49.954 | 51.10  | 102.3 | N/A | N/A | 49.30  | 98.7  | 50.20  | 100.5 | N/A | N/A |
| B6  | 6.178  | 6.40   | 103.7 | N/A | N/A | 6.40   | 103.7 | 6.50   | 105.3 | N/A | N/A |
| B12 | 0.0063 | 0.0062 | 99.0  | N/A | N/A | 0.0045 | 71.9  | 0.0037 | 59.1  | N/A | N/A |

TABLE 10B

Stability of vitamin B12 in glucose solutions sterilized according to Cycle 2 (steam sterilization), 800 ml. Vitamin B12 was not determined at T6M/40° C.

|   | Unsterilized | | | Cycle 2 | | | | | | |
|---|---|---|---|---|---|---|---|---|---|---|
|   | Target | T0 | | T0 | | T1M40° C. | | T3M40° C. | | T6M40° C. | |
|   | mg/L | mg/L | % | mg/L | % | mg/L | % | mg/L | % | mg/L | % |
| B3  | 49.954 | 51.10  | 102.3 | N/A | N/A | 50.60  | 101.3 | 51.20  | 102.5 | N/A | N/A |
| B6  | 6.178  | 6.40   | 103.7 | N/A | N/A | 5.93   | 96.1  | 6.00   | 97.2  | N/A | N/A |
| B12 | 0.0063 | 0.0062 | 99.0  | N/A | N/A | 0.0040 | 63.9  | 0.0036 | 57.5  | N/A | N/A |

TABLE 11A

Stability of vitamin B12 in glucose solutions sterilized according to Cycle 3 (water spray sterilization, $C_0$ = 25 minutes), 800 ml. The asterisk indicates that the value is the sum of cyanocobalamin and hydroxocobalamin.

|   | Unsterilized | | | Cycle 3 | | | | | | |
|---|---|---|---|---|---|---|---|---|---|---|
|   | Target | T0 | | T0 | | T1M40° C. | | T3M40° C. | | T6M40° C. | |
|   | mg/L | mg/L | % | mg/L | % | mg/L | % | mg/L | % | mg/L | % |
| B3  | 49.954 | 52.80 | 105.7 | 50.50  | 101.1 | N/A | N/A | 50.30  | 100.7 | 48.27   | 96.6  |
| B6  | 6.178  | 6.61  | 107.1 | 6.23   | 101.0 | N/A | N/A | 6.10   | 98.9  | 6.04    | 97.9  |
| B12 | 0.0063 | 0.006 | 97.4  | 0.0051 | 81.4  | N/A | N/A | 0.0041 | 65.5  | 0.0023* | 36.7* |

TABLE 11B

Stability of vitamin B12 in glucose solutions sterilized according to Cycle 4 (water spray sterilization, $C_0$ = 19 minutes), 800 ml. The asterisk indicates that the value is the sum of cyanocobalamin and hydroxocobalamin.

|   | Unsterilized | | | Cycle 4 | | | | | | |
|---|---|---|---|---|---|---|---|---|---|---|
|   | Target | T0 | | T0 | | T1M40° C. | | T3M40° C. | | T6M40° C. | |
|   | mg/L | mg/L | % | mg/L | % | mg/L | % | mg/L | % | mg/L | % |
| B3  | 49.954 | 52.80 | 105.7 | 50.40  | 100.9 | N/A | N/A | 51.00  | 102.1 | 49.35   | 98.8  |
| B6  | 6.178  | 6.61  | 107.1 | 6.27   | 101.6 | N/A | N/A | 5.90   | 95.6  | 6.03    | 97.7  |
| B12 | 0.0063 | 0.006 | 97.4  | 0.0052 | 83.0  | N/A | N/A | 0.0041 | 65.5  | 0.0031* | 49.5* |

It was found that vitamins B3 and B6, for example, are stable in the glucose solutions tested. No significant degradation was detected after steam sterilization and throughout storage. Vitamin B12, in contrast, showed a significant degradation over time, irrespective of the volumes and sterilization techniques used, and despite having a favorable $C_0$ value (Cycle 3) where water spray sterilization was used. In summary it was found that despite potentially promising stability rates in glucose upon sterilization, glucose formulations such as used for PN cannot be used to stably provide vitamin B12 in terminally heat sterilized medical products for parenteral nutrition.

In addition (Table 9), vitamin B12 stability was tested in amino acid formulations as they are used in parenteral nutrition. Vitamin B12 proved to be similarly prone to degradation in the amino acid formulations (not shown). EDTA/PVP17 resulted in a less pronounced degradation, but vitamin B12 (cyanocobalamin) recovery rate was still only 78.9% at T6M40° C. after steam sterilization. Without EDTA/PVP17, the recovery rate for vitamin B12 (cyanocobalamin) was only 60.2% at T6M40° C. after steam sterilization.

Vitamin B12 was also considerably degraded in the lipid emulsion (Tables 12 through 15). Lipid emulsions are generally part of 3-chamber-bags for parenteral nutrition and would therefore be another option to provide vitamin B12, as the amino acid and glucose formulations proved to be not viable for stably providing the vitamin. As shown in Table 9, an emulsion as it is used today in parenteral nutrition was provided and steam sterilized or sterilized by water spray sterilization with a serial tower continuous sterilization equipment as described before (see Cycles 1 and 2 and 3 and 4, respectively). The instability of vitamin B12 in the standard lipid emulsions is probably linked to the presence of ascorbyl palmitate, which is generally present as an antioxidant. It should thus be avoided in formulations according to the invention.

TABLE 12

Recovery rates for vitamin B12 when provided in a lipid emulsion according to Table 5 and sterilized by steam sterilization, Cycle 1. "LOD" means "level of detection".

| | Unsterilized | | | Cycle 1 | | | | | | |
| | Target | T0 | | T0 | | T1M40° C. | | T3M40° C. | | T6M40° C. | |
| | mg/L | mg/L | % | mg/L | % | mg/L | % | mg/L | % | mg/L | % |
|---|---|---|---|---|---|---|---|---|---|---|---|
| B12 | 0.0125 | 0.015 | 118.0 | NA | NA | 0.004 | 35.3 | <LOD | NA | NA | NA |

TABLE 13

Recovery rates for vitamin B12 when provided in a lipid emulsion according to Table 5 and sterilized by steam sterilization, Cycle 2.

| | Unsterilized | | | Cycle 2 | | | | | | |
| | Target | T0 | | T0 | | T1M40° C. | | T3M40° C. | | T6M40° C. | |
| | mg/L | mg/L | % | mg/L | % | mg/L | % | mg/L | % | mg/L | % |
|---|---|---|---|---|---|---|---|---|---|---|---|
| B12 | 0.0125 | NA | NA | 0.005 | 36.9 | <LOD | NA | NA | NA | NA | NA |

TABLE 14

Recovery rates for vitamin B12 when provided in a lipid emulsion according to Table 5 and sterilized by water spray sterilization. The asterisk indicates that the value is the sum of cyanocobalamin and hydroxocobalamin.

| | Unsterilized | | | Cycle 3 | | | | | | |
| | Target | T0 | | T0 | | T1M40° C. | | T3M40° C. | | T6M40° C. | |
| | mg/L | mg/L | % | mg/L | % | mg/L | % | mg/L | % | mg/L | % |
|---|---|---|---|---|---|---|---|---|---|---|---|
| B12 | 0.0125 | 0.014 | 110.0 | 0.005 | 43.4 | NA | NA | NA | NA | 0.0037* | 29.5* |

TABLE 15

Recovery rates for vitamin B12 when provided in a lipid emulsion according to Table 5 and sterilized by water spray sterilization with a serial tower continuous sterilization equipment. The asterisk indicates that the value is the sum of cyanocobalamin and hydroxocobalamin.

| | Unsterilized | | | Cycle 3 | | | | | | |
| | Target | T0 | | T0 | | T1M40° C. | | T3M40° C. | | T6M40° C. | |
| | mg/L | mg/L | % | mg/L | % | mg/L | % | mg/L | % | mg/L | % |
|---|---|---|---|---|---|---|---|---|---|---|---|
| B12 | 0.0125 | 0.014 | 110.0 | 0.006 | 51.4 | NA | NA | NA | NA | 0.0055* | 44.2* |

In consequence, vitamin B12 proved to be instable over time also in lipid emulsions in presence of ascorbyl palmitate as they are generally provided in PN. Finally, as a further option, micellar solutions were tested as potential formulation for stably providing vitamin B12 in medical products for parenteral nutrition.

Accordingly, mixed micelles solutions having smaller volumes (25 ml or 50 ml, see Table 9) were produced according to known methods. The micellar solutions comprised the same vitamins (i.e. B8, B12, C) but were formulated with different excipients as micellization agents. Vit A consisted of a solution of mixed micelles with ascorbyl palmitate as a potential stability enhancer. Vit B was formulated with a mix of agents (Table 9) to form micelles as known in the art. The mixed micelles solutions from Table 5 were then sterilized according to Cycles 1, 2, 3 and 4 as described before and the degradation of vitamin B12 during sterilization and subsequent storage was monitored as described before.

It was found that sterilization with either steam or water spray and subsequent storage lead to an almost complete degradation of vitamin B12 in both mixed micelle solutions tested. In summary, also mixed micelle solutions as known from the art, proved to be not optimal for stably providing vitamin B12 in a terminally heat sterilized medical product for parenteral nutrition.

Example 9: Preparation of Formulations Comprising Vitamin B12

As all generally available formulations provided in PN products, such as glucose, amino acid, or lipid emulsion formulations, including mixed micelle solutions, proved to be detrimental or at least unfavorable for the stable addition of vitamin B12 throughout sterilization and storage, specific vitamin B12 formulations were developed and the stability of vitamin B12 was tested in said dedicated formulations.

Table 16 provides for the various batches which were prepared for testing the stability of vitamin B12 in each setting.

For Batches 1 to 3, concentrated emulsions (40%) were diluted with a factor of 8. The vitamin bulk was used to dilute the emulsion from 40% to 5%. The pH was adjusted at 5.9 with a citrate buffer for Batch 1 and a phosphate buffer for Batch 2. An adjustment to pH 6.5 was performed for Batch 3 with HCl. The final volume was provided by adding Milli-Q water. In case of Batches 2 and 3, EDTA and PVP K17 were added before filling up to the final volume. The emulsions were filtered with a 4.5 μm filter before filling. Flushing of the solutions using N2 was performed before starting the filling of each batch. The Batches were manufactured under exclusion of light and oxygen. The dissolved oxygen was measured at the beginning of the filling to ensure it remains <1.0 ppm. The headspace volume was set as small as possible (≤10 mL) and the filling volume limits was 100 mL per monobag, ±2 mL. To avoid any risk of vitamin degradation, an aluminum overpouch was used to protect each monobag. An oxygen absorber was placed between primary bag and overpouch. Seals were inspected before sterilization rack loading. Four samples per Batch were kept unsterilized for Batches 1 through 4. The other bags were sterilized by steam sterilization in an autoclave to achieve a C0 of 77 min at the end of the exposure phase. Table 17 provides for the composition of the four batches which were tested.

TABLE 16

Outline of test batches comprising various formulations with vitamin B12. The batches differed with regard to the presence of oil, stabilizing agents and pH adjustment agents, respectively. Vitamin B12 was added as cyanocobalamin.

| Batch ID | Description | pH adjustment agent |
|---|---|---|
| 1 | Emulsion (5% olive oil) + B12 | Citrate buffer 5 mM |
| 2 | Emulsion (5% olive oil) + B12 + EDTA/PVP | Phosphate buffer 5 mM |
| 3 | Emulsion (5% olive oil) + B12 + EDTA/PVP | NaOH/HCl |
| 4 | Aqueous + B12 + EDTA/PVP | NaOH/HCl |

TABLE 17

Description of Batches 1 to 4 which were tested for vitamin B12 stability.

| Constituents | Daily dose (dd) | Concentration (mg/L) corresponding to 1dd/25 mL | | | |
|---|---|---|---|---|---|
| | | Batch 1 | Batch 2 | Batch 3 | Batch 4 |
| Vitamin tested | | | | | |
| Vitamin B12 (cyanocobalamin) | 5 μg | 0.2 | 0.2 | 0.2 | 0.2 |
| Excipients | | | | | |
| Olive oil | N/A | X | X | X | — |
| Egg lecithin | N/A | X | X | X | — |
| Glycerol | N/A | X | X | X | — |
| Sodium Oleate | N/A | X | X | X | — |
| Monosodium Phosphate | N/A | — | 5 mM | — | — |
| Acid citric | N/A | 5 mM | — | — | — |
| EDTA | N/A | — | 0.01% w/v | 0.01% w/v | 0.01% w/v |
| PVP 17 | N/A | — | 0.05% w/v | 0.05% w/v | 0.05% w/v |
| Sodium hydroxide, hydrochloric acid | N/A | pH 5.9 | — | pH 6.5 | pH 5.9 |

The result for the emulsion Batches 1 to 3 are provided below in Table 18. It provides for the results of vitamin B12 recovery for cyanocobalamin (CC), hydroxocobalamin (HC) before and directly after water cascade sterilization. The sum of both vitamin forms is provided as well. Also tested were the pH after sterilization and the dissolved oxygen content (DO) in ppb.

TABLE 18

Vitamin B12 recovery, pH and dissolved oxygen content for Batches 1 to 3 (5% emulsions) before and after sterilization. Cyanocobalamin (CC) and hydroxocobalamin (HC) were determined and the sum of both vitamin B12 forms is shown.

| Batch | Vitamins/Others | B12 (CC) | B12 (HC) | B12 Sum | pH | DO (ppb) |
|---|---|---|---|---|---|---|
| Batch | Emulsions | 106.9 | 112.9 | N/A | N/A | N/A |
| 1 | Unsterilized | 113.8 | 15.2 | 129.0 | N/A | N/A |
| 1 | Sterilized | 63.2 | 12.6 | 75.8 | 6.22 | 0.0 |
| 2 | Unsterilized | 110.8 | 14.5 | 125.3 | N/A | N/A |
| 2 | Sterilized | 75.0 | 49.4 | 124.4 | 5.99 | 0.0 |
| 3 | Unsterilized | 115.1 | 12.5 | 127.6 | N/A | N/A |
| 3 | Sterilized | 64.3 | 13.5 | 77.8 | 6.50 | 0.0 |

Recovery of vitamin B12 was lower for Batch 1 compared to Batch 2 (containing phosphate buffer, EDTA and PVP) and Batch 3 (containing EDTA and PVP), indicating that the phosphate buffer and the presence of EDTA and PVP K17 attributed to the higher stability of vitamin 12 in Batches 2 and 3. Importantly and surprisingly, the sum of the vitamin B12 forms indicates that hydroxocobalamin is not degraded further in the 5% emulsions. Accordingly, the total amount of vitamin B12 remains stable and the tested emulsions seem to be a viable form of stably providing vitamin B12 in a terminally heat-sterilized multi-chamber container according to the invention.

The formulation of vitamin B12 (Batch 4) was tested in optimized conditions (oxygen content, pH, sterilization method), and the results are summarized in Table 19. Vitamin B12 remains stable up to T7M40° C. (seven months at 40° C.). Vitamin B12 was stable and present as cyanocobalamin.

TABLE 19

Results for Batch 4 (aqueous solution): vitamin B12 recovery, pH and dissolved oxygen content before and after sterilization as well as after storage for 3 and 7 months at the indicated temperatures. ND means "not detected".

| Batches | Conditions | Sum B12 | B12 (CC) | B12 (HC) | pH | DO (ppb) |
|---|---|---|---|---|---|---|
| Analysis 1 | | | 108.4 | 134.1 | | |
| 4 | Unsterilized | T0 | 107.0 | 107.0 | ND | — | 0 |
| 4 | Sterilized | T0 | 107.4 | 97.8 | 9.6 | 6.01 | 0 |
| Analysis 2 | | | 112.9 | 114.1 | | |
| 4 | Sterilized | T3M 40° C. | 94.8 | 94.8 | ND | 5.9 | 0.025 |
| 4 | Sterilized | T7M 40° C. | 116.1 | 116.1 | ND | — | — |
| 4 | Sterilized | T7M 25° C. | 125.7 | 125.7 | ND | — | — |

Example 10: Impact of Oxygen and Light on the Stability of Vitamin B12

A 10% soybean oil emulsion with low peroxide level (1 mEq O2/kg) was formulated to contain vitamin B12 in its cyanocobalamin form (1 dd/25 mL). The pH was adjusted to an optimum of 5.9 with a phosphate buffer. In addition, an aqueous solution was prepared and (1 dd/25 mL) vitamin B12 was added. The pH was also adjusted to 5.9 using HCl. Various oxygen exposure levels were tested.

(a) 0 ppm oxygen: packaging of the formulation into an oxygen permeable flexible container, which was overpouched in the presence of an oxygen absorber. Like this, the oxygen contained in the formulation is removed.

(b) <0.5 ppm oxygen: packaging into an oxygen barrier material after flushing of the bag with N2, followed by overpouching without oxygen absorber. The oxygen in the formulation remains entrapped therein.

(c) <1.0 ppm oxygen: packaging into oxygen barrier material followed by overpouching without oxygen absorber. Oxygen remains entrapped in the formulation.

The various formulations were exposed to light for 0, 2 h, 7 h, 24 h.

For the lipid emulsion it was found that at the chosen conditions (10% low peroxide lipid emulsion, pH 5.9, phosphate buffer, oxygen remains below 1.0 ppm) it was possible to stabilize vitamin B12 in a way that surprisingly it is less impacted by light and oxygen as it could be expected based on what is known about light sensitivity of the vitamin. In contrast, cyanocobalamin over time is transformed into hydroxocobalamin, but the sum of both forms falls below a recovery of 80% only after 5 months at 40° C.

In contrast, vitamin B12 in the aqueous solution remains light sensitive. When exposed to light for more than 2 hours the recovery of vitamin B12 drops below 80% very quickly.

Example 11: Impact of pH on the Stability of Vitamin B12

Two batches of a lipid emulsion (5% olive oil comprising 1 dd/25 mL vitamin B12 (associated vitamins A, D, E, K) were filled in oxygen permeable bag material with an oxygen absorber, protected from light and stored for 6 months at 40° C. after sterilization ($C_0$=40 min for Batch 1 and $C_0$=80 min for Batch 2). Batch 1 was adjusted at pH 7.0 whereas Batch 2 was adjusted to pH 5.9. 53.8% of vitamin B12 (cyanocobalamin plus hydroxocobalamin) were recovered from Batch 1, whereas 138% vitamin B12 (cyanocobalamin plus hydroxocobalamin) were recovered from Batch 2.

Example 12: Lab-Scale Manufacturing of a Selenite Containing Solution for Addition to a Multi-Chamber Container for Parenteral Nutrition According to the Invention For preparing a selenite containing solution according to the invention the required amount of organic acid is dissolved in water for injection and the pH of the solution is adjusted to the target pH±0.5 with NaOH or HCl, as needed. In a next step the selenium as sodium selenite, selenium dioxide or selenous acid is introduced into the solution and stirred or agitated until complete dissolution. Afterwards, the pH is again controlled and, if needed, finally adjusted to the target pH±0.2 with NaOH or HCl. Oxygen can then be introduced either by exposing the solution to the atmosphere under stirring or agitation, followed by measuring the DO and flushing the solution with nitrogen if the DO is too high and needs to be adjusted to lower values, flushing with nitrogen is stopped, accordingly, when the target oxygen concentration is reached.

Alternatively, the solution is initially flushed with nitrogen to remove essentially all of the dissolved oxygen and oxygen is then added e.g. by stirring the solution or by bubbling oxygen into the solution under constant measurement until the desired amount of oxygen is dissolved. Once the desired DO has been achieved, the solution is filled into the chamber of an MCB under constant control of the DO and the chamber is then closed/sealed, taking care of providing for the necessary headspace which is generally filled with ambient air. The solution can then undergo terminal heat sterilization as part of the MCB.

Example 13: Lab-Scale Manufacturing of a Trace Element Formulation for Addition to a Multi-Chamber Container for Parenteral Nutrition According to the Invention For preparing a multi trace element formulation according to the invention the required amount of organic acid is dissolved in water for injection and the pH of the solution is adjusted to the target pH with NaOH or HCl, as needed. In a next step the required amount of each trace element weighed in and added to the solution under constant stirring or agitation until complete dissolution. If, for certain trace elements, the required quantity is too low for weighing in the required amount, an intermediate concentrated solution can be previously prepared. A given volume of this intermediate solution will then be added to the final solution to reach the target concentration. Afterwards, the pH is again controlled and, if needed, finally adjusted to the target pH±0.2 with NaOH or HCl. Where selenite is comprised in the formulation, oxygen can then be introduced either by exposing the solution to the atmosphere under stirring or agitation, followed by measuring the DO and flushing the solution with nitrogen if the DO is too high and needs to be adjusted to lower values, flushing with nitrogen is stopped, accordingly, when the target oxygen concentration is reached.

Alternatively, the solution is initially flushed with nitrogen to remove essentially all of the dissolved oxygen and oxygen is then added e.g. by stirring the solution or by bubbling oxygen into the solution under constant measurement until the desired amount of oxygen is dissolved. Once the desired DO has been achieved, the solution is filled into a container under constant control of the DO and then closed/sealed, taking care of providing for the necessary headspace which is generally filled with ambient air. Preferably, the filling tube is thereby removed. The solution can then undergo terminal heat sterilization as part of the MCB.

Example 14: Methods for Determining the DO Concentration

As mentioned in the description of the invention, various methods can be used to determine the DO content of a given solution. Generally, electrochemical or optical sensors are used for determining the DO concentration according to the invention. A preferred method comprises using a fiber-optic oxygen meter such as MICROX TX3, which is a single-channel, temperature-compensated oxygen meter with fiberoptic trace oxygen microsensors based on a glass fiber (e.g. 140 μm). The optical oxygen microsensors (also called optodes) do not consume oxygen, their signal does not depend of the flow rate of the sample, the diameter of the microsensor tip is e.g. <50 μm, they measure oxygen in both liquid and gas phase and they have an on-line temperature compensation of the oxygen content. For data visualization during measurements, the oxygen meter is connected to a LCD & Data-Logger Unit. The oxygen measure and adjustment are based on an equilibrium between exposure to nitrogen and oxygen containing gases during the mixing and filling steps of the process. An acute and regular monitoring of the solution DO throughout these process steps allows to control the oxygen level within the final container. Besides, the headspace of the bag can be filled with a specific volume of nitrogen or oxygen to reach the final targeted level of DO.

Example 15: Impact of DO on Selenium Stability

The impact of oxygen seems of major importance in the stability of selenite containing trace element formulations. Indeed, the few amounts of oxygen that penetrates the solution initially flushed with nitrogen but stored in glass bottles certainly blocked the reduction reaction and allowed to maintain the stability of selenite. To confirm this hypothesis, a regression test was performed between Se assay results and log(dissolved oxygen results). Only sterilized samples stored at 40° C. were considered as the sterilization and storage at high temperature seem to both increase the Se degradation. Indeed, most reaction kinetics are accelerated by heat explaining that samples not sterilized and kept at 5° C. for 6 months do not present a degradation as important as for samples sterilized and stored at 40° C.

Figure 5:
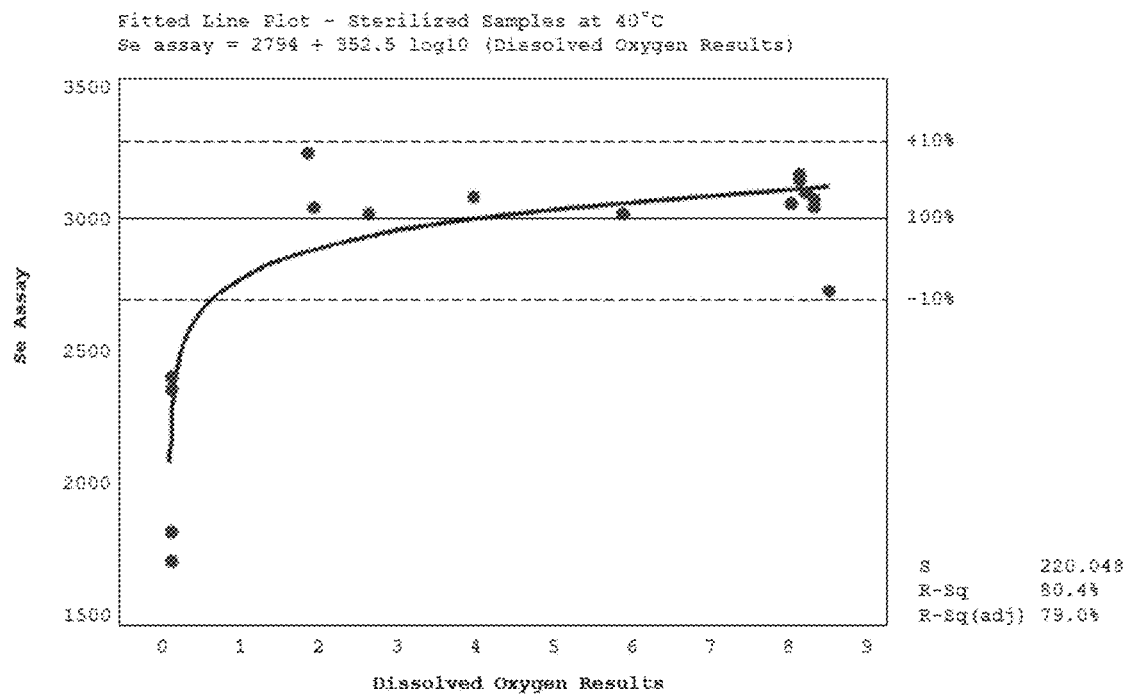
FIG. 5 is a graph of a fitted line plot showing an 80% fit between Se dosage and log oxygen content (ppm), demonstrating the dependency of selenium (selenite form) on the dissolved oxygen concentration in the formulation.

The fitted line plot presented in FIG. 5 shows a 80% fit between Se dosage and log oxygen content. Considering a +/−5% analytical variability and the few samples used for this regression test it can be considered as significantly representative. Dissolved oxygen content is so the most impacting parameter and CQA in the stability of Selenium. Low oxygen amounts of around 0.5 ppm can be sufficient to ensure the stability of selenite in the trace element formulation, no saturation would be required.

The presence of oxygen promotes selenite stability. To ensure that it is not deleterious to another TE the stability of a mix of the 9 TE of interest (i.e. Zn, Cu, Cr, Mo, Mn, Fe, I, F & Se) was evaluated at pH 2.2 with 200 mM of malic acid (to ensure iodide stability) and stored in a glass bottle (so containing about 3 ppm of dissolved oxygen). The solution was heat sterilized and stored 6 months at 40° C. or 5° C. (T6M 40° C. and T6M 5° C., respectively).

For all trace elements recoveries were found to be around 80-90% at both temperatures, with 87.2% for selenite at T6M 5° C. and 87.7% at T6M 40° C. Comparison of the two samples showed that none of the TE was degraded significantly after 6 months storage at 40° C. It confirms the hypothesis that selenite is stable in the presence of dissolved oxygen as described herein. This presence of oxygen is obviously also not deleterious for the stability of the other TE. It can thus be confirmed that oxygen introduction would not be a problem in manufacturing. For example, instead of flushing the TE formulation and/or the respective chamber of the MCB with nitrogen as it was done so far, it can be kept under ambient air allowing a sufficient amount of oxygen to be dissolved into the formulation. This oxygen content could be monitored at any time as an in-process control. During filling, sterilization and storage steps, the dissolved oxygen could be maintained in the solution by using a bag material impermeable to oxygen. Such materials do neither allow any oxygen entering the bag nor being removed out of the bag (even in contact with an oxygen absorber). This way the oxygen would remain entrapped within the TE solution and avoid selenite degradation all along the shelf life of the product.

Example 16: Tests Performed with Oxygen Semi-Permeable and Oxygen Impermeable Barrier Films Tests have been performed with two different films, an oxygen semipermeable-film (EU2-S) and an oxygen impermeable film (EU2-F). The semi-permeable film is a co-extruded film having the following structure: PP|Tie|PA|Tie|PP/SEBS/LLDPE. Therein, "PP" refers to polypropylene, "PA" refers to polyamide, "SEBS" refers to styrene-ethylene-butylene-styrene block copolymer, and "LLDPE" refers to linear low-density polyethylene. "Tie" refers to special adhesive polymers or "tie resins" which are typically polyethylene copolymers of polar and nonpolar repeat units and with or without functional reactive groups, which are used to improve adhesion between the main layers of the multi-layer film. The oxygen barrier of the film is provided by the polyamide layer (~50 cc/m$^2$/day). Corresponding films have been described, for example, in US20100247935A1. The semipermeable film allows some oxygen to pass.

The oxygen-impermeable film is made from a coextruded polyolefinic material laminated to a polyester with a deposit of silicon oxide to provide an oxygen barrier, i.e. the oxygen barrier provided by PET-SiOx is <1 cc/m$^2$/day. In the tests described 1 dd/25 ml of sodium selenite was present at a pH of 3.0+/−0.2. 100 mM malic acid was present as well in a 50 ml mono-bag having one port-tube, wherein the bag was either made of semi-permeable or oxygen-impermeable material as described above. After mixing, the respective solution was flushed with nitrogen to arrive at a DO of below 0.5 ppm. A headspace of 10 ml ambient air was left in said 50 ml bag. After filling the oxygen was allowed to reach saturation (about 8 ppm, see FIG. 3). The respective container was sealed and wrapped in an oxygen impermeable aluminum overpouch to which an oxygen absorber was added. The respective container was then submitted to moist heat sterilization. The following results were observed:

As shown in FIG. 7 it was found that selenite, in the EU-2S batch (semi-permeable), fell below 80% recovery after about 5 months (FIG. 7A). It can be concluded that oxygen is drawn from the solution because of the oxygen absorber present on the outer pouch and the presence of a semi-permeable primary film which allows oxygen to pass. In the EU2-F bag (oxygen-impermeable), this did not happen because of the oxygen barrier film (FIG. 7B). Selenite was retained and stayed above the threshold of 80% recovery. So, an oxygen barrier film is advantageous to ensure stability of the selenite containing solution.

Figure 6:
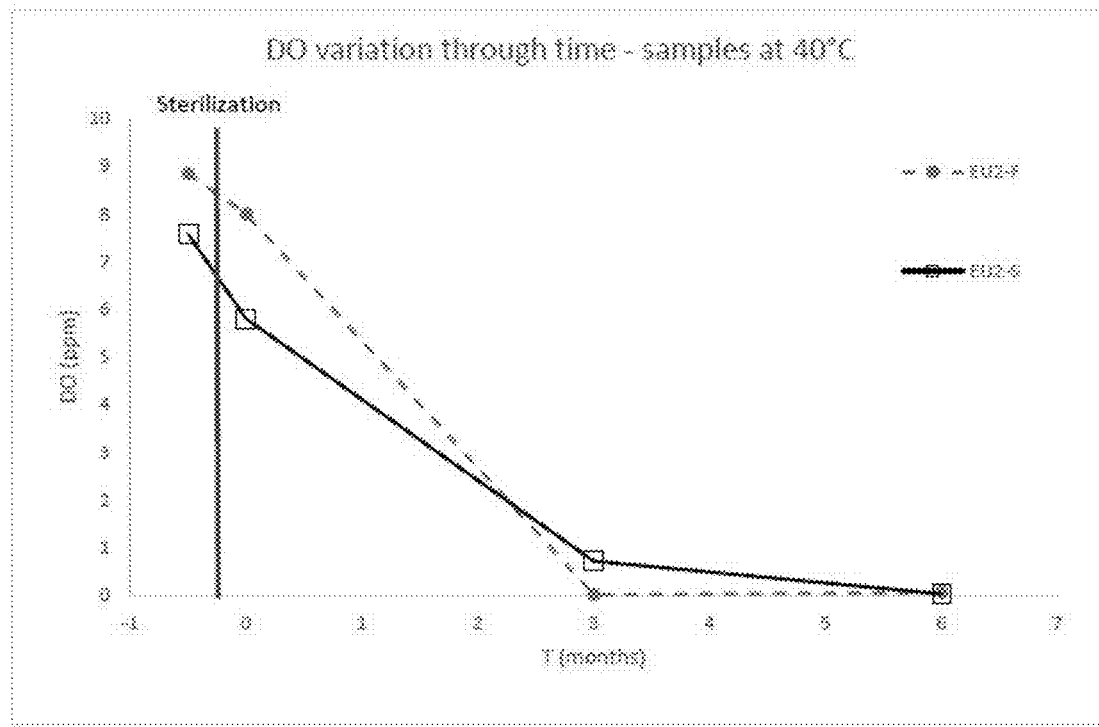
FIG. 6 is a set of graphs showing the development of DO concentration in an aqueous solution over time in a container made of oxygen-semipermeable (EU2-S) and oxygen-impermeable (EU2-F) films.

Importantly, as shown in FIG. 6, the DO fell from saturation to essentially 0 ppm DO in both cases even though this process was faster in case of the EU2S semi-permeable film and the effect of the oxygen absorber.

Accordingly, the DO content decreased even though an oxygen barrier film was used. It was found that some components in the solution, including, for example, other trace elements or malic acid, seem to consume the DO, even though it is no longer lost by permeating through the film. The presence of malic acid, for example, was found to have an influence on the DO consumption in such scenario. Without wanting to be bound by theory, it is assumed, that the redox potential in the solution favors the consumption of (reaction with) oxygen. Importantly, as long as the DO concentration does not decrease below 0.5 ppm, the selenite remains stable and can be recovered with a rate of above 80% over 5 months. This is achieved by having a DO, at the time of filling, of above 6 ppm, preferably between 6-8 ppm (essentially up to saturation).

Example 17: Relevance of Headspace

In this example, Milli-Q water was used that was kept at ambient air and was, accordingly, saturated with oxygen. The solution volume used was 15 ml. As shown in FIG. 8A, it was found that without headspace, even when the oxygen impermeable film was used, DO content rapidly fell below the threshold of 0.5 ppm (in contrast to the above setup, where headspace was included). It could thus be shown that the headspace filled with ambient air provides for an "oxygen stock" which replaces oxygen that is lost from the container due to the presence of a port tube. Oxygen from the headspace slowly gets dissolved in the solution until equilibrium is reached. Accordingly, the DO can be kept above 0.5 ppm over time if a headspace is present. Without headspace (filled grey circles), the selenite cannot be stabilized due to DO loss over time.

Accordingly, the port tube is another aspect which may contribute to DO loss, as the port tube must be sealed between the film layers and this portion of the seal is difficult to make completely oxygen tight. Accordingly, it is advantageous to improve the oxygen tightness of the port tube used in a setting as described herein, or, where possible, to completely remove the port tube, if possible. In FIG. 8A, it becomes obvious that without headspace and without port tube (open black circles) the DO is higher over time compared to a port tube being present (closed grey circle), and that a headspace of 5 ml, for example, cannot fully compensate the loss over the port tube (open black triangle). Preferably, there is a headspace and no port tube, if possible, for stabilizing a selenite comprising solution in an oxygen barrier bag. In such setting, the DO can basically be maintained (filled grey triangle).

FIG. 8B focuses on the volume of the headspace. As can be seen and as discussed above, a headspace is required for maintaining required DO levels in compositions where oxygen present in the solution at the time of filling is consumed by components present in the solution (DO is consumed by redox reaction in the solution, see open black circles, dashed line) or otherwise lost from the container. 2 ml headspace per 25 ml container/chamber volume or 15 ml solution is not fully sufficient either (black triangles). With 6 ml headspace the threshold of 0.5 ppm can about be met even if a port tube is present (grey square, continues line) and is fully sufficient if a port tube is absent (grey square, dashed line). Best results are obtained with a headspace of 10 ml per 15 ml solution of the chamber/container (filled grey circles, continuous line), even if port tube is present (filled grey circles, dashed line).

Figure 9:
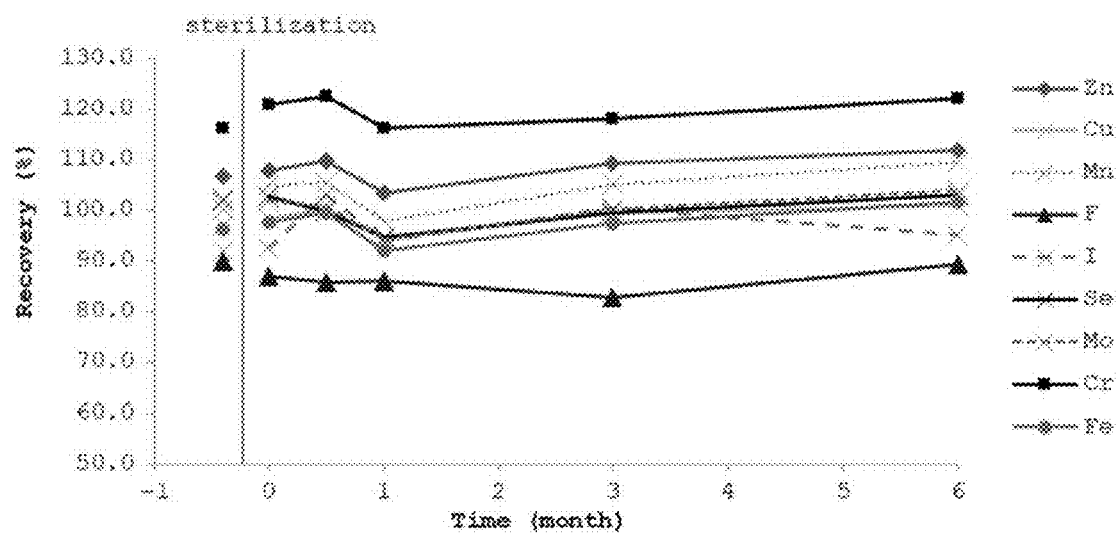
FIG. 9 is a set of graphs showing the general recovery from a standard TE solution of different trace elements in percent (%) as indicated on the Y-axis of the Figures. The analyzed timepoints are indicated on the X-axis. The timepoint −0.5 corresponds to the results in an unsterilized sample at T0, basically corresponding to the amount added to the formulation. Timepoint 0 corresponds to the results of TE dosage right after sterilization. Timepoint 0.5 correspond to the results of TE dosage after an accelerated stability stress cycle (i.e. three repetitions of alternatively 5° C./50° C., 48 h/48 h). Timepoints 1, 3 and 6 correspond to the results of TE dosage after 1 month, 3 months and 6 months storage at 40° C./25% RH.
Figure 10:
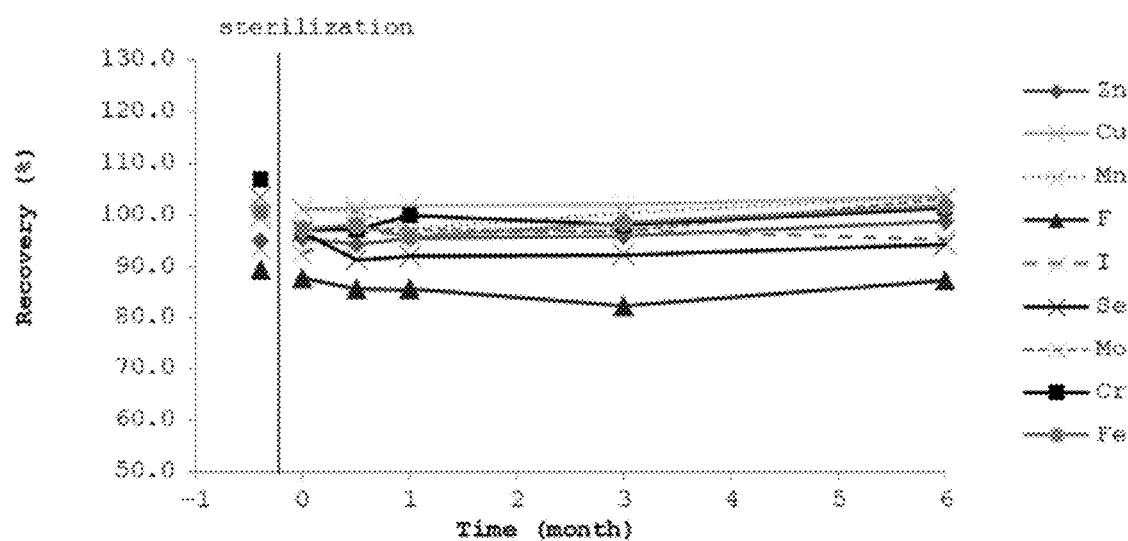
FIG. 10 is a set of graphs showing the general recovery from a standard TE solution of different trace elements in percent (%) as indicated on the Y-axis of the Figures. The analyzed timepoints are indicated on the X-axis. The timepoint −0.5 corresponds to the results in an unsterilized sample at T0, basically corresponding to the amount added to the formulation. Timepoint 0 corresponds to the results of TE dosage right after sterilization. Timepoint 0.5 correspond to the results of TE dosage after an accelerated stability stress cycle (i.e. three repetitions of alternatively 5° C./50° C., 48 h/48 h). Timepoints 1, 3 and 6 correspond to the results of TE dosage after 1 month, 3 months and 6 months storage at 40° C./25% RH.
Figure 11:
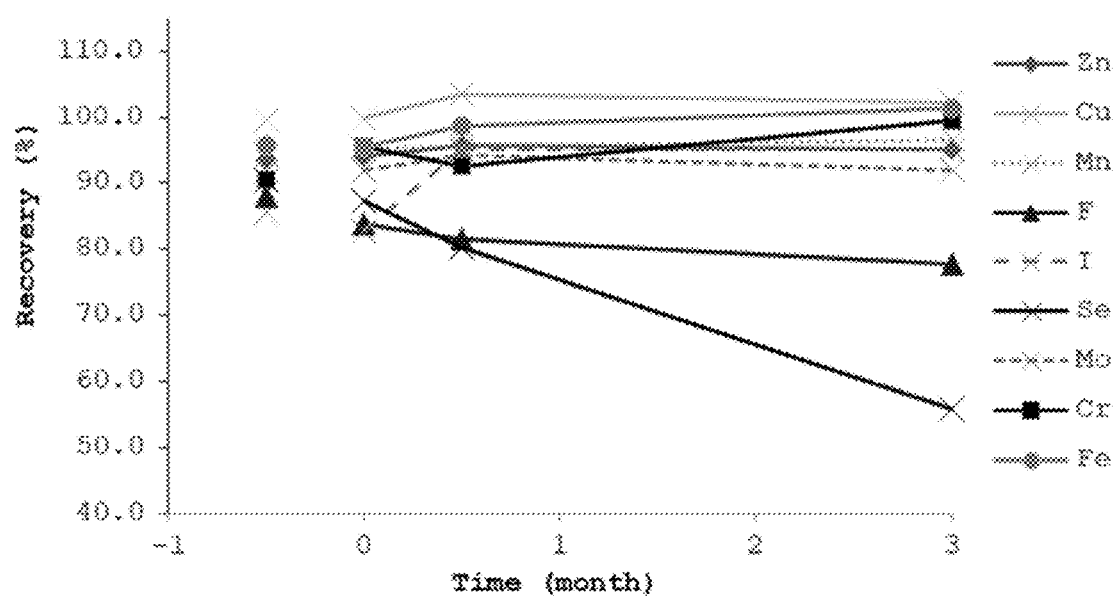
FIG. 11 is a set of graphs showing the general recovery from a standard TE solution of different trace elements in percent (%) as indicated on the Y-axis of the Figures. The analyzed timepoints are indicated on the X-axis. The timepoint −0.5 corresponds to the results in an unsterilized sample at T0, basically corresponding to the amount added to the formulation. Timepoint 0 corresponds to the results of TE dosage right after sterilization. Timepoint 0.5 correspond to the results of TE dosage after an accelerated stability stress cycle (i.e. three repetitions of alternatively 5° C./50° C., 48 h/48 h). Timepoints 1, 3 and 6 correspond to the results of TE dosage after 1 month, 3 months and 6 months storage at 40° C./25% RH.

Example 18: Assessment of Selenium Stability in a Trace Element Formulation According to the Invention Using Solutions Containing Selenate, Selenomethionine or Selenite FIGS. 9-11 illustrate the better stability of selenium when introduced as selenate (FIG. 9) or selenomethionine (FIG. 10) compared with selenite (FIG. 11) after storage for three months at the same conditions. Selenate and selenomethionine remained stable for up to 6 months. For selenite, analysis was stopped after three months due to lack of stability. Importantly, the experiments were not performed under strict control of dissolved oxygen contents, thereby confirming the susceptibility of selenite to the absence of oxygen as described herein. For the three tested solutions containing different forms of selenium, the selenium is mixed with other TE (Zn, Cu, Mn, F, I, Mo, Cr, Fe), which were introduced as chloride salts. The solutions were acidified to pH 2.2 using malic acid and underwent terminal heat sterilization prior to storage.

The results as shown in FIGS. 9-11 demonstrate that the selenium concentration remained stable in trace element formulations comprising selenate or selenomethionine, whereas the selenium concentration decreased significantly in the solution comprising selenium as selenite under the same conditions, which were, however, not optimized for selenite with regard to DO. Concentrations of all other TE remained about stable under all tested conditions.

The invention claimed is:

1. A terminally heat-sterilized multi-chamber container comprising at least:
   (a) a first chamber comprising a carbohydrate formulation and vitamins;
   (b) a second chamber comprising an amino acid formulation and vitamins, wherein the vitamins in the second chamber comprise at least one of vitamin B8 or vitamin B9;
   (c) a third chamber comprising a lipid formulation;
   (d) a fourth chamber comprising a trace element formulation; and
   (e) a fifth chamber comprising a vitamin formulation,
   wherein the vitamin formulation of the fifth chamber is a lipid emulsion having a pH of from 5.0 to 7.0, and comprises vitamin B12, vitamin B2, vitamin B5, vitamin A and optionally further comprises vitamin D, vitamin E, and/or vitamin K, wherein the trace element formulation comprises at least selenium (Se), wherein the terminally heat-sterilized multi-chamber container was sterilized at a temperature of 121° C. for at least 8 minutes, and wherein the vitamin formulation does not comprise glucose, does not comprise vitamin B1, and does not comprise vitamin C.

2. The terminally heat-sterilized multi-chamber container of claim 1, wherein the trace element formulation further comprises zinc (Zn), copper (Cu) and manganese (Mn).

3. The terminally heat-sterilized multi-chamber container of claim 1, wherein the multi-chamber container further comprises at least one electrolyte selected from the group of electrolytes consisting of sodium ($Na^+$), chloride ($Cl^-$), potassium ($K^+$), magnesium ($Mg^{2+}$), calcium ($Ca^{2+}$), hydrogen phosphate ($HPO_4^-$), glycerophosphate ($C_3H_7O_6P^{2-}$), acetate ($CH_3COO^-$) and hydrogen carbonate ($HCO_3^-$).

4. The terminally heat-sterilized multi-chamber container of claim 3, wherein the at least one electrolyte is provided in the amino acid formulation.

5. The terminally heat-sterilized multi-chamber container of claim 1, wherein the carbohydrate formulation or the trace element formulation comprises calcium.

6. The terminally heat-sterilized multi-chamber container of claim 1, wherein the carbohydrate formulation comprises glucose and at least one vitamin selected from the group of vitamins consisting of vitamin B1, vitamin B3 and vitamin B6.

7. The terminally heat-sterilized multi-chamber container of claim 1, wherein the carbohydrate formulation is an aqueous solution having a pH of from 3.2 to 5.5 and comprises
   (a) from 24 g to 411 g glucose,
   (b) from 0.1 g to 1.5 g calcium,
   (c) from 1.1 mg to 10.0 mg vitamin B1,
   (d) from 16 mg to 115 mg vitamin B3, and
   (e) from 0.5 mg to 10.5 mg vitamin B6.

8. The terminally heat-sterilized multi-chamber container of claim 1, wherein the vitamins in the second chamber further comprise vitamin C.

9. The terminally heat-sterilized multi-chamber container of claim 1, wherein the amino acid formulation is an aqueous solution having a pH of from 4.5 to 7.0, and comprises:
   (a) from 8 g to 223 g amino acids,
   (b) from 17 µg to 125 µg vitamin B8,
   (c) from 120 µg to 1000 µg vitamin B9,
   (d) from 60 mg to 340 mg vitamin C, and
   (e) optionally one or more electrolytes selected from the group consisting of sodium, potassium, glycerophosphate, magnesium, calcium, acetate, and chloride.

10. The terminally heat-sterilized multi-chamber container of claim 1, wherein the trace element formulation is an aqueous solution having a pH of from 2.0 to 4.0 and comprises:
    (a) from 580 µg to 7000 µg zinc,
    (b) from 10 µg to 120 µg selenium,
    (c) from 80 µg to 800 µg copper,
    (d) from 1 µg to 350 µg manganese, and optionally
    (e) from 0 µg to 3000 µg iron,
    (f) from 0 µg to 25 µg chromium,
    (g) from 5 µg to 200 µg iodine,
    (h) from 0 µg to 1500 µg fluorine, and/or
    (i) from 1 µg to 30 µg molybdenum.

11. The terminally heat-sterilized multi-chamber container of claim 1, wherein the trace element formulation further comprises an organic acid selected from the group of organic acids consisting of malic acid, tartaric acid, citric acid, maleic acid, and fumaric acid in a concentration of from 50 mM to 400 mM.

12. The terminally heat-sterilized multi-chamber container of claim 1, wherein the vitamin formulation comprises:
    (a) from 0.5 mg to 6.0 mg vitamin B2,
    (b) from 4.3 mg to 45.0 mg vitamin B5, and
    (c) from 0.7 µg to 35.0 µg vitamin B12.

13. The terminally heat-sterilized multi-chamber container of claim 1, wherein the vitamin formulation comprises vitamin A, vitamin D, vitamin K and vitamin E.

14. The terminally heat-sterilized multi-chamber container of claim 1, wherein the vitamin formulation comprises an aqueous phase, and 1% to 20% by weight of an oil phase based on the total weight of the lipid emulsion.

15. The terminally heat-sterilized multi-chamber container of claim 1, wherein the vitamin formulation contains no more than 1.5 ppm of dissolved oxygen.

16. The terminally heat-sterilized multi-chamber container of claim 1, wherein the multi-chamber container comprises a sixth chamber comprising:
    (a) a lipid emulsion having a pH of from 5.0 to 9.0 which comprises an aqueous phase and 1% to 20% by weight of an oil phase based on the total weight of the lipid emulsion, and contains less than 1.5 ppm of dissolved oxygen,
    (b) vitamin A, and
    (c) optionally at least one of the vitamins selected from the group of vitamins consisting of vitamin D, vitamin K and vitamin E.

17. The terminally heat-sterilized multi-chamber container of claim 16, wherein the vitamin formulation of the fifth chamber further comprises less than 1.5 ppm dissolved oxygen.

18. The terminally heat-sterilized multi-chamber container of claim 1, wherein the lipid formulation comprises an aqueous phase and about 5% to about 35% by weight of an oil phase.

19. The terminally heat-sterilized multi-chamber container of claim 1, wherein the lipid formulation comprises vitamin A and optionally at least one vitamin selected from the group of vitamins consisting of vitamin D, vitamin K and vitamin E.

20. The terminally heat-sterilized multi-chamber container of claim 1, wherein the vitamin formulation comprises fat-soluble vitamins and the fat-soluble vitamins are present in an amount of
   (a) from 215 IU to 6600 IU vitamin A,
   (b) from 400 IU to 1700 IU vitamin D,
   (c) from 8 IU to 40 IU vitamin E, and
   (d) from 30 µg to 650 µg vitamin K, respectively.

21. The terminally heat-sterilized multi-chamber container of claim 1, wherein the multi-chamber container is terminally heat-sterilized by moist heat.

22. The terminally heat-sterilized multi-chamber container of claim 1, wherein the chambers of the multi-chamber container are separated from each other by non-permanent seals.

23. The terminally heat-sterilized multi-chamber container of claim 1, wherein the fourth and fifth chambers, and optionally a sixth chamber each have a volume of from 2.5 mL to 50 mL.

24. The terminally heat-sterilized multi-chamber container of claim 1, wherein the formulations of the at least five chambers can be reconstituted by breaking non-permanent seals separating the chambers from each other.

25. The terminally heat-sterilized multi-chamber container of claim 1 for providing parenteral nutrition to a patient when oral or enteral nutrition is impossible, insufficient, or contraindicated.

26. The terminally heat-sterilized multi-chamber container according to claim 25, wherein the patient is an adult patient.

27. The terminally heat-sterilized multi-chamber container according to claim 1 for providing total parenteral nutrition (TPN) or partial parenteral nutrition (PPN).

28. The terminally heat-sterilized multi-chamber container according to claim 1 for providing total parenteral nutrition (TPN) or partial parenteral nutrition (PPN) to home parenteral nutrition (HPN) patients.

29. The terminally heat-sterilized multi-chamber container of claim 9, wherein the pH of the amino acid formulation is from 6.0 to 7.0.

* * * * *